(12) United States Patent
Thompson et al.

(10) Patent No.: US 12,448,358 B2
(45) Date of Patent: Oct. 21, 2025

(54) INHIBITORS OF PROTEIN ARGININE DEIMINASE 1 AND METHODS OF PREPARATION AND USE THEREOF

(71) Applicant: University of Massachusetts, Boston, MA (US)

(72) Inventors: Paul R. Thompson, Wellesley, MA (US); Santanu Mondal, Shrewsbury, MA (US)

(73) Assignee: University of Massachusetts, Westborough, MA (US)

( * ) Notice: Subject to any disclaimer, the term of this patent is extended or adjusted under 35 U.S.C. 154(b) by 756 days.

(21) Appl. No.: 17/622,200

(22) PCT Filed: Jun. 26, 2020

(86) PCT No.: PCT/US2020/039967
§ 371 (c)(1),
(2) Date: Dec. 22, 2021

(87) PCT Pub. No.: WO2021/003078
PCT Pub. Date: Jan. 7, 2021

(65) Prior Publication Data
US 2023/0002328 A1    Jan. 5, 2023

Related U.S. Application Data

(60) Provisional application No. 62/870,631, filed on Jul. 3, 2019.

(51) Int. Cl.
*C07D 235/16*    (2006.01)

(52) U.S. Cl.
CPC ............................ *C07D 235/16* (2013.01)

(58) Field of Classification Search
CPC ........................................ C07D 235/16
USPC ............................................. 514/394
See application file for complete search history.

(56) References Cited

U.S. PATENT DOCUMENTS 11,208,386 B2 * 12/2021 Thompson ........... C07D 235/14

FOREIGN PATENT DOCUMENTS

WO    WO-2018102262 A1 *  6/2018  ........... C07D 235/14

OTHER PUBLICATIONS

Li et al. Repositioning organohalogen drugs: a case study for identification of potent B-Raf V600E inhibitors via docking and bioassay, Scientific Reports, 2016, vol. 6, article 31074, pp. 1-10 (Year: 2016).*
Luo et al. inhibitors and Inactivators of Protein Arginine Deiminase 4: Functional and Structural Characterization, Biochemistry, 2006, vol. 45, pp. 11727-11736 (Year: 2006).*

* cited by examiner

*Primary Examiner* — Jeffrey H Murray
*Assistant Examiner* — Rilla Marie Samsell
(74) *Attorney, Agent, or Firm* — Milstein Zhang & Wu LLC

(57) ABSTRACT

The invention provides novel inhibitors or inactivators of protein arginine deiminase 1, pharmaceutical compositions and methods of use thereof. The invention also relates to molecular probes based on such compounds and methods of use thereof.

12 Claims, 65 Drawing Sheets

(A)

(B)

(A)

(B)

(A)

(B)

(A)

(B)

INHIBITORS OF PROTEIN ARGININE DEIMINASE 1 AND METHODS OF PREPARATION AND USE THEREOF

PRIORITY CLAIMS AND RELATED APPLICATIONS

This application is the U.S. national phase of and claims priority to PCT/US20/39967, filed Jun. 26, 2020, which claims the benefit of priority from U.S. Provisional Application Ser. No. 62/870,631, filed on Jul. 3, 2019, the entire content of each of which is incorporated herein by reference.

STATEMENT REGARDING FEDERALLY FUNDED RESEARCH OR DEVELOPMENT

This invention was made with government support under grant number GM118112. awarded by the National Institutes of Health. The Government has certain rights in the invention.

TECHNICAL FIELDS OF THE INVENTION

The invention generally relates to therapeutic compounds, pharmaceutical compositions and methods thereof. More particularly, the invention provides inhibitors or inactivators of protein arginine deiminase 1 (PAD1), pharmaceutical compositions and methods of preparation and use thereof. The invention also relates to molecular probes based on such compounds and methods of preparation and use thereof.

BACKGROUND OF THE INVENTION

Citrullination, a post-translational modification (PTM) of arginine, plays pivotal roles in several physiological processes, including the epigenetic regulation of gene expression, neutrophil extracellular trap (NET)-formation and DNA-damage induced apoptosis. (Brinkmann, et al. *Science* 2004, 303, 1532-1535; Fuhrmann, et al. *Chem. Rev.* 2015, 115, 5413-5461; Kenny, et al. *Elife* 2017, 6; d) Mondal, et al. *Acc. Chem. Res.* 2019, 52, 818-832.)

Protein citrullination is catalyzed by a family of cysteine hydrolases, termed protein arginine deiminases or PADs (FIG. 1A). Although five PAD isozymes (PAD1, 2, 3, 4 and 6) are known, only four of them (PADs1-4) are catalytically active. PAD activity is tightly regulated by $Ca^{2+}$ and PADs contain 4 (PAD1), 5 (PAD3, 4) or 6 (PAD2) $Ca^{2+}$-binding sites. (Arita, et al. *Nat. Struct. Mol. Biol.* 2004, 11, 777-783; Saijo, et al. *J. Mol. Biol.* 2016, 428, 3058-3073; Slade, et al. *ACS Chem. Biol.* 2015, 10, 1043-1053.)

PADs catalyze the hydrolysis of the guanidium side chain of arginine to generate citrulline. Aberrant PAD activity leads to numerous autoimmune diseases, including rheumatoid arthritis, multiple sclerosis, lupus, and certain cancers. These pathologies established the PADs as therapeutic targets and multiple small molecule PAD inhibitors are known.

$Ca^{2+}$-binding leads to the formation of a catalytically competent active site through a series of dramatic conformational changes that reorient key catalytic residues. Catalysis is mediated by a nucleophilic cysteine (C645 in PAD1, 4; C647 in PAD2; C646 in PAD3), a histidine (H471), and two aspartates (D350 and D473) that properly orient the substrate guanidium group for nucleophilic attack by the cysteine. In addition to their important physiological roles, aberrant protein citrullination leads to several autoimmune diseases, including rheumatoid arthritis, lupus, multiple sclerosis, and ulcerative colitis as well as certain cancers. These disease links have established multiple PADs as promising therapeutic targets. (Fuhrmann, et al. *Chem. Rev.* 2015, 115, 5413-5461; Mondal, et al. *Acc. Chem. Res.* 2019, 52, 818-832.)

Cl-amidine and BB-Cl-amidine are two widely used pan-PAD inhibitors that possess a chloroacetamidine warhead that covalently modifies the active site cysteine (FIG. 1B). Although these inhibitors exhibit similar potencies for the inhibition of PADs1-4, BB-Cl-amidine exhibits superior efficacy in cells and animal models of disease owing to its higher cell permeability and metabolic stability. (Knight, et al. *Ann. Rheum. Dis.* 2015, 74, 2199-2206; Luo, et al. *J. Am. Chem. Soc.* 2006, 128, 1092-1093.)

Interestingly, o-Cl-amidine, with a carboxylate substitution on the Cl-amidine scaffold, exhibits superior potencies for PAD inhibition (FIG. 1B). (Causey, et al. *J. Med. Chem.* 2011, 54, 6919-6935.) A crystal structure of PAD4 in complex with o-F-amidine, a fluoroacetamidine-containing analogue of o-Cl-amidine, indicates that the carboxylate group forms a direct hydrogen bond with W347 (universally conserved amongst the PADs) and a water-mediated hydrogen bond with Q346 (FIG. 1C). However, o-Cl-amidine exhibits poor cellular efficacy, likely due to the negatively charged carboxylate that limits cell permeability.

There is an urgent and growing need for novel therapeutics and treatment methods that provide improved clinical effectiveness with reduced side effects, in particular through safe and effective inhibition or inactivation of PAD1.

SUMMARY OF THE INVENTION

The invention provides novel inhibitors or inactivators of PAD1, and pharmaceutical compositions and methods of preparation and use thereof. The compounds and pharmaceutical compositions of the invention may be used to treat a number of diseases and conditions (e.g., cancers and autoimmune diseases).

The invention also provides novel molecular probes (e.g., imaging probes) for PAD1. These molecular probes are based on the PAD1 inhibitors or inactivators disclosed herein in conjugation with detectable labels, such as fluorescent dyes. These probes may be adapted for use in screening to identify PAD1 inhibitors or inactivators.

Significantly, the disclosed compounds are the highly selective and potent PAD1 inhibitors. A core feature is the iodine substitution(s) in these inhibitors which are crucial for both potency and selectivity. Without being bound to the theory, detailed structure-activity relationships revealed that their potency and selectivity is due in large part to the formation of a halogen bond with PAD1. These inhibitors inhibit histone H3 citrullination in HEK293TPAD1 cells and mouse zygotes with excellent potency. Also developed, based on this inhibitor scaffold, was a series of PAD1-selective activity-based probes that show remarkable cellular efficacy and proteome selectivity.

In one aspect, the invention generally relates to a compound having the structural formula (I),

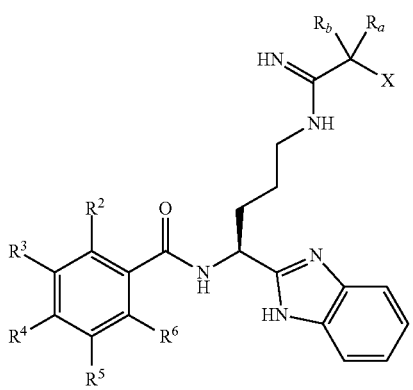

(I)

wherein
  each of $R_a$ and $R_b$ is H or D;
  X is a halogen atom;
  $R^2$ is selected from the group consisting of: H, OH or OCH$_3$;
  $R^4$ is selected from the group consisting of: H, halogen, ethynyl (HC≡C—)
  each of $R^3$ and $R^5$ is selected from the group consisting of: H, Cl, Br, I, $^i$Pr (isopropyl);
  $R^6$ is H or R; and
  each R is independently a $C_{1-6}$ alkyl,
or a pharmaceutically acceptable form thereof.

In another aspect, the invention generally relates to a pharmaceutical composition comprising a compound having the structural formula of (I):

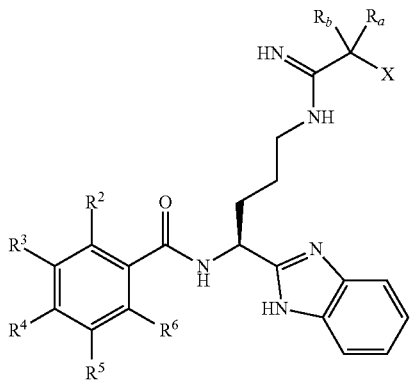

(I)

wherein
  each of $R_a$ and $R_b$ is H or D;
  X is a halogen atom;
  $R^2$ is selected from the group consisting of: H, OH or OCH$_3$;
  $R^4$ is selected from the group consisting of: H, halogen, ethynyl (HC≡C—)
  each of $R^3$ and $R^5$ is selected from the group consisting of: H, Cl, Br, I, $^i$Pr (isopropyl);
  $R^6$ is H or R; and
  each R is independently a $C_{1-6}$ alkyl,
or a pharmaceutically acceptable form thereof, effective to treat, prevent, or reduce one or more diseases or disorders, in a mammal, including a human, and a pharmaceutically acceptable excipient, carrier, or diluent.

In yet another aspect, the invention generally relates to a pharmaceutical composition comprising a compound disclosed herein.

In yet another aspect, the invention generally relates to a unit dosage form comprising a pharmaceutical composition disclosed herein.

In yet another aspect, the invention generally relates to a method for treating, reducing, or preventing a disease or disorder, comprising administering to a subject in need thereof a pharmaceutical composition comprising a compound having the structural formula of (I):

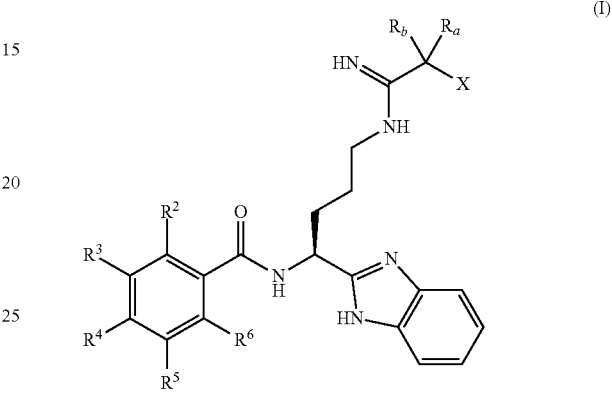

(I)

wherein
  each of $R_a$ and $R_b$ is H or D;
  X is a halogen atom;
  $R^2$ is selected from the group consisting of: H, OH or OCH$_3$;
  $R^4$ is selected from the group consisting of: H, halogen, ethynyl (HC≡C—)
  each of $R^3$ and $R^5$ is selected from the group consisting of: H, Cl, Br, I, $^i$Pr (isopropyl);
  $R^6$ is H or R; and
  each R is independently a $C_{1-6}$ alkyl,
or a pharmaceutically acceptable form thereof, and a pharmaceutically acceptable excipient, carrier, or diluent, effective to treat, prevent, or reduce one or more diseases or disorders, in a mammal, including a human.

In yet another aspect, the invention generally relates to a method for inhibiting or inactivating protein arginine deiminase 1 (PAD1), comprising administering to a subject in need thereof a pharmaceutical composition comprising a compound having the structural formula of (I):

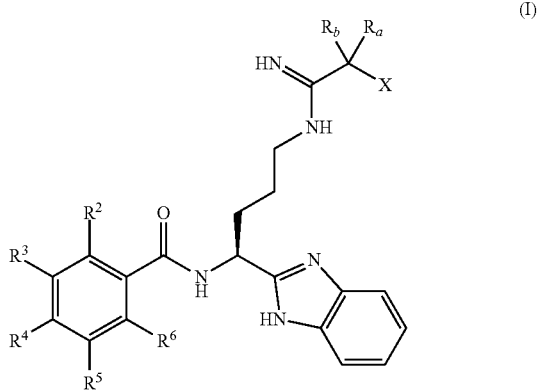

(I)

wherein
  each of $R_a$ and $R_b$ is H or D;
  X is a halogen atom;
  $R^2$ is selected from the group consisting of: H, OH or $OCH_3$;
  $R^4$ is selected from the group consisting of: H, halogen, ethynyl (HC≡C—)
  each of $R^3$ and $R^5$ is selected from the group consisting of: H, Cl, Br, I, $^iPr$ (isopropyl);
  $R^6$ is H or R; and
  each R is independently a $C_{1-6}$ alkyl,
or a pharmaceutically acceptable form thereof, and a pharmaceutically acceptable excipient, carrier, or diluent, effective to inhibit or inactivate a biological function of PAD1, in a mammal, including a human.

In yet another aspect, the invention generally relates to a molecular imaging probe having the structural formula:

$$A_F\text{-}L_F\text{-}W \qquad (II)$$

wherein
  $A_F$ is a group comprising an optically detectable moiety;
  $L_F$ is a linking group; and
  W is a group derived from a compound of formula (I) capable of inhibiting or inactivating a biological function of protein arginine deiminase 1 (PAD1).

In yet another aspect, the invention generally relates to a molecular imaging probe having the structural formula:

$$B\text{-}L_F\text{-}W \qquad (II)$$

wherein
  B comprises biotin;
  $L_B$ is a linking group; and
  W is a group derived from a compound of formula (I) capable of inhibiting or inactivating a biological function of protein arginine deiminase 1 (PAD1).

In yet another aspect, the invention generally relates to a kit comprising a molecular imaging probe disclosed herein.

In yet another aspect, the invention generally relates to a method for identifying a protein arginine deiminase 1 (PAD1) inhibitor or inactivator, comprising: performing a competitive assay wherein a test compound competes with a molecular imaging probe disclosed herein to bind to PAD1; and measuring fluorescence or fluorescence polarization to determine an amount of fluorescent PAD1 present in the test assay.

In yet another aspect, the invention generally relates to a method for birth control comprising administering to a subject in need thereof a contragestive and/or contraceptive effective amount of a composition comprising a compound having the structural formula of (I):

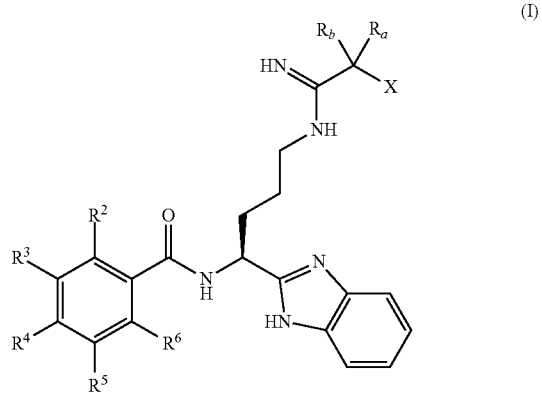

wherein
  each of $R_a$ and $R_b$ is H or D;
  X is a halogen atom;
  $R^2$ is selected from the group consisting of: H, OH or $OCH_3$;
  $R^4$ is selected from the group consisting of: H, halogen, ethynyl (HC≡C—)
  each of $R^3$ and $R^5$ is selected from the group consisting of: H, Cl, Br, I, $^iPr$ (isopropyl);
  $R^6$ is H or R; and
  each R is independently a $C_{1-6}$ alkyl,
or a pharmaceutically acceptable form thereof.

In yet another aspect, the invention generally relates to a unit dosage formulation useful as a contragestive and/or contraceptive agent, comprising a compound disclosed herein.

DEFINITIONS

Figure 1:
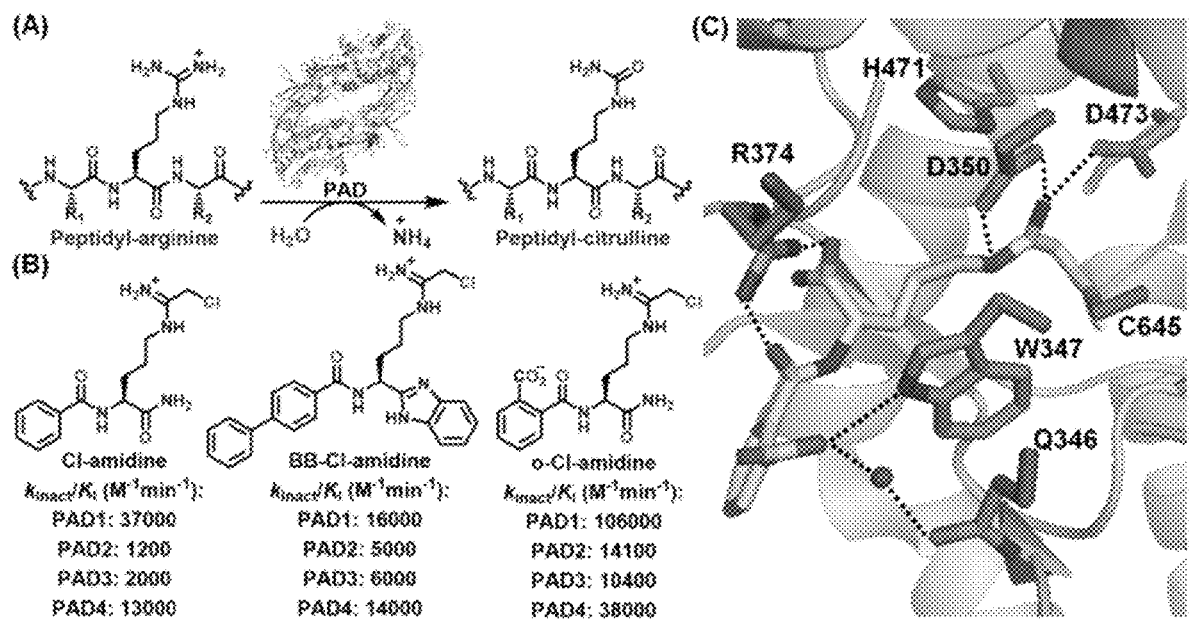
FIG. 1. (A) Conversion of peptidyl-arginine to peptidyl-citrulline by the protein arginine deiminases (PADs). (B) Chemical structures and potencies of PAD inhibitors. (C) Crystal structure of the PAD4-o-F-amidine complex (PDB: 3B1U).

Unless defined otherwise, all technical and scientific terms used herein have the same meaning as commonly understood by one of ordinary skill in the art to which this invention belongs. General principles of organic chemistry, as well as specific functional moieties and reactivity, are described in "Organic Chemistry", Thomas Sorrell, University Science Books, Sausalito: 2006.

Certain compounds of the present invention may exist in particular geometric or stereoisomeric forms. The present invention contemplates all such compounds, including cis- and trans-isomers, R- and S-enantiomers, diastereomers, (D)-isomers, (L)-isomers, the racemic mixtures thereof, and other mixtures thereof, as falling within the scope of the invention. Additional asymmetric carbon atoms may be present in a substituent such as an alkyl group. All such isomers, as well as mixtures thereof, are intended to be included in this invention.

Isomeric mixtures containing any of a variety of isomer ratios may be utilized in accordance with the present invention. For example, where only two isomers are combined, mixtures containing 50:50, 60:40, 70:30, 80:20, 90:10, 95:5, 96:4, 97:3, 98:2, 99:1, or 100:0 isomer ratios are contemplated by the present invention. Those of ordinary skill in the art will readily appreciate that analogous ratios are contemplated for more complex isomer mixtures.

If, for instance, a particular enantiomer of a compound of the present invention is desired, it may be prepared by asymmetric synthesis, or by derivation with a chiral auxiliary, where the resulting diastereomeric mixture is separated and the auxiliary group cleaved to provide the pure desired enantiomers. Alternatively, where the molecule contains a basic functional group, such as amino, or an acidic functional group, such as carboxyl, diastereomeric salts are formed with an appropriate optically-active acid or base, followed by resolution of the diastereomers thus formed by fractional crystallization or chromatographic methods well known in the art, and subsequent recovery of the pure enantiomers.

As used herein, "administration" of a disclosed compound encompasses the delivery to a subject of a compound as described herein, or a prodrug or other pharmaceutically acceptable derivative thereof, using any suitable formulation or route of administration, as discussed herein.

As used herein, the terms "effective amount" or "therapeutically effective amount" refer to that amount of a compound or pharmaceutical composition described herein that is sufficient to effect the intended application including, but not limited to, disease treatment, as illustrated below. In some embodiments, the amount is that effective to stop the progression or effect reduction of an inflammatory disease or disorder. In some embodiments, the amount is that effective to stop the progression or effect reduction of an immune system disorders. In some embodiments, the amount is that effective to stop the progression or effect reduction of an autoimmune disease or disorder. In some embodiments, the amount is that effective for stop the progression or effect reduction of a cardiovascular disease or disorder. In some embodiments, the amount is that effective for detectable killing or inhibition of the growth or spread of cancer cells; the size or number of tumors; or other measure of the level, stage, progression or severity of the cancer.

The therapeutically effective amount can vary depending upon the intended application, or the subject and disease condition being treated, e.g., the desired biological endpoint, the pharmacokinetics of the compound, the disease being treated, the mode of administration, and the weight and age of the patient, which can readily be determined by one of ordinary skill in the art. The term also applies to a dose that will induce a particular response in target cells, e.g., reduction of cell migration. The specific dose will vary depending on, for example, the particular compounds chosen, the species of subject and their age/existing health conditions or risk for health conditions, the dosing regimen to be followed, the severity of the disease, whether it is administered in combination with other agents, timing of administration, the tissue to which it is administered, and the physical delivery system in which it is carried.

As used herein, the terms "treatment" or "treating" a disease or disorder refers to a method of reducing, delaying or ameliorating such a condition before or after it has occurred. Treatment may be directed at one or more effects or symptoms of a disease and/or the underlying pathology. Treatment is aimed to obtain beneficial or desired results including, but not limited to, therapeutic benefit and/or a prophylactic benefit. By therapeutic benefit is meant eradication or amelioration of the underlying disorder being treated. Also, a therapeutic benefit is achieved with the eradication or amelioration of one or more of the physiological symptoms associated with the underlying disorder such that an improvement is observed in the patient, notwithstanding that the patient can still be afflicted with the underlying disorder. For prophylactic benefit, the pharmaceutical compounds and/or compositions can be administered to a patient at risk of developing a particular disease, or to a patient reporting one or more of the physiological symptoms of a disease, even though a diagnosis of this disease may not have been made. The treatment can be any reduction and can be, but is not limited to, the complete ablation of the disease or the symptoms of the disease. As compared with an equivalent untreated control, such reduction or degree of prevention is at least 5%, 10%, 20%, 40%, 50%, 60%, 80%, 90%, 95%, or 100% as measured by any standard technique.

As used herein, the term "therapeutic effect" refers to a therapeutic benefit and/or a prophylactic benefit as described herein. A prophylactic effect includes delaying or eliminating the appearance of a disease or condition, delaying or eliminating the onset of symptoms of a disease or condition, slowing, halting, or reversing the progression of a disease or condition, or any combination thereof.

As used herein, a "pharmaceutically acceptable form" of a disclosed compound includes, but is not limited to, pharmaceutically acceptable salts, esters, hydrates, solvates, isomers, prodrugs, and isotopically labeled derivatives of disclosed compounds. In one embodiment, a "pharmaceutically acceptable form" includes, but is not limited to, pharmaceutically acceptable salts, esters, isomers, prodrugs and isotopically labeled derivatives of disclosed compounds. In some embodiments, a "pharmaceutically acceptable form" includes, but is not limited to, pharmaceutically acceptable salts, esters, stereoisomers, prodrugs and isotopically labeled derivatives of disclosed compounds.

In certain embodiments, the pharmaceutically acceptable form is a pharmaceutically acceptable salt. As used herein, the term "pharmaceutically acceptable salt" refers to those salts which are, within the scope of sound medical judgment, suitable for use in contact with the tissues of subjects without undue toxicity, irritation, allergic response and the like, and are commensurate with a reasonable benefit/risk ratio. Pharmaceutically acceptable salts are well known in the art. For example, Berge et al. describes pharmaceutically acceptable salts in detail in J. *Pharmaceutical Sciences* (1977) 66:1-19. Pharmaceutically acceptable salts of the compounds provided herein include those derived from suitable inorganic and organic acids and bases. Examples of pharmaceutically acceptable, nontoxic acid addition salts are salts of an amino group formed with inorganic acids such as hydrochloric acid, hydrobromic acid, phosphoric acid, sulfuric acid and perchloric acid or with organic acids such as acetic acid, oxalic acid, maleic acid, tartaric acid, citric acid, succinic acid or malonic acid or by using other methods used in the art such as ion exchange. Other pharmaceutically acceptable salts include adipate, alginate, ascorbate, aspartate, benzenesulfonate, besylate, benzoate, bisulfate, borate, butyrate, camphorate, camphorsulfonate, citrate, cyclopentanepropionate, digluconate, dodecylsulfate, ethanesulfonate, formate, fumarate, glucoheptonate, glycerophosphate, gluconate, hemisulfate, heptanoate, hexanoate, hydroiodide, 2-hydroxy-ethanesulfonate, lactobionate, lactate, laurate, lauryl sulfate, malate, maleate, malonate, methanesulfonate, 2-naphthalenesulfonate, nicotinate, nitrate, oleate, oxalate, palmitate, pamoate, pectinate, persulfate, 3-phenylpropionate, phosphate, picrate, pivalate, propionate, stearate, succinate, sulfate, tartrate, thiocyanate, p-toluenesulfonate, undecanoate, valerate salts, and the like. In some embodiments, organic acids from which salts can be derived include, for example, acetic acid, propionic acid, glycolic acid, pyruvic acid, oxalic acid, lactic acid, trifluoracetic acid, maleic acid, malonic acid, succinic acid, fumaric acid, tartaric acid, citric acid, benzoic acid, cinnamic acid, mandelic acid, methanesulfonic acid, ethanesulfonic acid, p-toluenesulfonic acid, salicylic acid, and the like.

The salts can be prepared in situ during the isolation and purification of the disclosed compounds, or separately, such as by reacting the free base or free acid of a parent compound with a suitable base or acid, respectively. Pharmaceutically acceptable salts derived from appropriate bases include alkali metal, alkaline earth metal, ammonium and $N^+(C_{1-4}alkyl)^4$ salts. Representative alkali or alkaline earth metal salts include sodium, lithium, potassium, calcium, magnesium, iron, zinc, copper, manganese, aluminum, and the like. Further pharmaceutically acceptable salts include, when appropriate, nontoxic ammonium, quaternary ammonium, and amine cations formed using counterions such as halide, hydroxide, carboxylate, sulfate, phosphate, nitrate, lower alkyl sulfonate and aryl sulfonate. Organic bases from which salts can be derived include, for example, primary, secondary, and tertiary amines, substituted amines, including naturally occurring substituted amines, cyclic amines, basic ion exchange resins, and the like, such as isopropylamine, trimethylamine, diethylamine, triethylamine, tripropylamine, and ethanolamine. In some embodiments, the pharmaceutically acceptable base addition salt can be chosen from ammonium, potassium, sodium, calcium, and magnesium salts.

In certain embodiments, the pharmaceutically acceptable form is a pharmaceutically acceptable ester. As used herein, the term "pharmaceutically acceptable ester" refers to esters that hydrolyze in vivo and include those that break down readily in the human body to leave the parent compound or a salt thereof. Such esters can act as a prodrug as defined herein. Pharmaceutically acceptable esters include, but are not limited to, alkyl, alkenyl, alkynyl, aryl, aralkyl, and cycloalkyl esters of acidic groups, including, but not limited to, carboxylic acids, phosphoric acids, phosphinic acids, sulfinic acids, sulfonic acids and boronic acids. Examples of esters include formates, acetates, propionates, butyrates, acrylates and ethylsuccinates. The esters can be formed with a hydroxy or carboxylic acid group of the parent compound.

In certain embodiments, the pharmaceutically acceptable form is a "solvate" (e.g., a hydrate). As used herein, the term "solvate" refers to compounds that further include a stoichiometric or non-stoichiometric amount of solvent bound by non-covalent intermolecular forces. The solvate can be of a disclosed compound or a pharmaceutically acceptable salt thereof. Where the solvent is water, the solvate is a "hydrate". Pharmaceutically acceptable solvates and hydrates are complexes that, for example, can include 1 to about 100, or 1 to about 10, or 1 to about 2, about 3 or about 4, solvent or water molecules. It will be understood that the term "compound" as used herein encompasses the compound and solvates of the compound, as well as mixtures thereof.

In certain embodiments, the pharmaceutically acceptable form is a prodrug. As used herein, the term "prodrug" (or "pro-drug") refers to compounds that are transformed in vivo to yield a disclosed compound or a pharmaceutically acceptable form of the compound. A prodrug can be inactive when administered to a subject, but is converted in vivo to an active compound, for example, by hydrolysis (e.g., hydrolysis in blood). In certain cases, a prodrug has improved physical and/or delivery properties over the parent compound. Prodrugs can increase the bioavailability of the compound when administered to a subject (e.g., by permitting enhanced absorption into the blood following oral administration) or which enhance delivery to a biological compartment of interest (e.g., the brain or lymphatic system) relative to the parent compound. Exemplary prodrugs include derivatives of a disclosed compound with enhanced aqueous solubility or active transport through the gut membrane, relative to the parent compound.

The prodrug compound often offers advantages of solubility, tissue compatibility or delayed release in a mammalian organism (see, e.g., Bundgard, H., *Design of Prodrugs* (1985), pp. 7-9, 21-24 (Elsevier, Amsterdam). A discussion of prodrugs is provided in Higuchi, T., et al., "Prodrugs as Novel Delivery Systems," *A.C.S. Symposium Series*, Vol. 14, and in *Bioreversible Carriers in Drug Design*, ed. Edward B. Roche, American Pharmaceutical Association and Pergamon Press, 1987, both of which are incorporated in full by reference herein. Exemplary advantages of a prodrug can include, but are not limited to, its physical properties, such as enhanced water solubility for parenteral administration at physiological pH compared to the parent compound, or it can enhance absorption from the digestive tract, or it can enhance drug stability for long-term storage.

As used herein, the term "pharmaceutically acceptable" excipient, carrier, or diluent refers to a pharmaceutically acceptable material, composition or vehicle, such as a liquid or solid filler, diluent, excipient, solvent or encapsulating material, involved in carrying or transporting the subject pharmaceutical agent from one organ, or portion of the body, to another organ, or portion of the body. Each carrier must be "acceptable" in the sense of being compatible with the other ingredients of the formulation and not injurious to the patient. Some examples of materials which can serve as pharmaceutically-acceptable carriers include: sugars, such as lactose, glucose and sucrose; starches, such as corn starch and potato starch; cellulose, and its derivatives, such as sodium carboxymethyl cellulose, ethyl cellulose and cellulose acetate; powdered tragacanth; malt; gelatin; talc; excipients, such as cocoa butter and suppository waxes; oils, such as peanut oil, cottonseed oil, safflower oil, sesame oil, olive oil, corn oil and soybean oil; glycols, such as propylene glycol; polyols, such as glycerin, sorbitol, mannitol and polyethylene glycol; esters, such as ethyl oleate and ethyl laurate; agar; buffering agents, such as magnesium hydroxide and aluminum hydroxide; alginic acid; pyrogen-free water; isotonic saline; Ringer's solution; ethyl alcohol; phosphate buffer solutions; and other non-toxic compatible substances employed in pharmaceutical formulations. Wetting agents, emulsifiers and lubricants, such as sodium lauryl sulfate, magnesium stearate, and polyethylene oxide-polypropylene oxide copolymer as well as coloring agents, release agents, coating agents, sweetening, flavoring and perfuming agents, preservatives and antioxidants can also be present in the compositions.

As used herein, the term "subject" refers to any animal (e.g., a mammal), including, but not limited to humans, non-human primates, rodents, and the like, which is to be the recipient of a particular treatment. Typically, the terms "subject" and "patient" are used interchangeably herein in reference to a human subject.

Compounds of the present invention are, subsequent to their preparation, preferably isolated and purified to obtain a composition containing an amount by weight equal to or greater than 95% ("substantially pure"), which is then used or formulated as described herein. In certain embodiments, the compounds of the present invention are more than 99% pure.

Solvates and polymorphs of the compounds of the invention are also contemplated herein. Solvates of the compounds of the present invention include, for example, hydrates.

Definitions of specific functional groups and chemical terms are described in more detail below. When a range of values is listed, it is intended to encompass each value and sub-range within the range. For example "$C_{1-6}$ alkyl" is intended to encompass, $C_1$, $C_2$, $C_3$, $C_4$, $C_5$, $C_6$, $C_{1-6}$, $C_{1-5}$, $C_{1-4}$, $C_{1-3}$, $C_{1-2}$, $C_{2-6}$, $C_{2-5}$, $C_{2-4}$, $C_{2-3}$, $C_{3-6}$, $C_{3-5}$, $C_{3-4}$, $C_{4-6}$, $C_{4-5}$, and $C_{5-6}$ alkyl.

As used herein, the term "alkyl" refers to a straight or branched hydrocarbon chain radical consisting solely of carbon and hydrogen atoms, containing no unsaturation, having from one to ten carbon atoms (e.g., $C_{1-10}$ alkyl). Whenever it appears herein, a numerical range such as "1 to 10" refers to each integer in the given range; e.g., "1 to 10 carbon atoms" means that the alkyl group can consist of 1 carbon atom, 2 carbon atoms, 3 carbon atoms, etc., up to and including 10 carbon atoms, although the present definition also covers the occurrence of the term "alkyl" where no numerical range is designated. In some embodiments, "alkyl" can be a $C_{1-6}$ alkyl group. In some embodiments, alkyl groups have 1 to 10, 1 to 8, 1 to 6, or 1 to 3 carbon atoms. Representative saturated straight chain alkyls include, but are not limited to, -methyl, -ethyl, -n-propyl, -n-butyl, -n-pentyl, and -n-hexyl; while saturated branched alkyls include, but are not limited to, -isopropyl, -sec-butyl, -isobutyl, -tert-butyl, -isopentyl, 2-methylbutyl, 3-methylbutyl, 2-methylpentyl, 3-methylpentyl, 4-methylpentyl, 2-methylhexyl, 3-methylhexyl, 4-methylhexyl, 5-methylhexyl, 2,3-dimethylbutyl, and the like. The alkyl is attached to the parent molecule by a single bond. Unless stated otherwise in the specification, an alkyl group is optionally substituted by one or more of substituents which independently include: acyl, alkyl, alkenyl, alkynyl, alkoxy, alkylaryl, cycloalkyl, aralkyl, aryl, aryloxy, amino, amido, amidino, imino, azide, carbonate, carbamate, carbonyl, heteroalkyl, heteroaryl, heteroarylalkyl, heterocycloalkyl, hydroxy, cyano, halo, haloalkoxy, haloalkyl, ester, ether, mercapto, thio, alkylthio, arylthio, thiocarbonyl, nitro, oxo, phosphate, phosphonate, phosphinate, silyl, sulfinyl, sulfonyl, sulfonamidyl, sulfoxyl, sulfonate, urea, —Si(R$^a$)$_3$, —OR$^a$, —SR$^a$, —OC(O)—R$^a$, —N(R$^a$)$_2$, —C(O)R$_a$, —C(O)OR$^a$, —OC(O)N(R$^a$)$_2$, —C(O)N(R$^a$)$_2$, —N(R$^a$)C(O)OR$^a$, —N(R$^a$)C(O)R$^a$, —N(R$^a$)C(O)N(R$^a$)$_2$, —N(R$^a$)C(NR$^a$)N(R$^a$)$_2$, —N(R$^a$)S(O)$_t$N(R$^a$)$_2$ (where t is 1 or 2), —P(=O)(R$^a$)(R$^a$), or —O—P(=O)(OR$^a$)$_2$ where each R$^a$ is independently hydrogen, alkyl, haloalkyl, carbocyclyl, carbocyclylalkyl, aryl, aralkyl, heterocycloalkyl, heterocycloalkylalkyl, heteroaryl or heteroarylalkyl, and each of these moieties can be optionally substituted as defined herein. In a non-limiting embodiment, a substituted alkyl can be selected from fluoromethyl, difluoromethyl, trifluoromethyl, 2-fluoroethyl, 3-fluoropropyl, hydroxymethyl, 2-hydroxyethyl, 3-hydroxypropyl, benzyl, and phenethyl.

As used herein, the term "halogen" means fluoro, chloro, bromo or iodo. The terms "haloalkyl," "haloalkenyl," "haloalkynyl" and "haloalkoxy" include alkyl, alkenyl, alkynyl and alkoxy structures that are substituted with one or more halo groups or with combinations thereof. For example, the terms "fluoroalkyl" and "fluoroalkoxy" include haloalkyl and haloalkoxy groups, respectively, in which the halo is fluorine, such as, but not limited to, trifluoromethyl, difluoromethyl, 2,2,2-trifluoroethyl, 1-fluoromethyl-2-fluoroethyl, and the like. Each of the alkyl, alkenyl, alkynyl and alkoxy groups are as defined herein and can be optionally further substituted as defined herein.

As used herein, the term "antibody" refers to molecules that are capable of binding an epitope or antigenic determinant. The term is meant to include whole antibodies and antigen-binding fragments thereof, including single-chain antibodies. The antibodies can be from any animal origin. Preferably, the antibodies are mammalian, e.g., human, murine, rabbit, goat, guinea pig, camel, horse and the like, or other suitable animals. Antibodies may recognize polypeptide or polynucleotide antigens. The term includes active fragments, including for example, an antigen binding fragment of an immunoglobulin, a variable and/or constant region of a heavy chain, a variable and/or constant region of a light chain, a complementarity determining region (cdr), and a framework region. The terms include polyclonal and monoclonal antibody preparations, as well as preparations including hybrid antibodies, altered antibodies, chimeric antibodies, hybrid antibody molecules, $F(ab)_2$ and $F(ab)$ fragments; Fv molecules (for example, noncovalent heterodimers), dimeric and trimeric antibody fragment constructs; minibodies, humanized antibody molecules, and any functional fragments obtained from such molecules, wherein such fragments retain specific binding.

As used herein, the term "inflammatory" diseases or conditions refers to a group of conditions including, rheumatoid arthritis, osteoarthritis, juvenile idiopathic arthritis, psoriasis, allergic airway disease (e.g., asthma, rhinitis), inflammatory bowel diseases (e.g., Crohn's disease, colitis), endotoxin-driven disease states (e.g., complications after bypass surgery or chronic endotoxin states contributing to e.g. chronic cardiac failure), and related diseases involving cartilage, such as that of the joints.

As used herein, the term "autoimmune" diseases or conditions refers to conditions arising from an abnormal immune response to a normal body part. Examples of include, but not limited to rheumatoid arthritis, lupus, Alzheimer's disease, multiple sclerosis, Parkinson's disease, inflammatory bowel disease, and psoriasis.

As used herein, the term "cancer" refers to or describes the physiological condition in mammals that is typically characterized by unregulated cell growth. Examples of cancer include but are not limited to, carcinoma, lymphoma, sarcoma, blastoma and leukemia. More particular examples of such cancers include squamous cell carcinoma, lung cancer, pancreatic cancer, cervical cancer, bladder cancer, hepatoma, breast cancer, colon carcinoma, and head and neck cancer.

As used herein, the term "tumor" refers to any malignant or neoplastic cell.

As used herein, the terms "polypeptide" and "protein" are used interchangeably to refer to a polymer of amino acid residues, and are not limited to a minimum length. Thus, peptides, oligopeptides, dimers, multimers, and the like, are included within the definition. Both full-length proteins and fragments thereof are encompassed by the definition. The terms also include post-expression modifications of the polypeptide, for example, glycosylation, acetylation, phosphorylation, and the like. Furthermore, a "polypeptide" may refer to a protein which includes modifications, such as deletions, additions, and substitutions (generally conservative in nature), to the native sequence, as long as the protein maintains the desired activity. These modifications may be deliberate or may be accidental.

As used herein, the term "sample" refers to a sample from a human, animal, or to a research sample, e.g., a cell, tissue, organ, fluid, gas, aerosol, slurry, colloid, or coagulated material. The "sample" may be tested in vivo, e.g., without removal from the human or animal, or it may be tested in vitro. The sample may be tested after processing, e.g., by histological methods. "Sample" also refers, e.g., to a cell comprising a fluid or tissue sample or a cell separated from a fluid or tissue sample. "Sample" may also refer to a cell, tissue, organ, or fluid that is freshly taken from a human or animal, or to a cell, tissue, organ, or fluid that is processed or stored.

DETAILED DESCRIPTION OF THE INVENTION

The invention provides novel potent and selective inhibitors or inactivators of PAD1, pharmaceutical compositions and methods of use thereof. The compounds and pharmaceutical compositions of the invention may be used to treat various diseases and conditions that are mediated by PAD1. Diseases and conditions that may benefit from treatment using the compounds and pharmaceutical compositions of the invention include cancer (e.g., breast cancer) and autoimmune diseases (e.g., rheumatoid arthritis).

The invention also provides novel potent and selective molecular probes (e.g., imaging probes) for PADs based on the inhibitors or inactivators of PAD1 disclosed herein in conjugation with detectable labels such as fluorescent dyes, and methods of use thereof. The molecular imaging probes of the invention may be used to screen compounds for PAD1 inhibition or inactivation.

A core feature of the highly potent PAD1 selective inhibitors (e.g., 1 and 19) disclosed herein is iodine substitutions crucial for potency and selectivity. Detailed structure-activity relationships indicate that their potency and selectivity is due to the formation of a halogen bond with PAD1. These inhibitors inhibit histone H3 citrullination in HEK293TPAD1 cells and mouse zygotes with excellent potency. Also disclosed herein is a PAD1-selective activity-based probe that shows remarkable cellular efficacy and proteome selectivity useful as chemical tools to understand PAD1 biology.

The first-generation inhibitors suffered from a number of limitations including their susceptibility to proteolysis and poor membrane permeability. This prompted the development of second-generation inhibitors predicated on improving metabolic stability and membrane permeability.

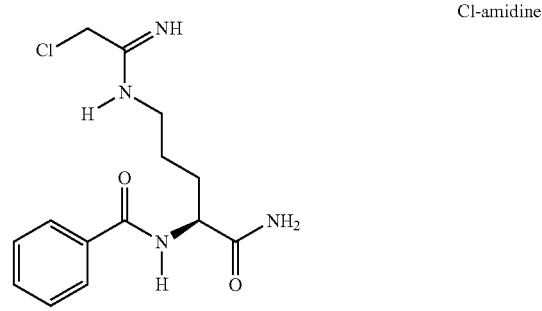

Cl-amidine

-continued

BB-Cl-amidine

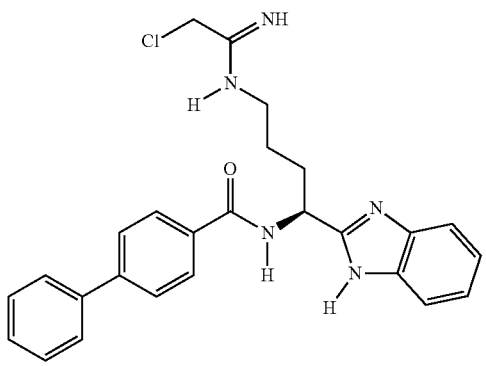

Reports have shown that a second-generation inhibitor, BB-Cl-amidine, exhibits enhanced efficacy over Cl-amidine in animal models of lupus and RA.

Figure 2:
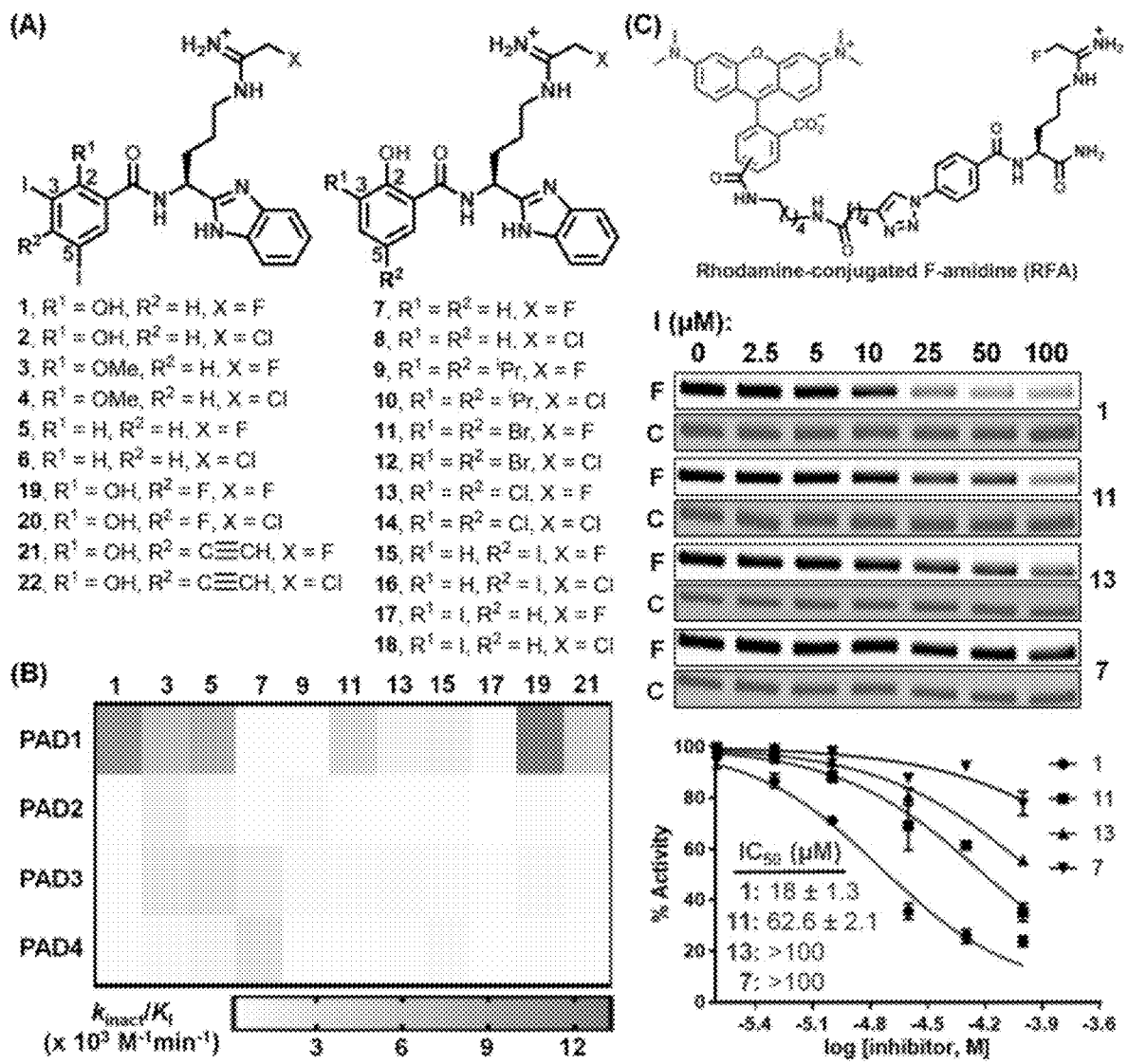
FIG. 2. (A) Chemical structures of 1-22. (B) Potency heat-map of fluoroacetamidine-containing compounds for PADs1-4. The kinetics of inhibition of PADs by 1-22 are given in FIGS. 5-8. (C) Chemical structure of RFA and inhibition of RFA labelling of PAD1 by compounds 1, 11, 13 and 7. I, F and C refer to the inhibitor, fluorograph and Coomassie stain, respectively.

In an effort to increase the cell permeability of PAD inhibitors, 1 was synthesized with a 2-hydroxyl (which was hypothesized could form a hydrogen bond with W347), 3,5-diiodo substitutions in the N-terminal phenyl ring, and a C-terminal benzimidazole substitution. The later moieties were included to enhance the permeability and stability of the inhibitor (FIG. 2A). Notably, this compound contains the less-reactive fluoroacetamidine warhead, which has less off-target toxicity.

Remarkably, 1 exhibits 74-fold selectivity for PAD1 over the other PADs with a $k_{inact}/K_1$ value of $10,400 \pm 2,380$ M$^{-1}$ min$^{-1}$ (FIG. 2B). This compound is the first example of a highly selective fluoroacetamidine-containing PAD1 inhibitor. By contrast, compound 2, which has a chloroacetamidine warhead, is only 19-fold selective for PAD1 (FIG. 2B and Table 1).

The novel PAD1 inhibitors or inactivators disclosed herein may be used to treat a variety of diseases where PAD1 activity is dysregulated, such as cancers. These PAD inhibitors may also find use in treating individuals with autoimmune diseases. Specifically, certain PAD1 inhibitors disclosed herein exhibit enhanced potency and selectivity for PAD1, and so they may be used to treat diseases where PAD1 activity is upregulated. Certain disclosed inhibitors may be useful in treating certain cancers such as breast cancers and certain lung cancers.

In one aspect, the invention generally relates to a compound having the structural formula (I),

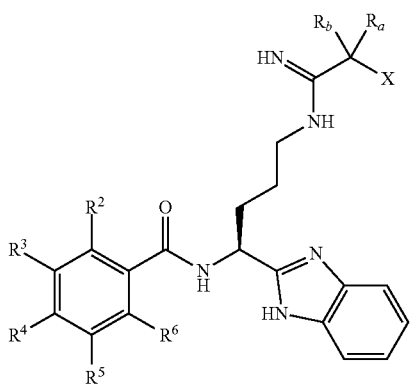

(I)

wherein
each of $R_a$ and $R_b$ is H or D;
X is a halogen atom;
$R^2$ is selected from the group consisting of: H, OH or OCH$_3$;
$R^4$ is selected from the group consisting of: H, halogen, ethynyl (HC≡C—)
each of $R^3$ and $R^5$ is selected from the group consisting of: H, Cl, Br, I, $^i$Pr (isopropyl);
$R^6$ is H or R; and
each R is independently a C$_{1-6}$ alkyl,
or a pharmaceutically acceptable form thereof.

In certain embodiments, each of $R_a$ and $R_b$ is H.
In certain embodiments X is F. In certain embodiments X is Cl.
In certain embodiments $R^2$ is OH.
In certain embodiments, at least one of $R^3$ and $R^5$ is I. In certain embodiments, each of $R^3$ and $R^5$ is I.
In certain embodiments, $R^4$ is H. In certain embodiments, $R^4$ is a halogen atom.
In certain embodiments, $R^6$ is H.
In certain embodiments, the compound has the structural formula:

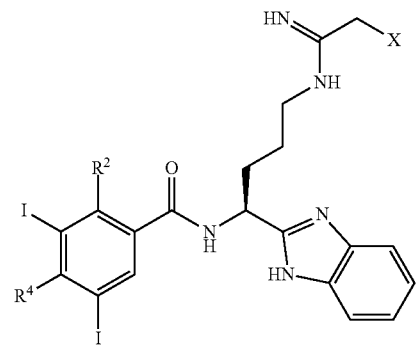

In certain embodiments, $R^2$ is OH.
Compounds disclosed herein can be in any pharmaceutically acceptable form. In certain embodiments, compounds disclosed herein are in the form of a salt, for example, a salt that comprises:

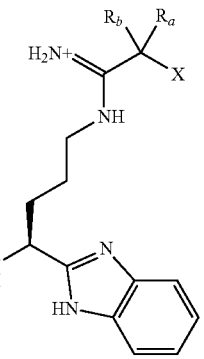

and a counter ion.

In another aspect, the invention generally relates to a pharmaceutical composition comprising a compound having the structural formula of (I):

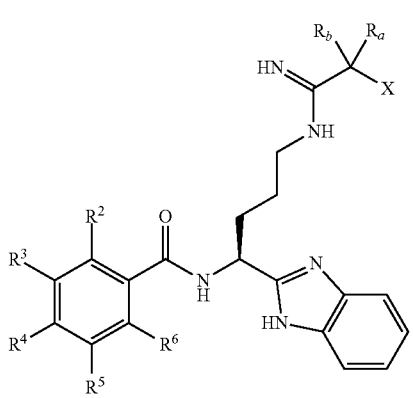

(I)

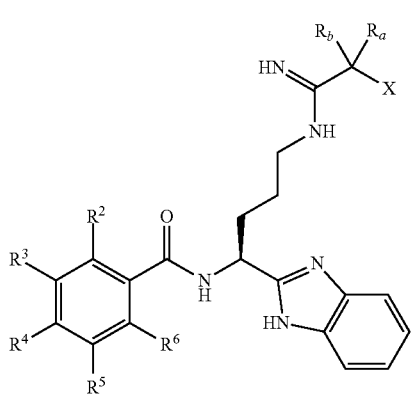

(I)

wherein
 each of $R_a$ and $R_b$ is H or D;
 X is a halogen atom;
 $R^2$ is selected from the group consisting of: H, OH or OCH$_3$;
 $R^4$ is selected from the group consisting of: H, halogen, ethynyl (HC≡C—)
 each of $R^3$ and $R^5$ is selected from the group consisting of: H, Cl, Br, I, $^i$Pr (isopropyl);
 $R^6$ is H or R; and
 each R is independently a $C_{1-6}$ alkyl,
or a pharmaceutically acceptable form thereof, effective to treat, prevent, or reduce one or more diseases or disorders, in a mammal, including a human, and a pharmaceutically acceptable excipient, carrier, or diluent.

In certain embodiments, the one or more diseases or disorders are selected from the group consisting of immune system diseases or disorders, inflammatory diseases or disorders, and cancer or related diseases or disorders.

In certain embodiments, the disease or disorder is cancer, for example, a cancer is selected from the group consisting of breast, lung, colorectal, liver, esophageal, renal, bladder and ovarian malignant tumors.

In certain embodiments, the disease or disorder is the disease or disorder is an autoimmune disease or disorder, for example, rheumatoid arthritis.

In yet another aspect, the invention generally relates to a pharmaceutical composition comprising a compound disclosed herein.

In yet another aspect, the invention generally relates to a unit dosage form comprising a pharmaceutical composition disclosed herein.

In yet another aspect, the invention generally relates to a method for treating, reducing, or preventing a disease or disorder, comprising administering to a subject in need thereof a pharmaceutical composition comprising a compound having the structural formula of (I):

wherein
 each of $R_a$ and $R_b$ is H or D;
 X is a halogen atom;
 $R^2$ is selected from the group consisting of: H, OH or OCH$_3$;
 $R^4$ is selected from the group consisting of: H, halogen, ethynyl (HC≡C—)
 each of $R^3$ and $R^5$ is selected from the group consisting of: H, Cl, Br, I, $^i$Pr (isopropyl);
 $R^6$ is H or R; and
 each R is independently a $C_{1-6}$ alkyl,
or a pharmaceutically acceptable form thereof, and a pharmaceutically acceptable excipient, carrier, or diluent, effective to treat, prevent, or reduce one or more diseases or disorders, in a mammal, including a human.

In certain embodiments, the one or more diseases or disorders are selected from the group consisting of immune system diseases or disorders, inflammatory diseases or disorders, and cancer or related diseases or disorders.

In certain embodiments, the disease or disorder is cancer. In certain embodiments, the cancer is selected from the group consisting of breast, lung, colorectal, liver, esophageal, renal, bladder and ovarian malignant tumors.

In certain embodiments, the disease or disorder is an autoimmune disease or disorder.

In yet another aspect, the invention generally relates to a method for inhibiting or inactivating protein arginine deiminase 1 (PAD1), comprising administering to a subject in need thereof a pharmaceutical composition comprising a compound having the structural formula of (I):

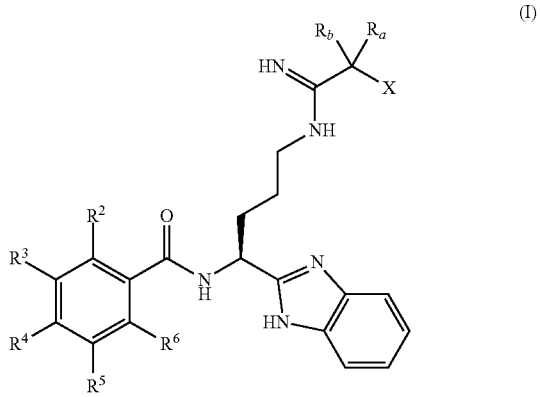

(I)

wherein
  each of $R_a$ and $R_b$ is H or D;
  X is a halogen atom;
  $R^2$ is selected from the group consisting of: H, OH or OCH$_3$;
  $R^4$ is selected from the group consisting of: H, halogen, ethynyl (HC≡C—)
  each of $R^3$ and $R^5$ is selected from the group consisting of: H, Cl, Br, I, $^i$Pr (isopropyl);
  $R^6$ is H or R; and
  each R is independently a C$_{1-6}$ alkyl,
or a pharmaceutically acceptable form thereof, and a pharmaceutically acceptable excipient, carrier, or diluent, effective to inhibit or inactivate a biological function of PAD1, in a mammal, including a human.

In yet another aspect, the invention generally relates to a molecular imaging probe having the structural formula:

$$A_F\text{-}L_F\text{-}W \quad \text{(II)}$$

wherein
  $A_F$ is a group comprising an optically detectable moiety;
  $L_F$ is a linking group; and
  W is a group derived from a compound of formula (I) capable of inhibiting or inactivating a biological function of protein arginine deiminase 1 (PAD1).

In certain embodiments, $A_F$ is a group comprising a fluorophore, for example, selected from the group consisting of xanthene dyes, cyanine dyes, coumarin dyes and bodipy dyes.

In certain embodiments, the fluorophore is a xanthene dye selected from the group consisting of fluorescein, eosins, and rhodamines.

In certain embodiments, the fluorophore is a cyanine dye, a coumarin dye or a bodipy dye.

In yet another aspect, the invention generally relates to a molecular imaging probe having the structural formula:

$$B\text{-}L_F\text{-}W \quad \text{(II)}$$

wherein
  B comprises biotin;
  $L_B$ is a linking group; and
  W is a group derived from a compound of formula (I) capable of inhibiting or inactivating a biological function of protein arginine deiminase 1 (PAD1).

In certain embodiments, the biotin is coupled to streptavidin-HRP (streptavidin protein covalently conjugated to horseradish peroxidase).

In yet another aspect, the invention generally relates to a kit comprising a molecular imaging probe disclosed herein.

In yet another aspect, the invention generally relates to a method for identifying a protein arginine deiminase 1 (PAD1) inhibitor or inactivator, comprising: performing a competitive assay wherein a test compound competes with a molecular imaging probe disclosed herein to bind to PAD1; and measuring fluorescence or fluorescence polarization to determine an amount of fluorescent PAD1 present in the test assay.

In certain embodiments, the method further comprises: performing a control assay wherein the molecular imaging probe binds to PAD1; and measuring fluorescence or fluorescence polarization to determine an amount of fluorescent PAD1 present in the control assay.

In certain embodiments, a change in fluorescence or fluorescence polarization in the assay greater than a preselected value when compared to the control assay is indicative that the test compound is an inhibitor to PAD1. In certain embodiments, the change in fluorescence in the assay is a decrease in fluorescence in the assay.

In yet another aspect, the invention generally relates to a method for birth control comprising administering to a subject in need thereof a contragestive and/or contraceptive effective amount of a composition comprising a compound having the structural formula of (I):

(I)

[Structure of compound (I) showing a benzamide core with substituents $R^2$, $R^3$, $R^4$, $R^5$, $R^6$, connected to a chain with $R_a$, $R_b$, X, NH, HN=, and a benzimidazole group]

wherein
  each of $R_a$ and $R_b$ is H or D;
  X is a halogen atom;
  $R^2$ is selected from the group consisting of: H, OH or OCH$_3$;
  $R^4$ is selected from the group consisting of: H, halogen, ethynyl (HC≡C—)
  each of $R^3$ and $R^5$ is selected from the group consisting of: H, Cl, Br, I, $^i$Pr (isopropyl);
  $R^6$ is H or R; and
  each R is independently a C$_{1-6}$ alkyl,
or a pharmaceutically acceptable form thereof.

In yet another aspect, the invention generally relates to a unit dosage formulation useful as a contragestive and/or contraceptive agent, comprising a compound disclosed herein.

EXAMPLES

To investigate the origin of its potency and PAD1 selectivity, structure-activity relationship (SAR) for 1 was investigated. Since fluoroacetamidine-containing compounds afford better isozyme-selectivity, only these compounds in the SAR analysis are discussed below. However, the activity of the chloroacetamidine-containing compounds are given in Tables 1-2 and they follow similar trends to the fluoroacetamidine-containing compounds. Briefly, 3 and 5, which replace the 2-hydroxyl with a methoxy and hydrogen substitution, respectively, exhibit similar potency for PAD1 but a significant loss in selectivity (FIG. 2B and Table 1). By contrast, 7, which lacks the iodo groups at 3- and 5-positions, shows an 87-fold drop in potency for PAD1 and a remarkable loss in selectivity. In fact, 7 is 21-fold selective for PAD4 (FIG. 2B and Table 1).

These results indicate that the 2-hydroxyl group is important for PAD1 selectivity, while the iodo groups are responsible for both potency and PAD1 selectivity. Given this data, it was initially hypothesized that the iodo groups contribute to potency and selectivity via the formation of favourable hydrophobic interactions with PAD1. However, 9, which replaces the iodo groups with hydrophobic and isosteric isopropyl groups, exhibited almost identical activity as 7, indicating that the iodo groups are involved in halogen bond formation with PAD1.

To validate the possible formation of halogen bonds between compound 1 and PAD1, 11-14 were synthesized with bromo- and chloro substitutions at the 3- and 5-positions. Since the positive potential on halogens decreases in the order: I>Br>Cl, a hallmark feature is that the strength of a halogen bond follows the same order. Therefore, if the potency and selectivity of 1 is due to formation of an halogen bond with PAD1, they are expected to decrease in the order: I>Br>Cl. In fact, a gradual decrease was observed in both potency and selectivity upon replacement of the iodo groups. For example, 11 is 3-fold less potent than 1 and exhibits only 25-fold PAD1 selectivity, whereas 13 is 8-fold less potent than 1 and exhibits only 10-fold selectivity for PAD1 (FIG. 2B and Table 1).

Additionally, the $k_{inact}$ and $K_I$ values for 1, 11 and 13 reveal that while these compounds share similar inactivation rates ($k_{inact}$), there was a gradual decrease in binding affinity, as measured by an increase in $K_I$, as one goes from 1 (12.5 μM) to 11 (54.8 μM) to 13 (124.5 μM) (Table S2). These observations clearly indicate that the potency and selectivity of 1 originates from the iodo groups that form halogen bonds with PAD1. Although different halogens are also expected to alter the $pK_a$ of the 2-hydroxyl, and thereby enhance hydrogen bond formation of this group to W347, the potency of the inhibitor is expected to increase as the electronegativity of the halogen atoms increase.

The halogen-dependent change in potency of the PAD1 inhibitors was further confirmed using an activity-based protein profiling (ABPP) assay that uses the PAD-targeted probe, rhodamine-conjugated F-amidine (RFA, FIG. 2C). (Luo, et al. *J. Am. Chem. Soc.* 2006, 128, 14468-14469.)

Figure 9:
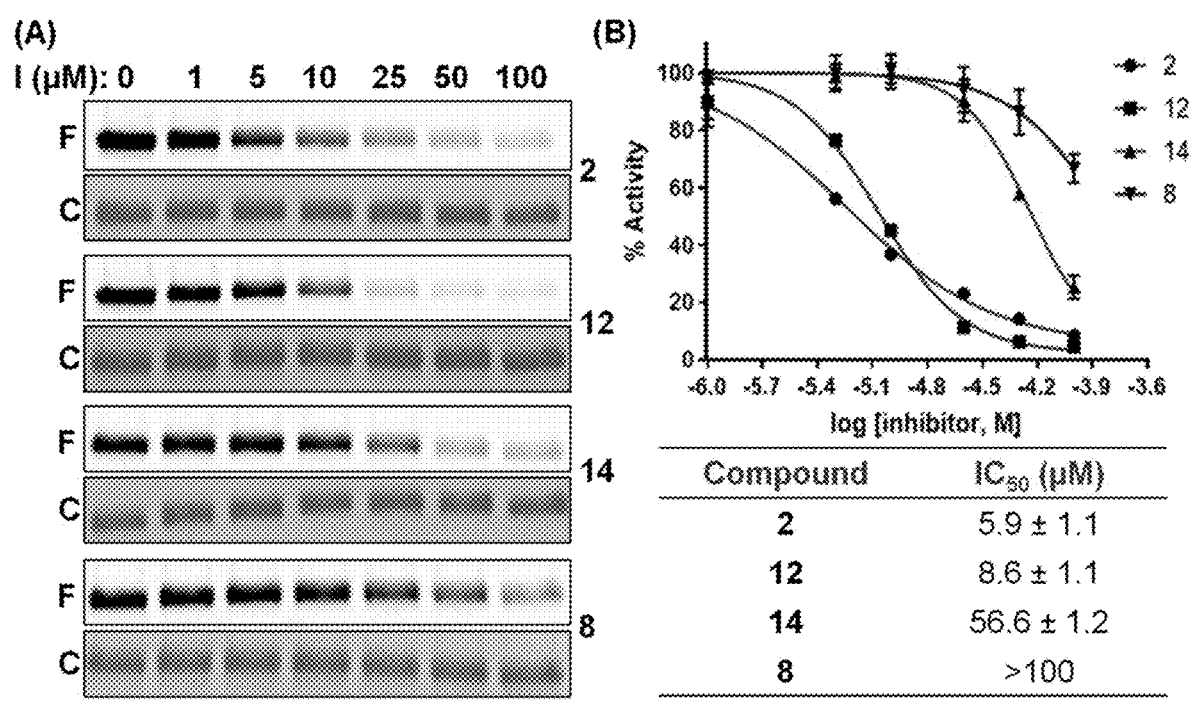
FIG. 9. (A) Labelling of PAD1 by RFA in the presence of compounds 2, 12, 14 and 8. I, F and C refers to the inhibitor, fluorograph and coomassie stain, respectively. (B) Determination of $IC_{50}$ of compounds 2, 12, 14 and 8 from the inhibition of RFA-labelling of PAD1.

RFA enables the covalent modification and fluorescent labelling of PADs with the help of its fluoroacetamidine and rhodamine moieties, respectively. However, in the presence of a PAD inhibitor that can compete for binding to the active site, RFA labelling is inhibited. (Mondal, et al. *ACS Chem. Biol.* 2018, 13, 1057-1065.) Using this assay, 1 inhibited RFA labelling of PAD1 with an $IC_{50}$ of 18 μM (FIG. 2C). Interestingly, compounds 11, 13 and 7 with bromo-, chloro- and hydrogen substitutions at the 3- and 5-positions, respectively, exhibit a gradual decrease in the potency of inhibiting RFA labelling (FIG. 2C). Similar results were obtained with the chloroacetamidine-containing compounds 2, 12, 14 and 8 (FIG. 9).

Having established their importance, next studied was whether both iodo groups contribute to potency and selectivity. Although a structure of PAD1 in complex with 1 would address this issue, several attempts to crystallize this complex were unsuccessful. Therefore, 15-18 were synthesized which contain an iodo group at either the 3- or 5-position (FIG. 2A). Notably, 15 and 17 are 7- and 35-fold less potent than the parent compound 1. Furthermore, 15 and 17 were only 13- and 3-fold selective for PAD1 (FIG. 2B and Table 1). These results indicated that both iodines were important for potency and PAD1 selectivity. Moreover the data indicate that the 3-iodine places the iodine at the 5-position in a suitable position to form a halogen bond. Since electron withdrawing substituents increase the halogen bond strength by increasing the positive potential on halogen, we synthesized 19 and 20 which contain a fluoro substitution in the parent scaffold (FIG. 2A). 19 exhibited improved potency ($k_{inact}/K_I$=13250±2870 M$^{-1}$ min$^{-1}$) and was 44-fold selective for PAD1 (FIG. 2B and Table 1).

Figure 10:
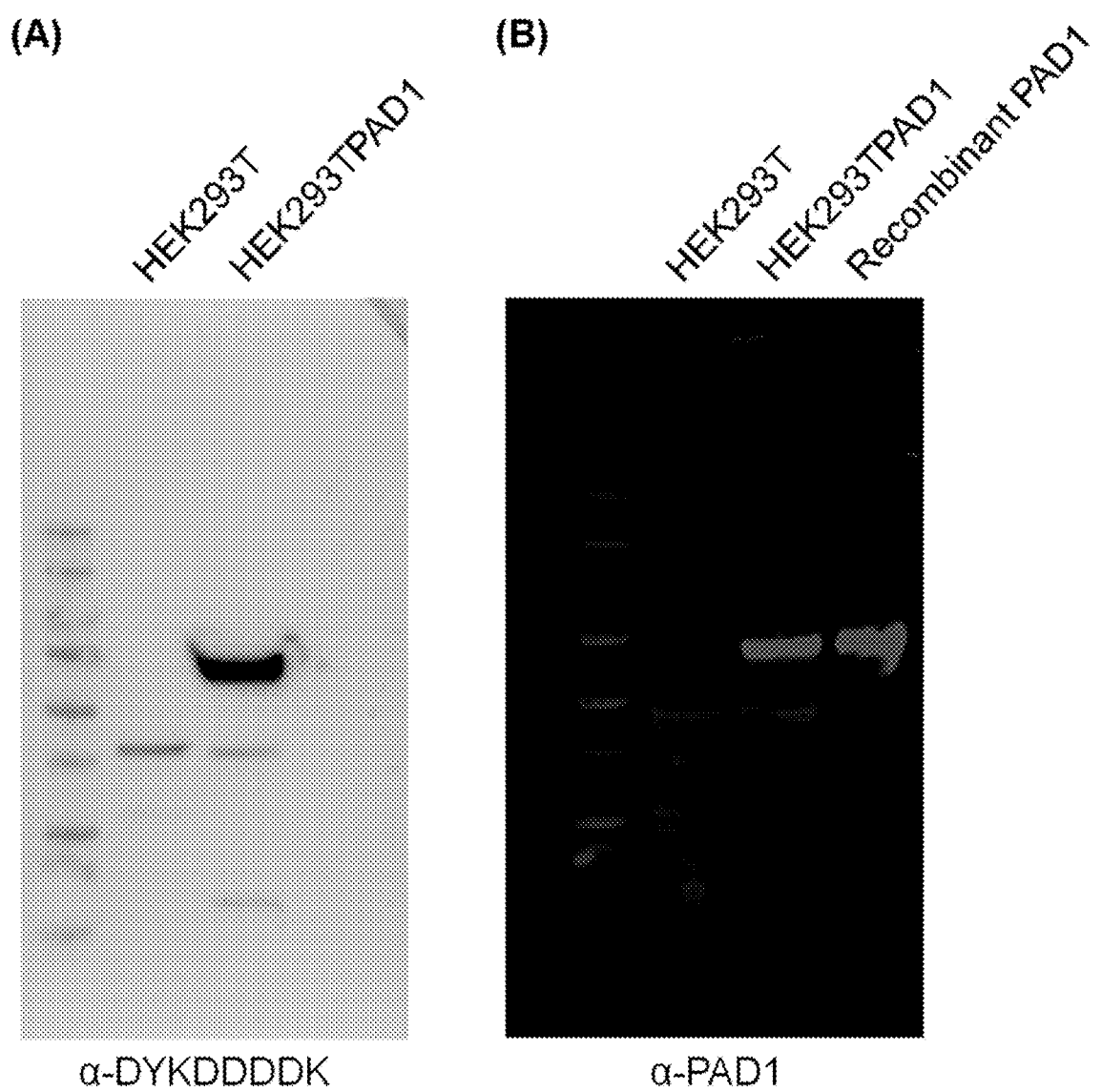
FIG. 10. Overexpression of PAD1 in HEK293TPAD1 cells as detected by Western blot analysis of the cell lysates using anti-FLAG (α-DYKDDDDK) (A) and anti-PAD1 (B) antibodies. HEK293T cell lysates and recombinant PAD1 were used as negative and positive controls, respectively.
Figure 11:
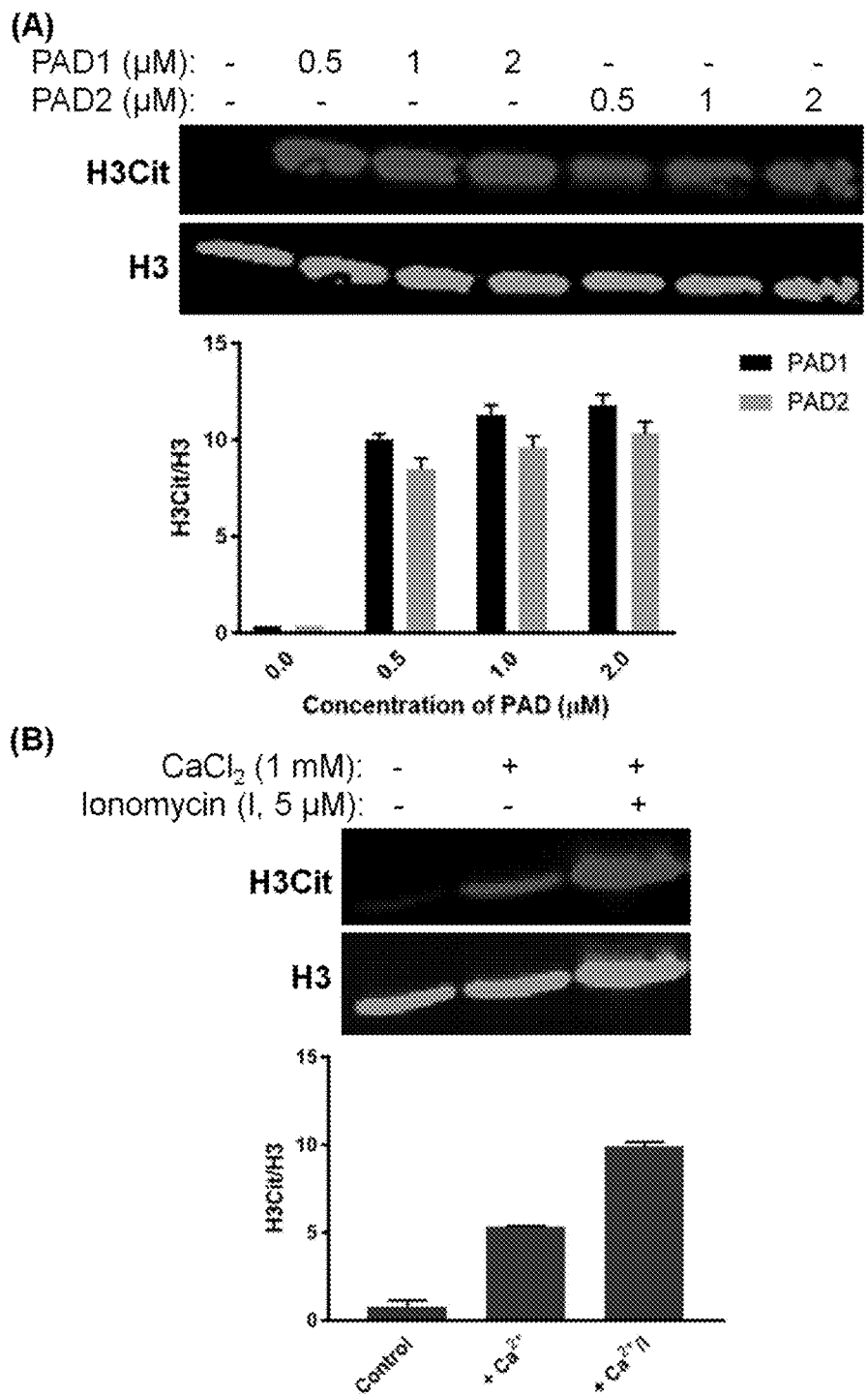
FIG. 11. (A) Histone H3 citrullination in HEK293T cell lysates spiked with various concentrations of PAD1 and PAD2. Assay conditions: Lysate (2 mg/mL), PAD (desired concentration), 100 mM TRIS, 50 mM NaCl, 10 mM $CaCl_2$, pH 7.4, 37° C., 3 h. PAD2 was used as a positive control. (B) Histone H3 citrullination in HEK293TPAD1 cells in the presence of calcium and plus/minus a calcium ionophore, ionomycin (I).

Next evaluated was the cellular potency of these inhibitors in PAD1-overexpressing HEK293TPAD1 cells (see FIG. 10 for PAD1 expression). It was found that PAD1 citrullinates histone H3 at the 2, 8 and 17 positions in vitro and in HEK293TPAD1 cells in the presence of calcium (FIG. 11).

Figure 3:
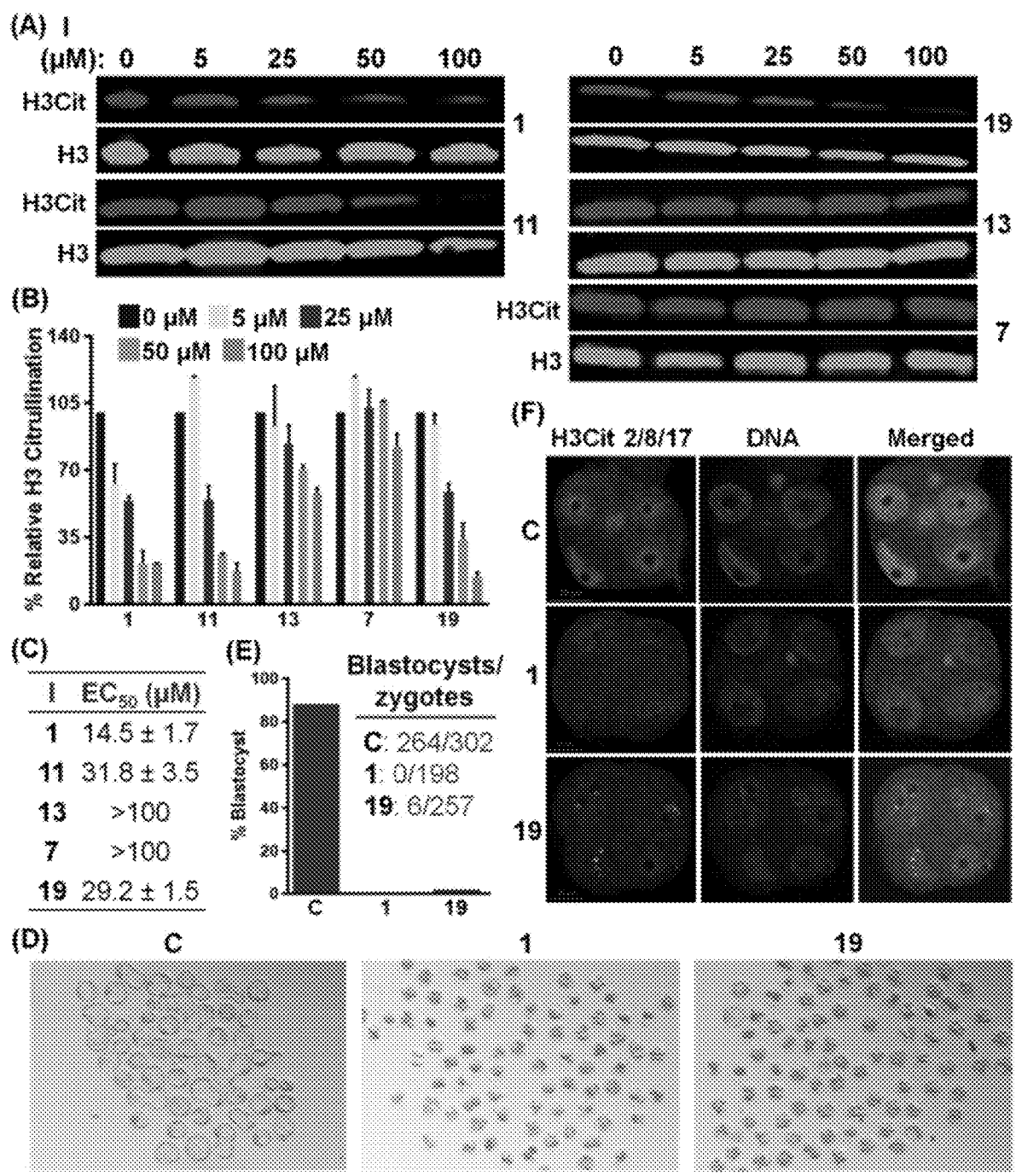
FIG. 3. (A-C) Inhibition of histone H3 citrullination in HEK293TPAD1 cells by 1, 7, 11, 13 and 19. I refers to inhibitor. (D, E) Effect of 1 and 19 on early embryo development. Development of pronuclear mouse zygotes into blastocysts was dramatically arrested at the morula stage in the presence of 1 and 19. Panel D shows the representative embryos observed by light microscopy after 100 hours of culture. C refers to the DMSO-treated control. (F) Confocal microscopy of mouse embryos at the 4-cell stage, indicating the inhibition of histone H3 citrullination by 1 and 19. anti-Histone H3Cit2/8/17 antibody and DAPI were used for immunofluorescence staining of citrullinated histone H3 and DNA, respectively. C refers to control.
Figure 12:
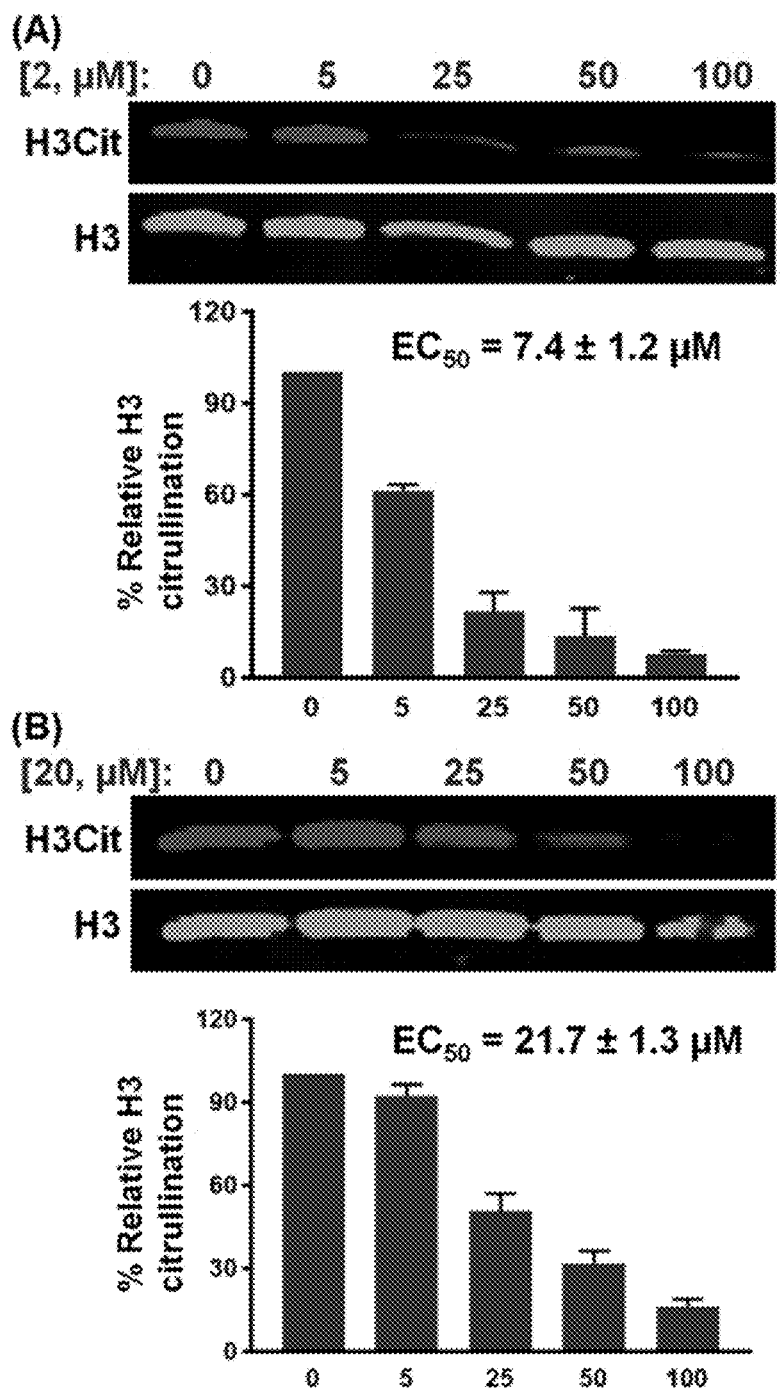
FIG. 12. Inhibition of histone H3 citrullination in HEK293TPAD1 cells by compounds 2 (A) and 20 (B). I refers to the inhibitor concentrations in μM. Quantification of each band yielded the H3Cit/H3 ratio, from which % relative H3 citrullination was calculated. Cells were treated with various concentrations of inhibitor in the presence of 1 mM $CaCl_2$ and 5 μM ionomycin (calcium ionophore) in 1×HBS (pH 7.4) at 37° C. for 3 h.
Figure 13:
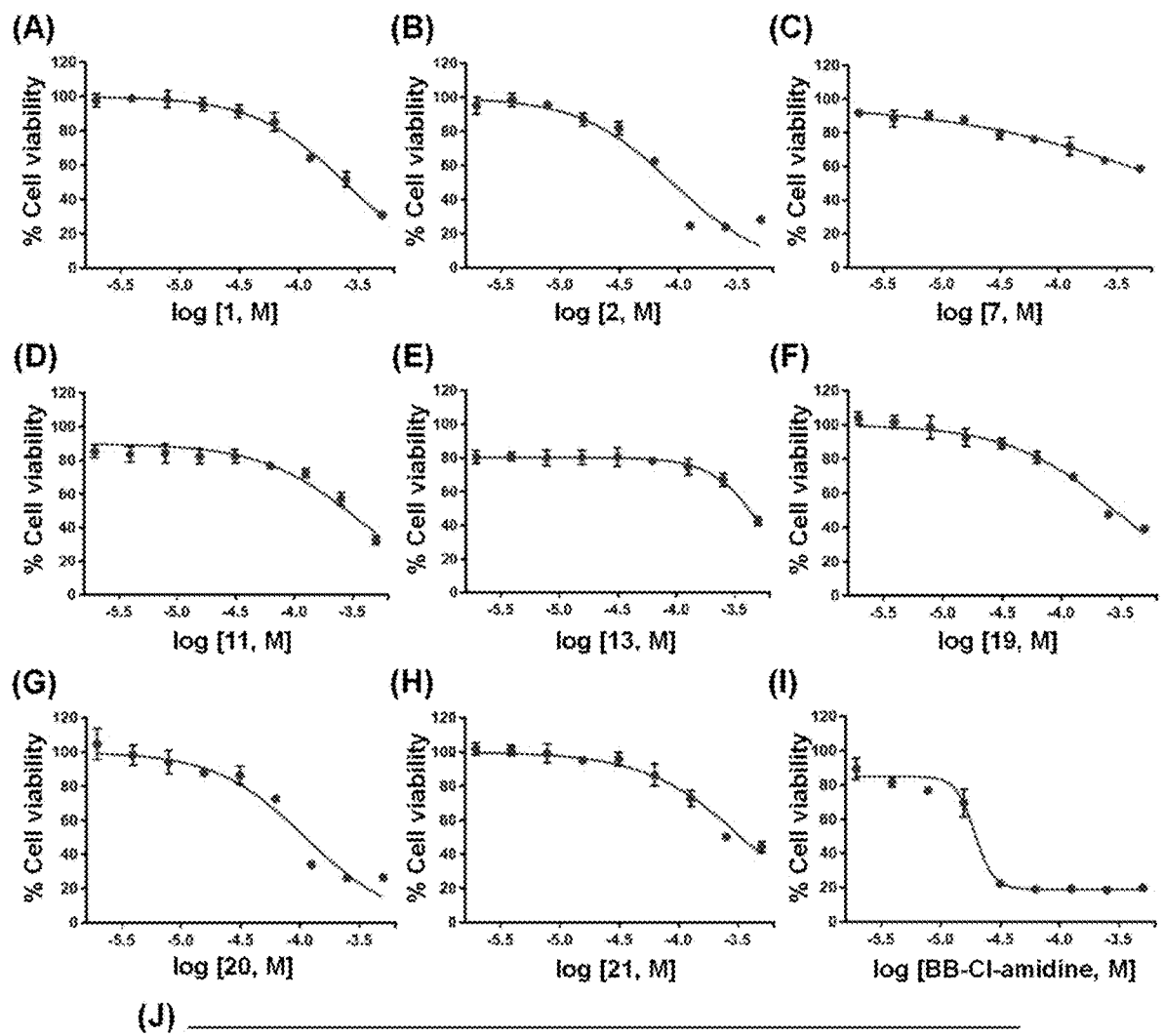
FIG. 13. Inhibition of cell-proliferation of HEK293TPAD1 cells by compounds 1 (A), 2 (B), 7 (C), 11 (D), 13 (E), 19 (F), 20 (G), 21 (H) and BB-Cl-amidine (I). The $EC_{50}$ values are listed in the table (J). Potency refers to the efficiency of these compounds to inhibit histone H3 citrullination in HEK293TPAD1 cells. Comparison of the $EC_{50}$ values for cytotoxicity and potency (efficacy index) indicates that these compounds inhibit histone H3 citrullination in HEK293TPAD1 cells without causing significant toxicity.
Figure 14:
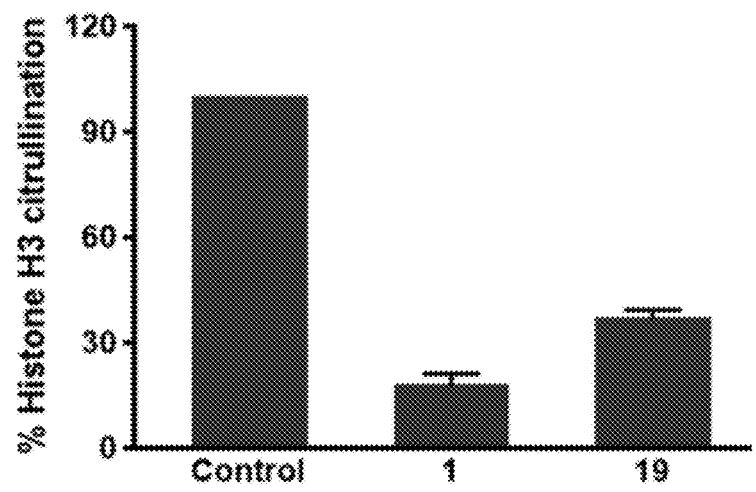
FIG. 14. Quantification of inhibition of histone H3 citrullination in mice embryos by 1 and 19. Mouse embryos (4-cell) cultured with DMSO (control), 1 or 19 (100 μM) were incubated with anti-histone H3Cit2/8/17 and DAPI as immunofluorescence staining agents for citrullinated histone H3 and DNA, respectively. Both 1 and 19 significantly inhibit histone H3 citrullination.

Compounds 1 and 19 inhibited histone H3 citrullination in a dose-dependent manner with $EC_{50}$ values of 14.5 and 31.8 μM, respectively (FIG. 3A-C). In contrast to the 6-7-fold higher in vitro potency, chloroacetamidine-containing compounds 2 and 20 exhibit only 1.3-2-fold higher activity in cells compared to 1 and 19 (FIG. 12). These results indicate that despite having a lower in vitro potency, fluoroacetamidine-containing compounds can exhibit similar cellular activity to chloroacetamidine-containing compounds, likely due to their lower off-target toxicity. Interestingly, the cellular activities of 1, 7, 11 and 13 for the inhibition of histone H3 citrullination in HEK293TPAD1 cells also follow the order 1>11>13>7 (FIG. 3A-C), paralleling their in vitro potencies (FIG. 1B). It is recognized, however, that this trend may also be due to a combination of potency and cell permeability as the lipophilicity of these compounds follows the same order. Notably, the Efficacy Index (the ratio of cytotoxicity to $EC_{50}$) of 1 and 19 are 17 and 10, respectively, indicating that these compounds inhibit cellular PAD1 without causing significant toxicity (FIG. 13).

PAD1 is the predominant nuclear PAD in early embryos and PAD1-catalyzed histone H3 citrullination is essential for early embryo development. (Zhang, et al. *Sci. Rep.* 2016, 6, 38727.) Depletion of PAD1 in mouse zygotes does not affect oocyte maturation or pronuclear formation but dramatically arrested early embryo development at the 4-8-cell stage. Encouraged by the inhibition of histone H3 citrullination in HEK293TPAD1 cells, 1 and 19 were evaluated in pronuclear (PN) zygotes. Treatment with 1 and 19 led to dramatic arrest of embryo development at the morula stage, while 87% of the control zygotes progressed to the blastocyst stage (FIG. 3D, E). Furthermore, immunofluorescence and confocal microscopy of the embryos at the 4-cell stage indicate that 1 and 19 dramatically inhibit histone H3 citrullination that correlates with the arrest of embryo development (FIGS. 3F and S10). These observations indicate that 1 and 19 can inhibit endogenously expressed cellular PAD1 in mouse zygotes.

Figure 4:
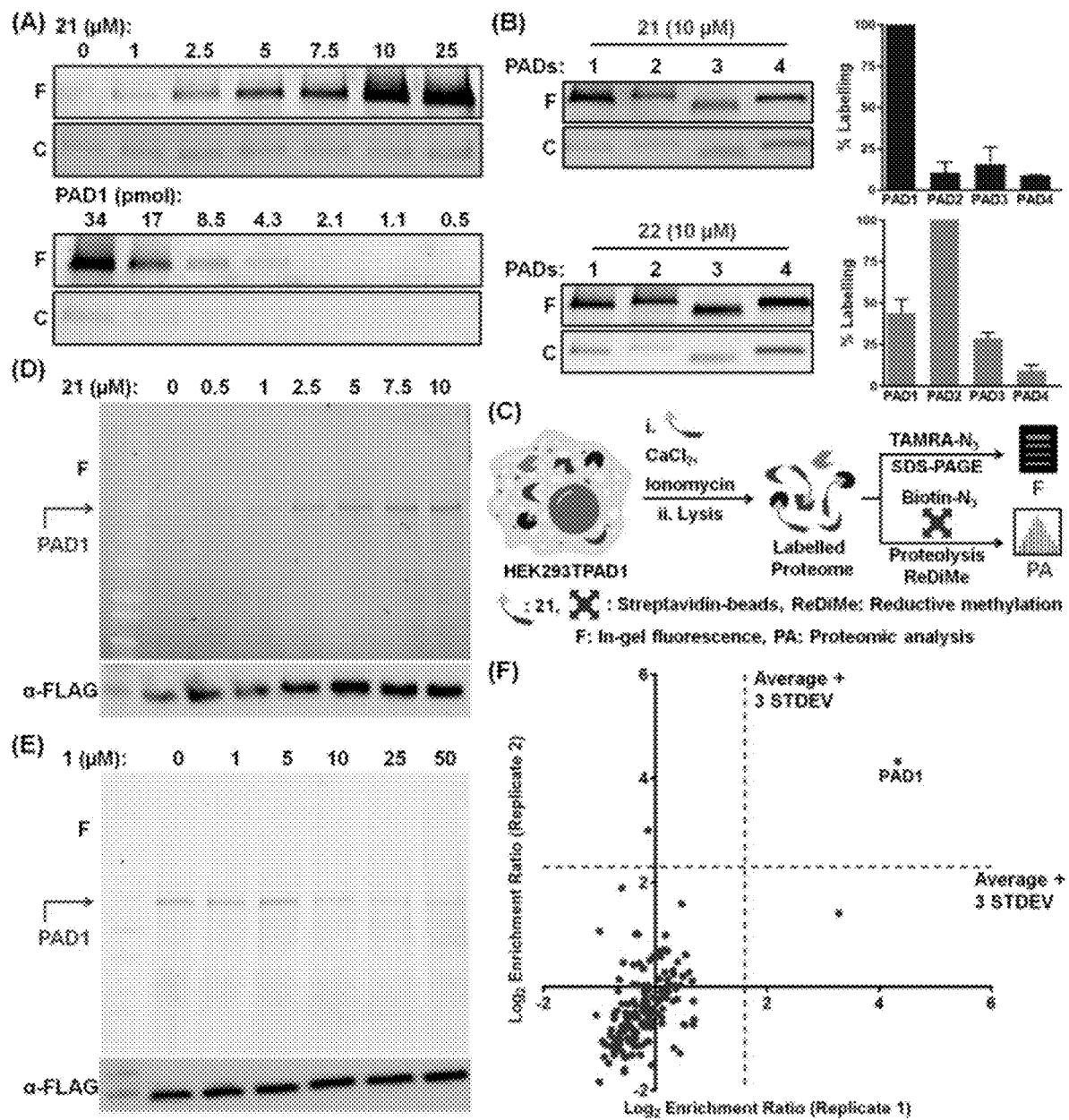
FIG. 4. (A) Dose-response (top) and limit of detection (bottom) studies of labelling of recombinant PAD1 by 21. F and C refer to the fluorograph and coomassie stain, respectively. (B) Selectivity of labelling of PADs1-4 by 21 and 22. (C) Schematic representation of labelling of PAD1 by 21 in HEK293TPAD1 cells. (D) Dose-response of labelling of PAD1 in HEK293TPAD1 cells by 21. An immunoblot using anti-FLAG antibody is used as a loading control. (E) Target engagement assay in HEK293TPAD1 cells using 21 (5 μM) and increasing concentrations of 1. (F) Selective enrichment of PAD1 in HEK293TPAD1 cells by 21. Enrichment ratio is determined from the proportion of heavy and light formaldehyde labelling of probe-treated and control samples, respectively.
Figure 5:
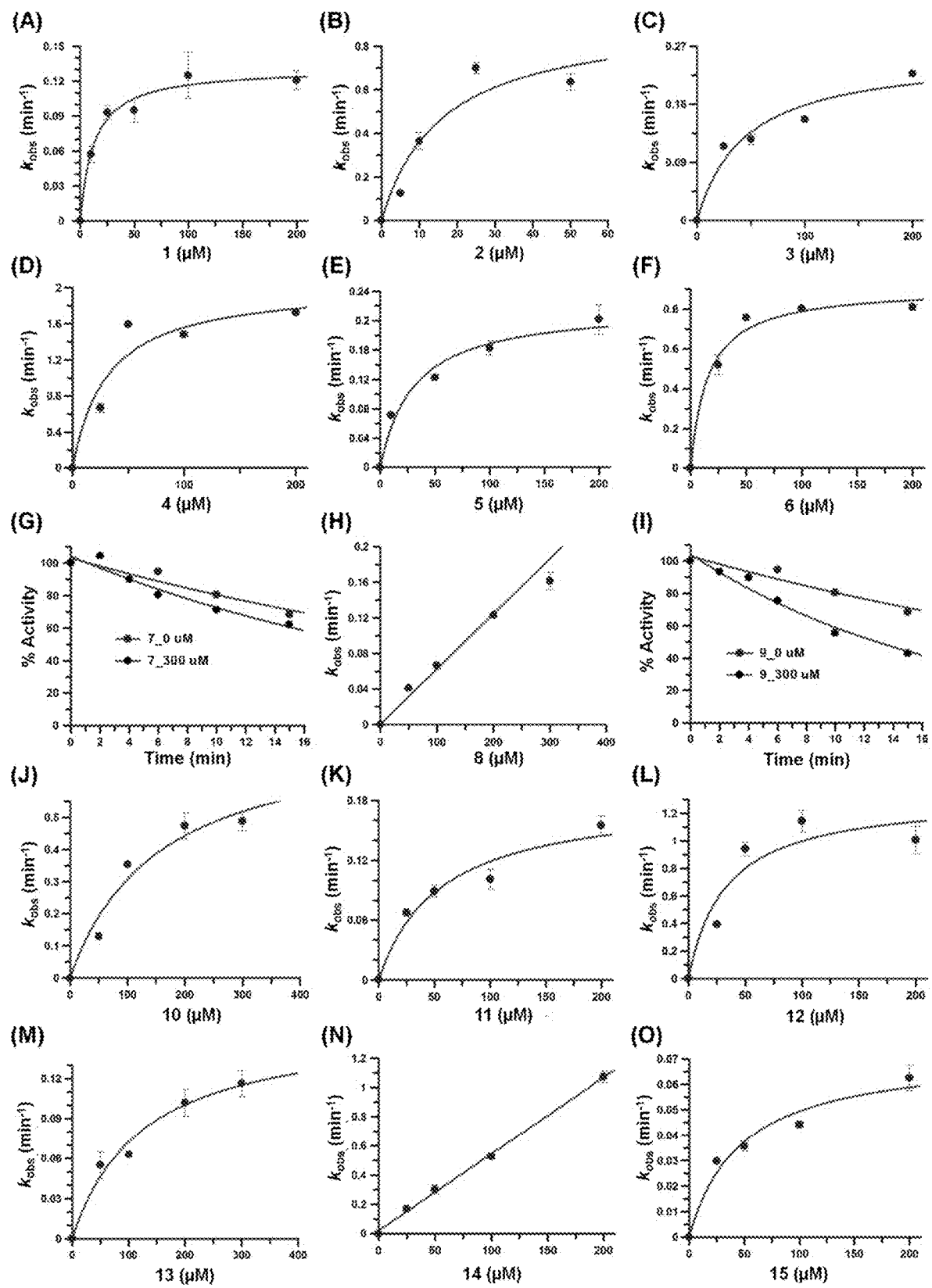
FIG. 5. Inhibition of PAD1 by compounds 1-22. 1 (A), 2 (B), 3 (C), 4 (D), 5 (E), 6 (F), 7 (G), 8 (H), 9 (I), 10 (J), 11 (K), 12 (L), 13 (M), 14 (N), 15 (O), 16 (P), 17 (Q), 18 (R), 19 (S), 20 (T), 21 (U) and 22 (V).
Figure 5:
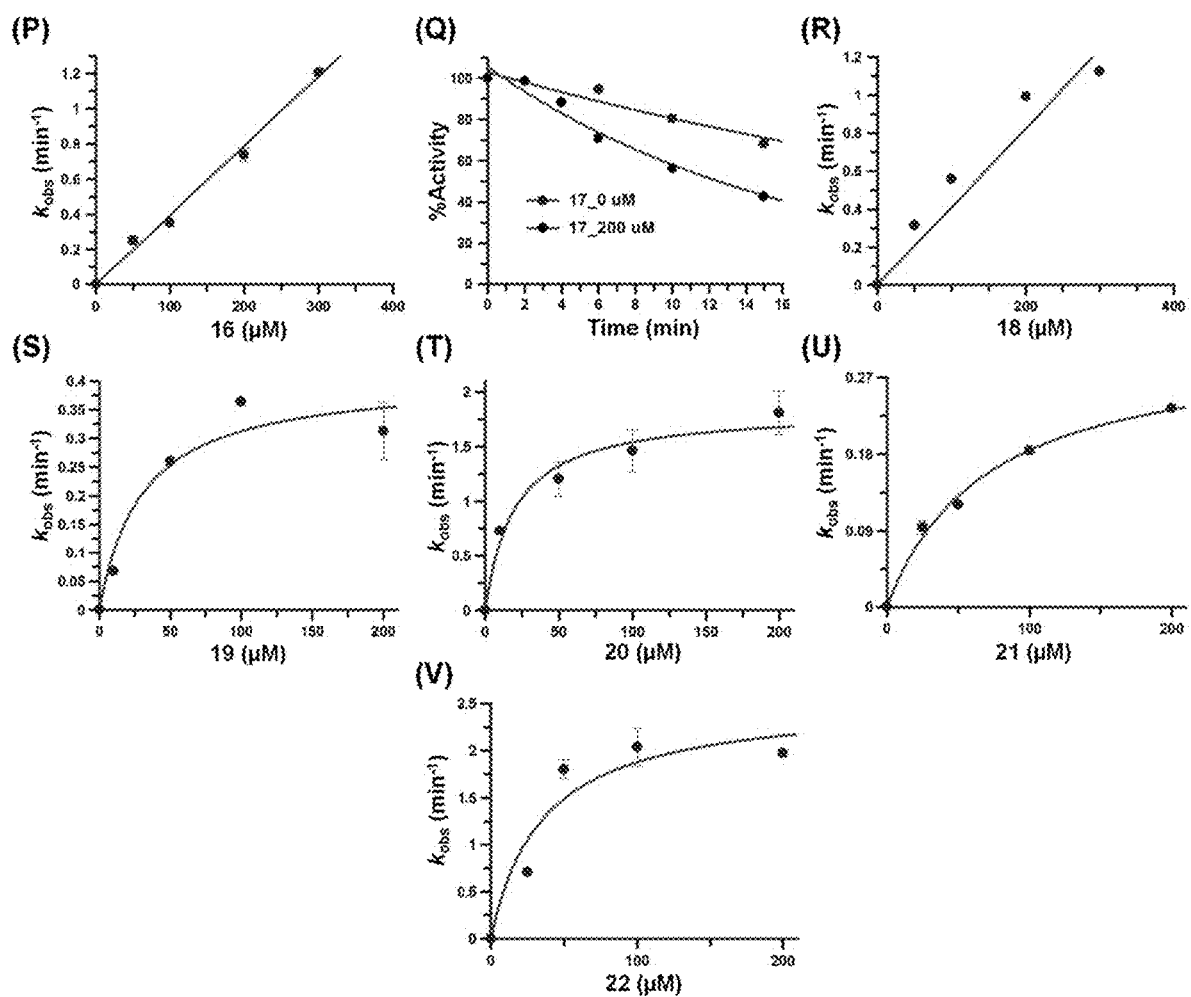
Figure 6:
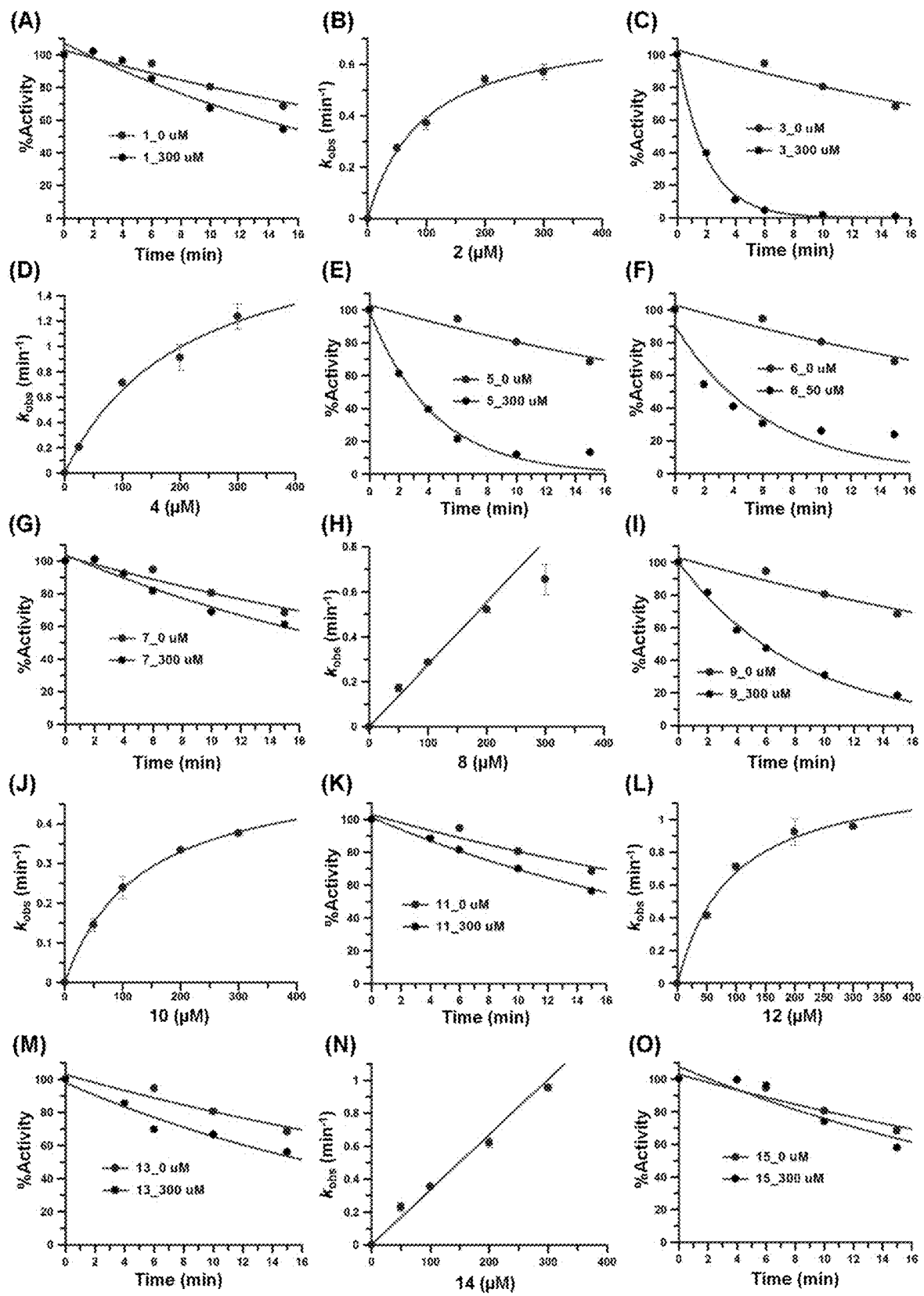
FIG. 6. Inhibition of PAD2 by compounds 1-22. 1 (A), 2 (B), 3 (C), 4 (D), 5 (E), 6 (F), 7 (G), 8 (H), 9 (I), 10 (J), 11 (K), 12 (L), 13 (M), 14 (N), 15 (O), 16 (P), 17 (Q), 18 (R), 19 (S), 20 (T), 21 (U) and 22 (V).
Figure 6:
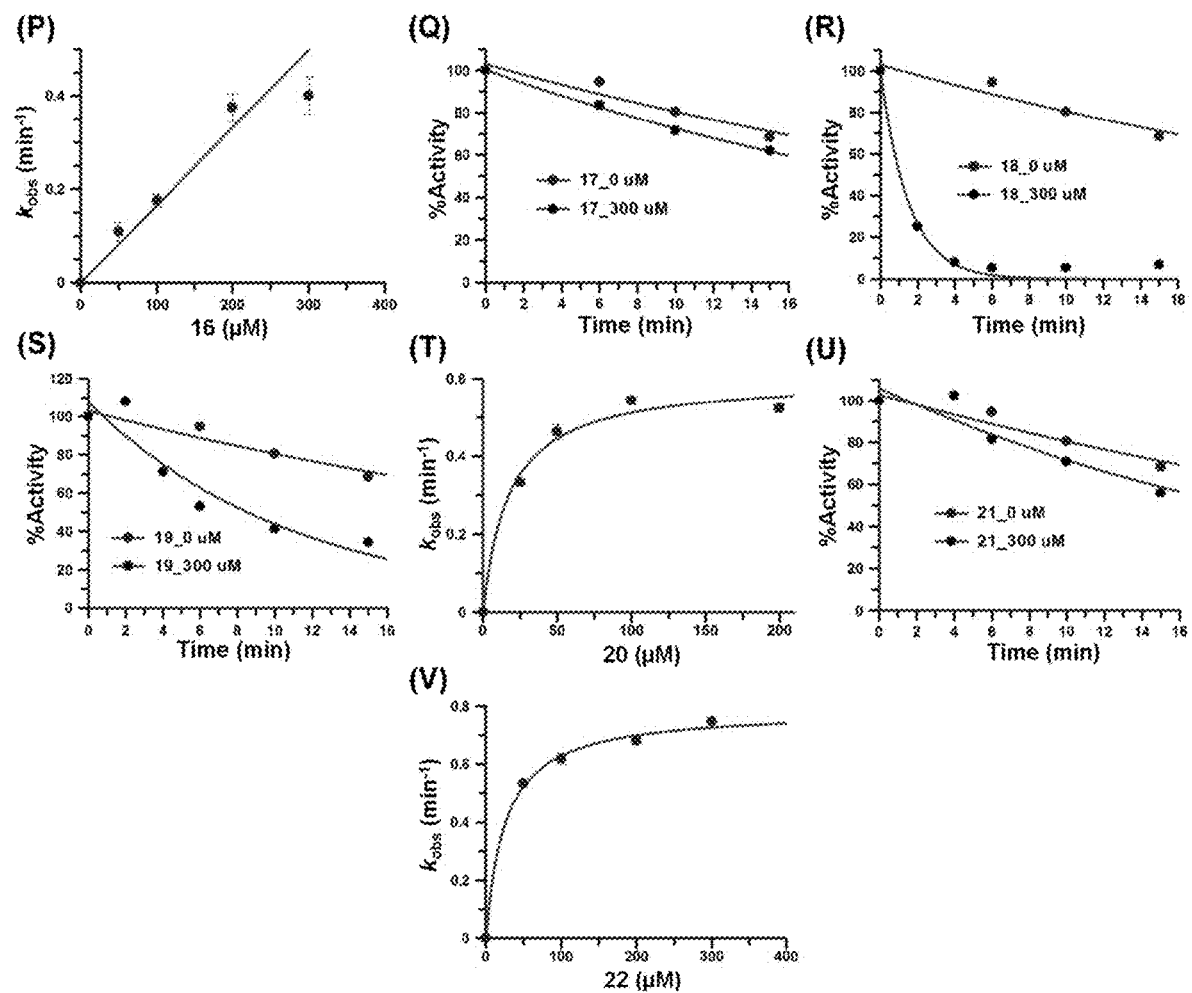
Figure 7:
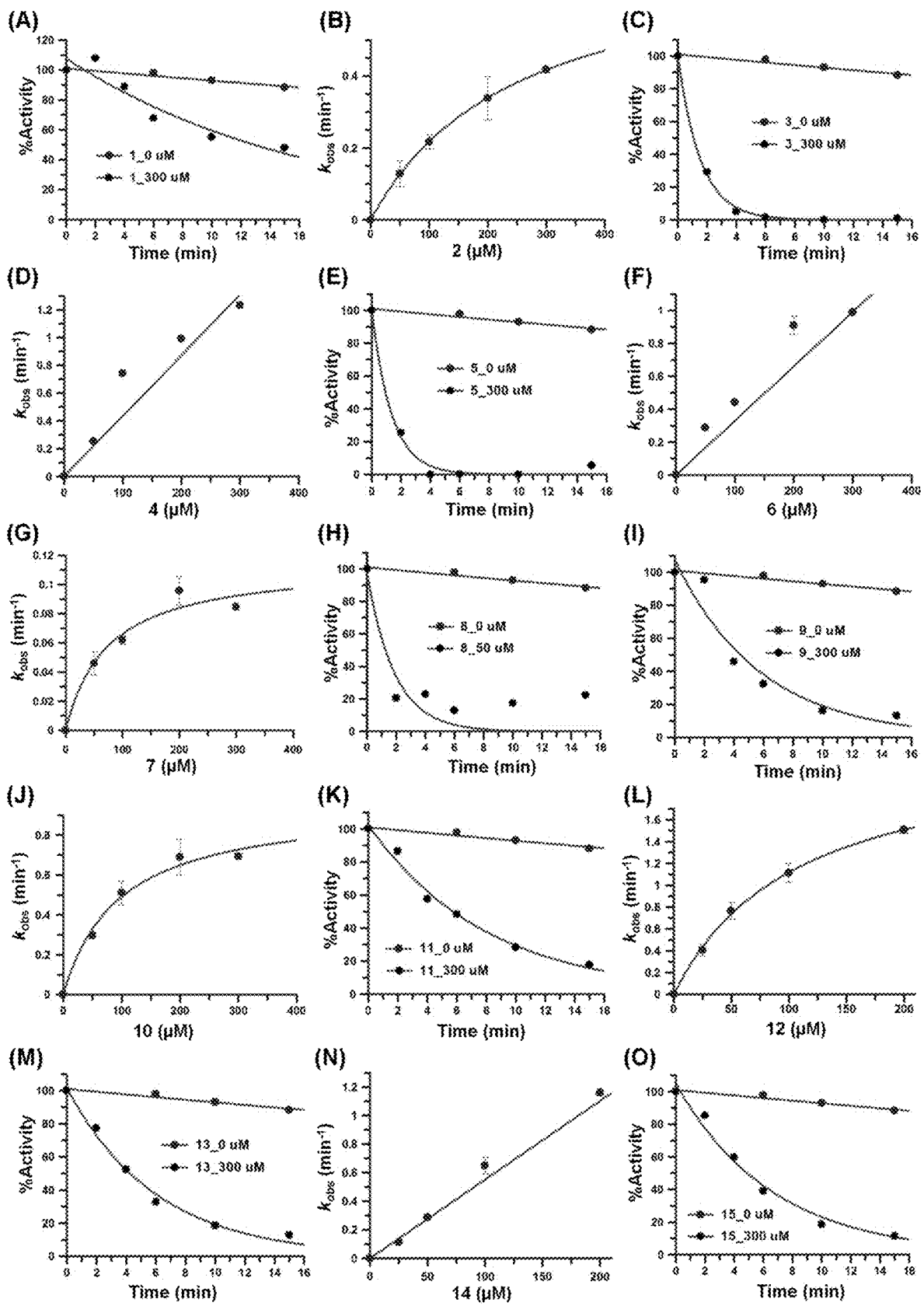
FIG. 7. Inhibition of PAD3 by compounds 1-22. 1 (A), 2 (B), 3 (C), 4 (D), 5 (E), 6 (F), 7 (G), 8 (H), 9 (I), 10 (J), 11 (K), 12 (L), 13 (M), 14 (N), 15 (O), 16 (P), 17 (Q), 18 (R), 19 (S), 20 (T), 21 (U) and 22 (V).
Figure 7:
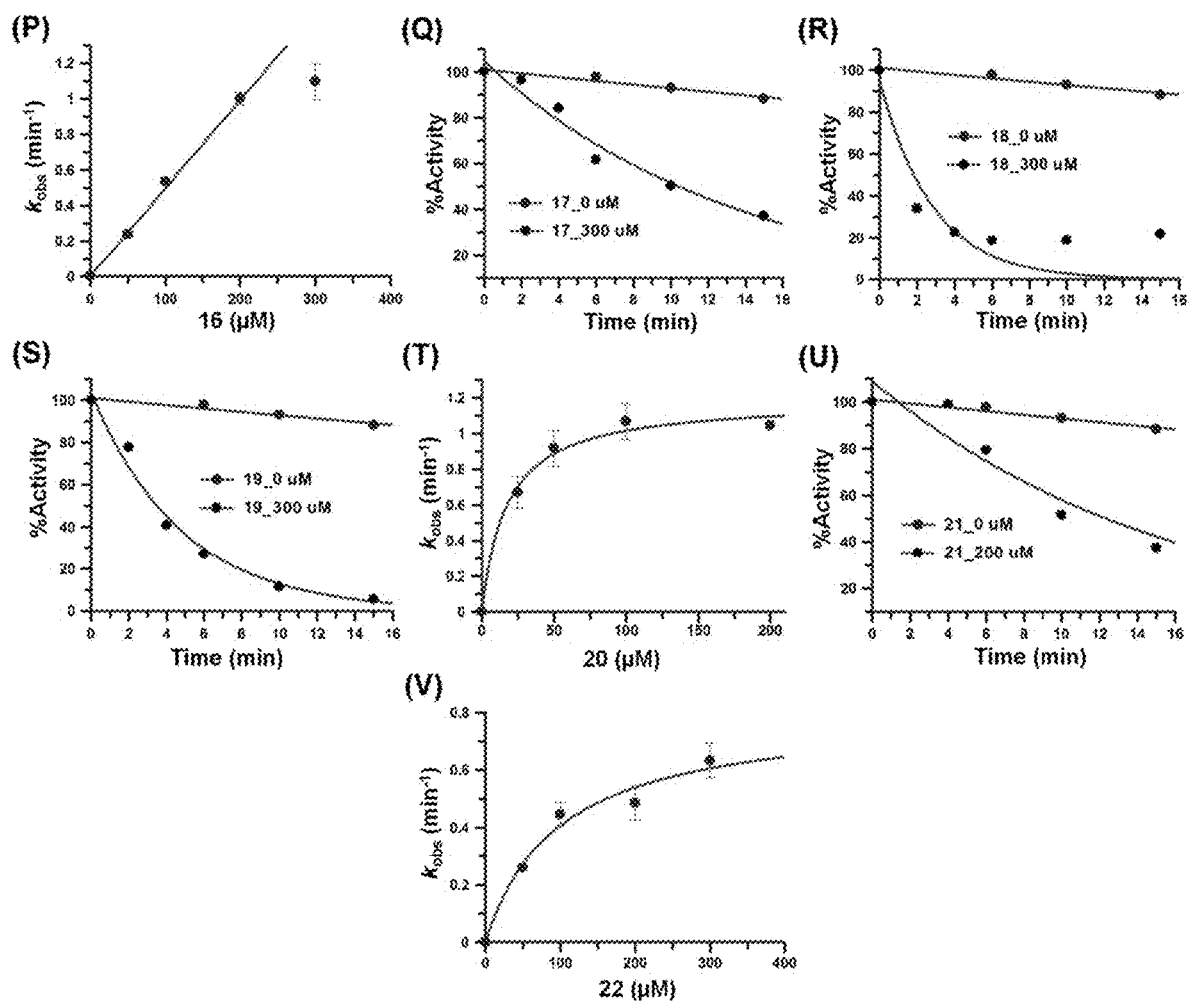
Figure 8:
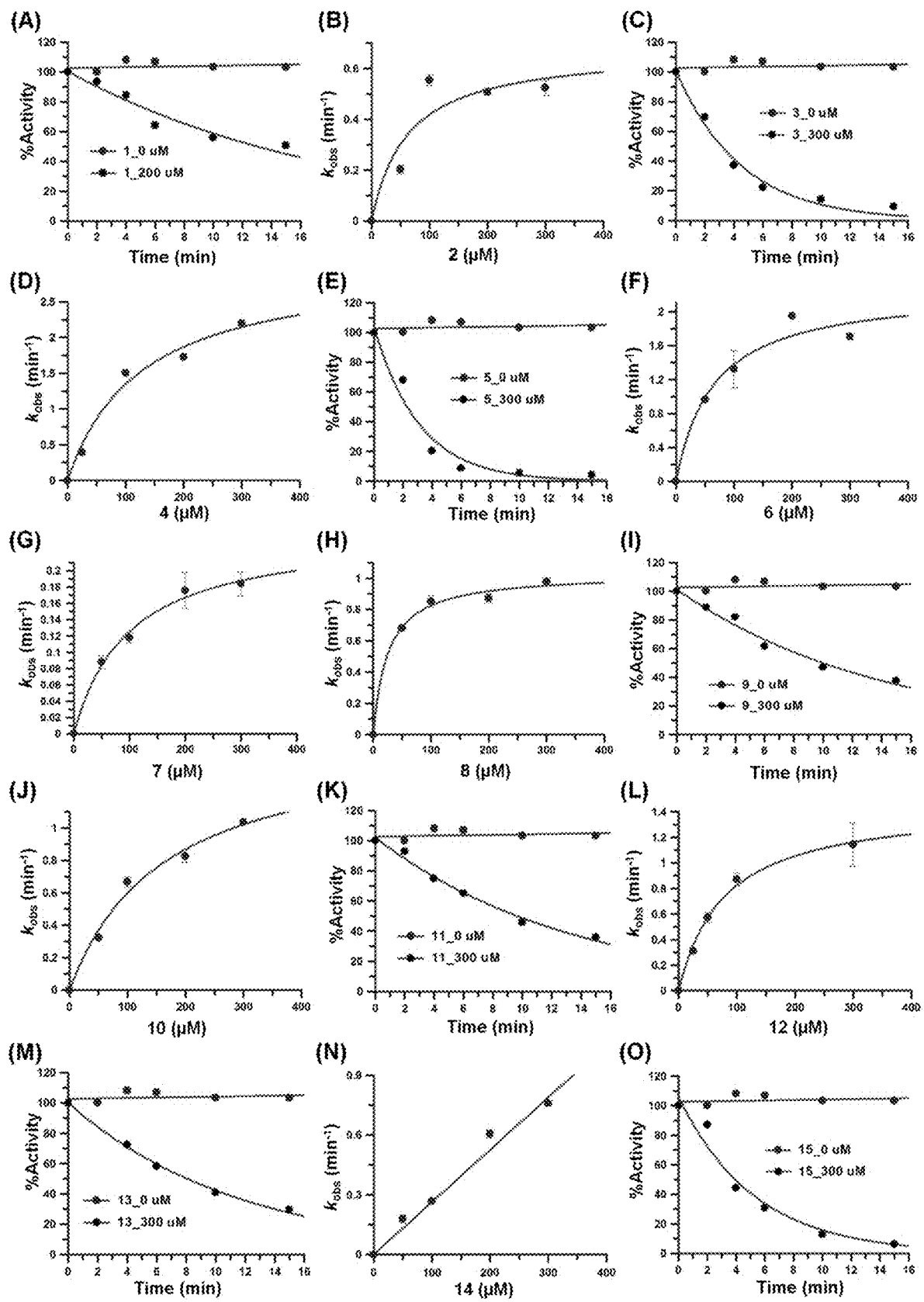
FIG. 8. Inhibition of PAD4 by compounds 1-22. 1 (A), 2 (B), 3 (C), 4 (D), 5 (E), 6 (F), 7 (G), 8 (H), 9 (I), 10 (J), 11 (K), 12 (L), 13 (M), 14 (N), 15 (O), 16 (P), 17 (Q), 18 (R), 19 (S), 20 (T), 21 (U) and 22 (V).
Figure 8:
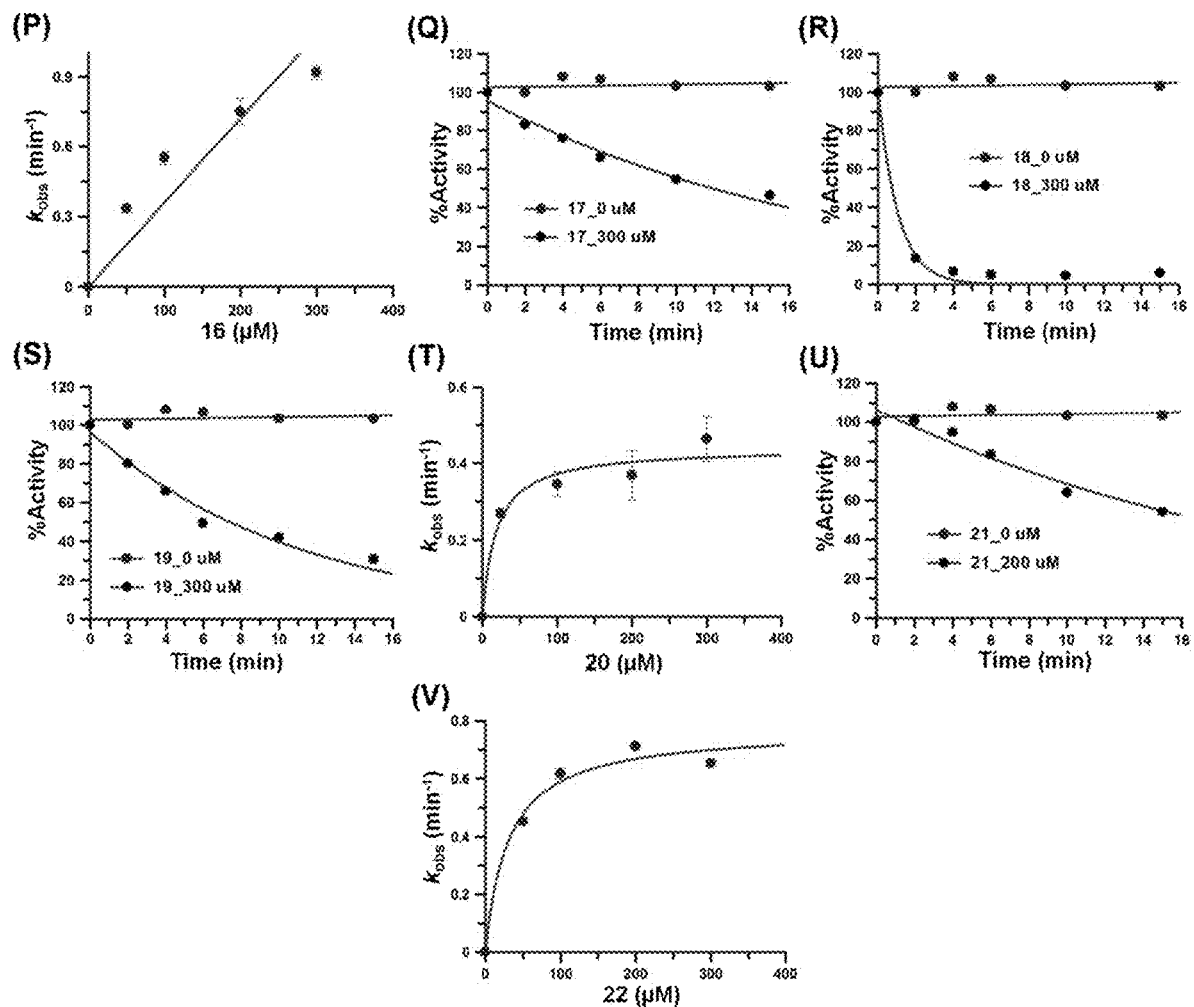
Figure 15:
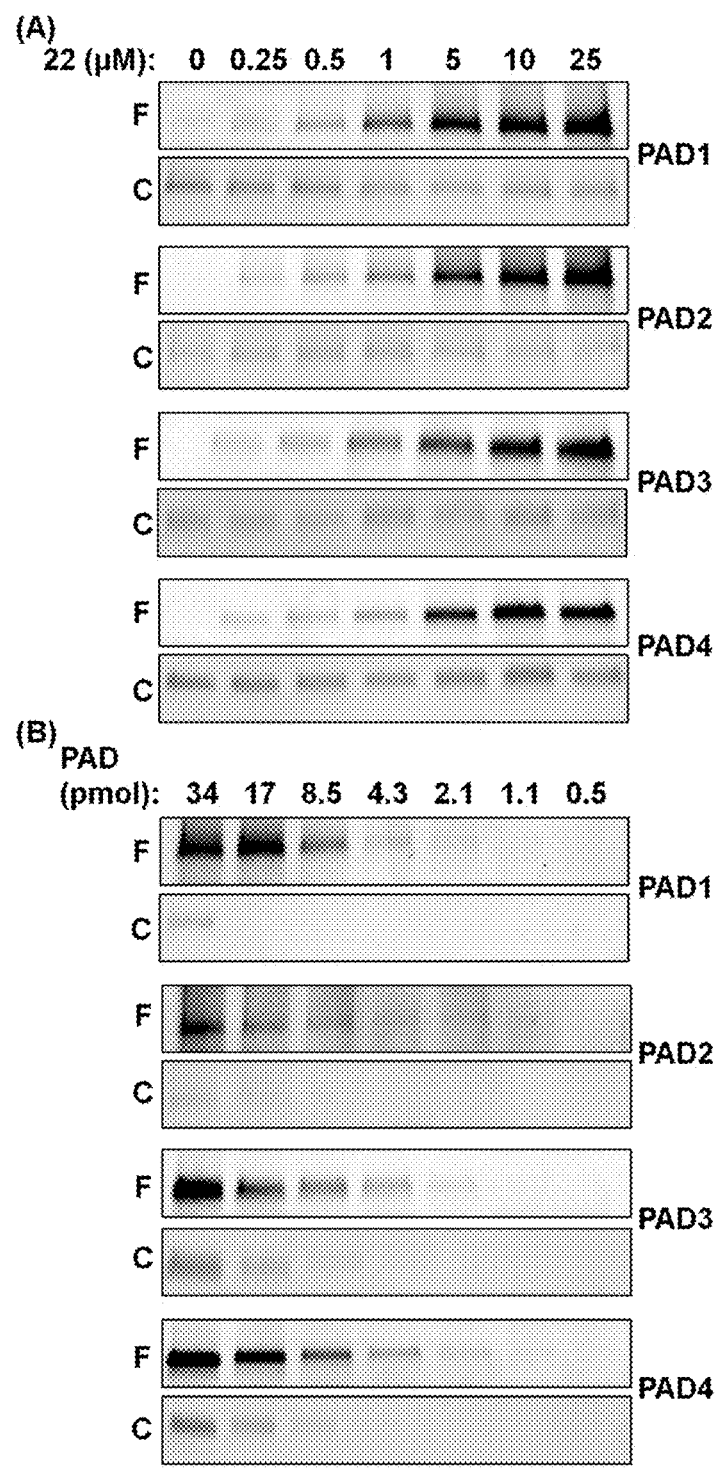
FIG. 15. (A) Dose-dependent in vitro labelling of PADs by compound 22. (B) Limit of detection of PADs by compound 22. 1.4 μM of PAD and 10 μM of 22 were used for the dose-dependence and limit of detection studies, respectively. F and C refers to fluorograph and Coomassie stain, respectively.

Using this inhibitor scaffold, 21 and 22 (FIG. 2A) were developed, which include an alkyne handle that can be conjugated with fluorescent (TAMRA)- or biotin-containing reporter tags using the copper-catalyzed alkyne-azide cycloaddition (CuAAC) reaction for ABPP-based applications. Similar to the parent compounds, 21 and 22 exhibited almost 34- and 9-fold selectivity for PAD1 over the other PADs (FIG. 2B and Table 1). When conjugated with fluorescent TAMRA-N$_3$ using CuAAC, 21 dose-dependently labels recombinant PAD1 and the limit of detection (LOD) of recombinant PAD1 by 21 is 4.3 pmol (FIG. 4A, see top and bottom for dose-dependence and LOD, respectively). Similar results were obtained with 22 (FIG. 15). Fluorescence intensities, normalized against the Coomassie stain intensities, for the labelling of PADs1-4 by 21 and 22 indicate that 21 exhibits significant selectivity for PAD1, whereas 22 was less selective (FIG. 4B). Therefore, 21 was used for fluorescent labelling of PAD1 in HEK293TPAD1 cells (FIG. 4C).

Figure 16:
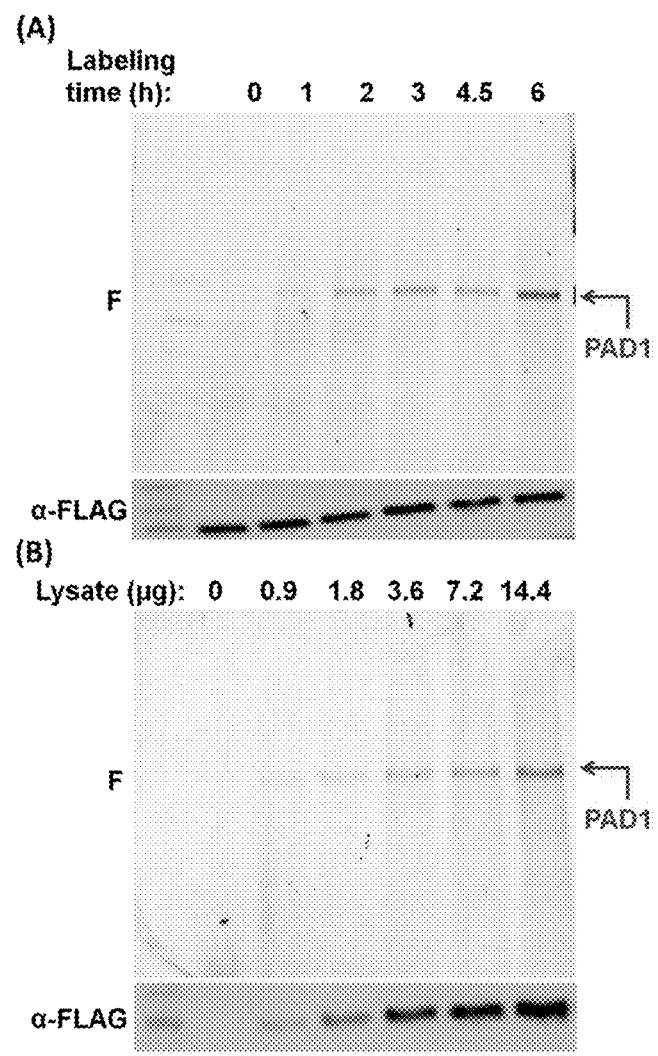
FIG. 16. (A) Time-dependent labelling of PAD1 in HEK293TPAD1 cells by 21. HEK293TPAD1 cells were treated with 21 (5 μM) in serum-free DMEM for various times. After the treatment, cells were harvested and flash-frozen in liquid nitrogen. Cell lysates were treated with TAMRA-$N_3$, TCEP, TBTA and $CuSO_4$ for 2 h at room temperature. Time-dependent labelling of PAD1 by 21 was recorded on a Typhoon scanner. (B) Limit of detection of PAD1 in HEK293TPAD1 cells by 21. For this study, cells were treated with 5 μM of 21 in serum-free DMEM for 3 h and decreasing amounts (indicated by total protein content) of lysates were clicked with TAMRA-$N_3$ in the presence of TCEP, TBTA and freshly prepared $CuSO_4$. PAD1 content in HEK293TPAD1 cells was found to be 0.06% of the total protein and taking this into account, limit of detection of PAD1 in HEK293TPAD1 cells by 21 was calculated to be 72 pmol. F stands for fluorograph.

As shown in FIG. 4D and S12, compound 21 labeled PAD1 in HEK293TPAD1 cells in a dose- and time-dependent manner. Remarkably, 21 exhibited an impressive LOD of 72 pmol of PAD1 in HEK293TPAD1 cells (FIG. 16B).

Encouraged by the selective labelling of PAD1 by 21 in HEK293TPAD1 cells, it was used to establish a target engagement assay to evaluate the cellular potency of PAD1 inhibitors. For this application, compound 1 was used as an inhibitor of labelling of PAD1 by 21. Interestingly, compound 1 dose-dependently inhibited the labelling of PAD1 by 21 in HEK293TPAD1 cells (FIG. 4E) with an $EC_{50}$ of 12.7 μM, which was similar to that obtained for the inhibition of histone H3 citrullination (FIG. 3C).

Figure 17:
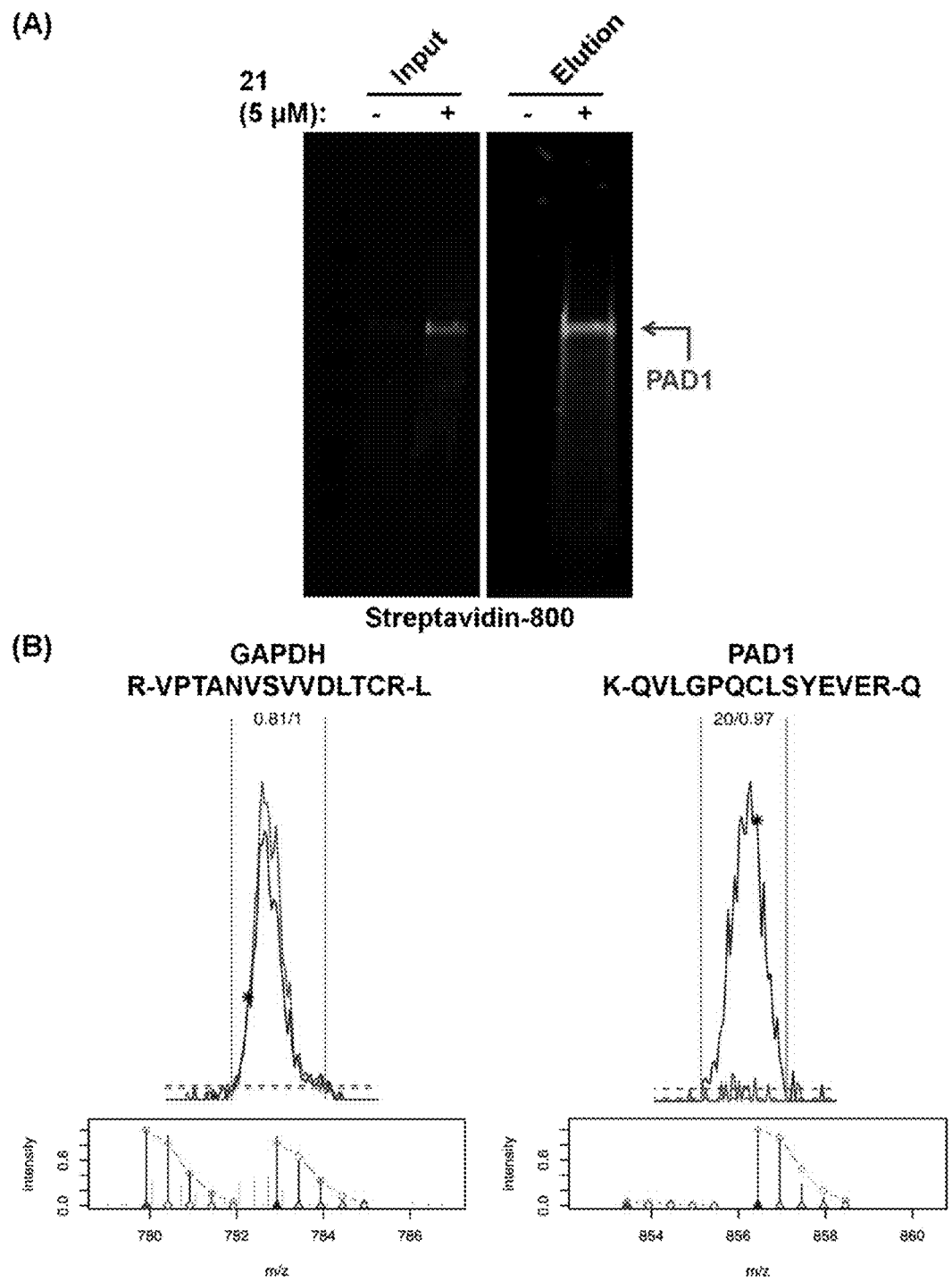
FIG. 17. (A) Pull-down of PAD1 in HEK293TPAD1 cells on Streptavidin-agarose beads using 21 and Biotin-$N_3$. HEK293TPAD1 cells were treated with 5 μM 21 in the presence of 1 mM $CaCl_2$ and 5 μM ionomycin at 37° C. for 3 h, and the labelled proteins were clicked with Biotin-$N_3$ in the presence of TCEP, TBTA and $CuSO_4$. Biotinylated proteins were then selectively captured on Streptavidin-agarose beads and were eluted by heating the beads in a mixture of 4 M urea, 15 mM biotin and 2.5×SDS-PAGE loading dye at 95° C. for 30 min. The input and elution were analyzed by western blot using streptavidin-800. (B) Representative isotopic comparison of peptides from GAPDH and PAD1 obtained by trypsin digestion of the pulled-down proteins from HEK293TPAD1 cells by 21. 21-treated and control samples were labelled with heavy (blue) and light (red) formaldehyde, respectively. GAPDH shows a ratio close to 1 (i.e. no change), while PAD1 shows a strong enrichment with a ratio of ~20.
Figure 18:
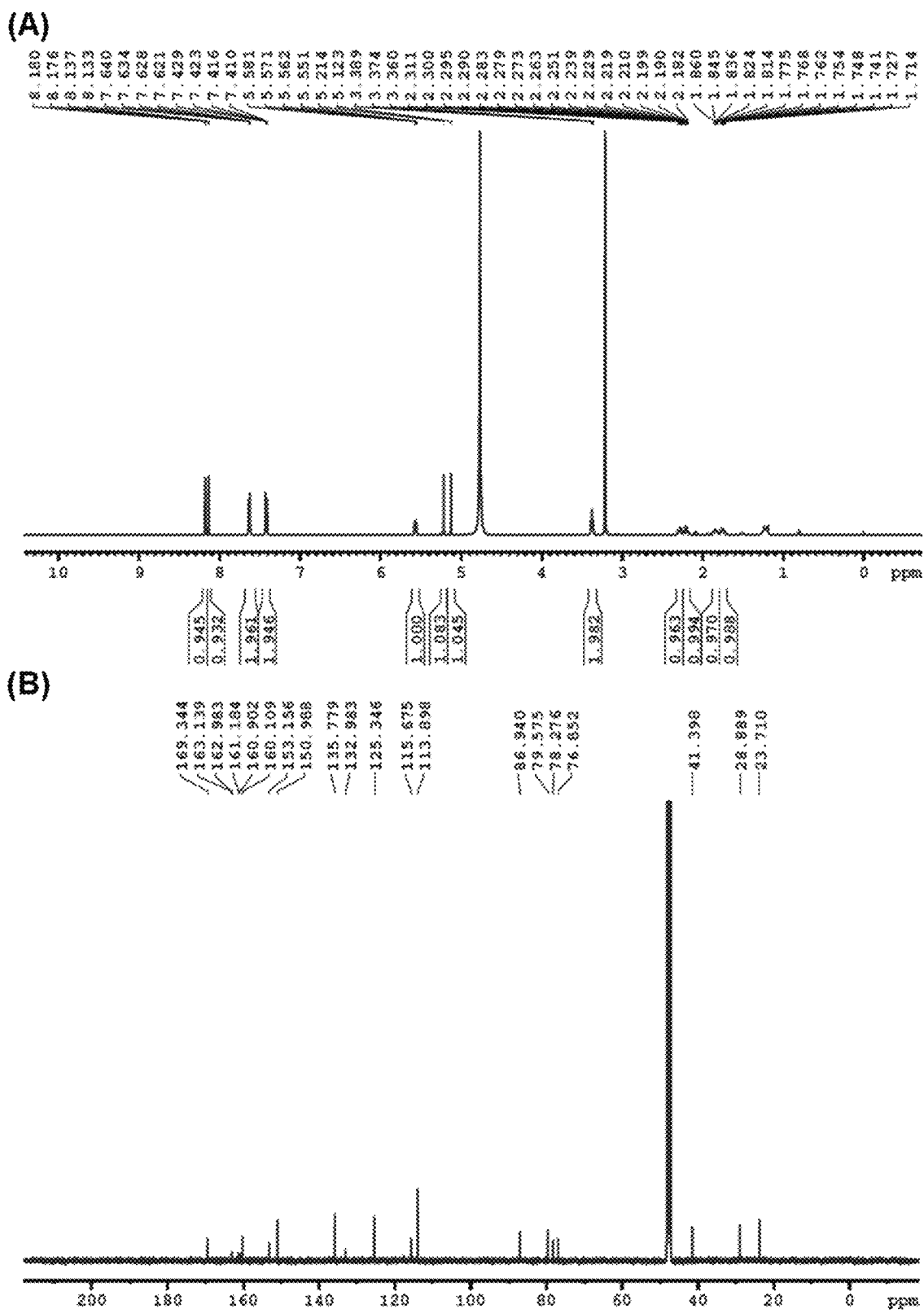
FIG. 18. $^1$H (A) and $^{13}$C (B) NMR spectra of compound 1 in $CD_3OD$.
Figure 19:
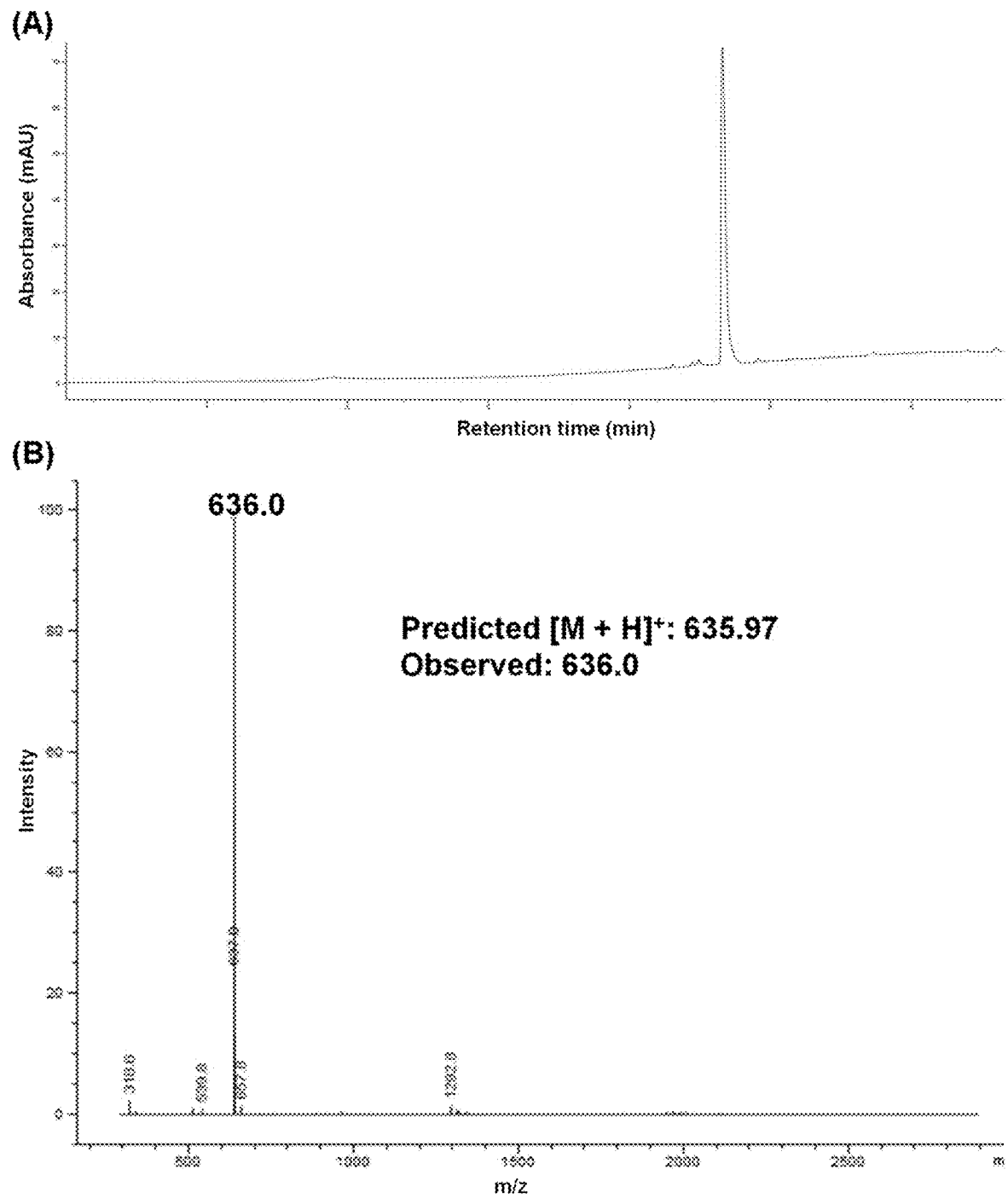
FIG. 19. HPLC trace (A) and ESI-Mass spectra (B) of compound 1.
Figure 20:
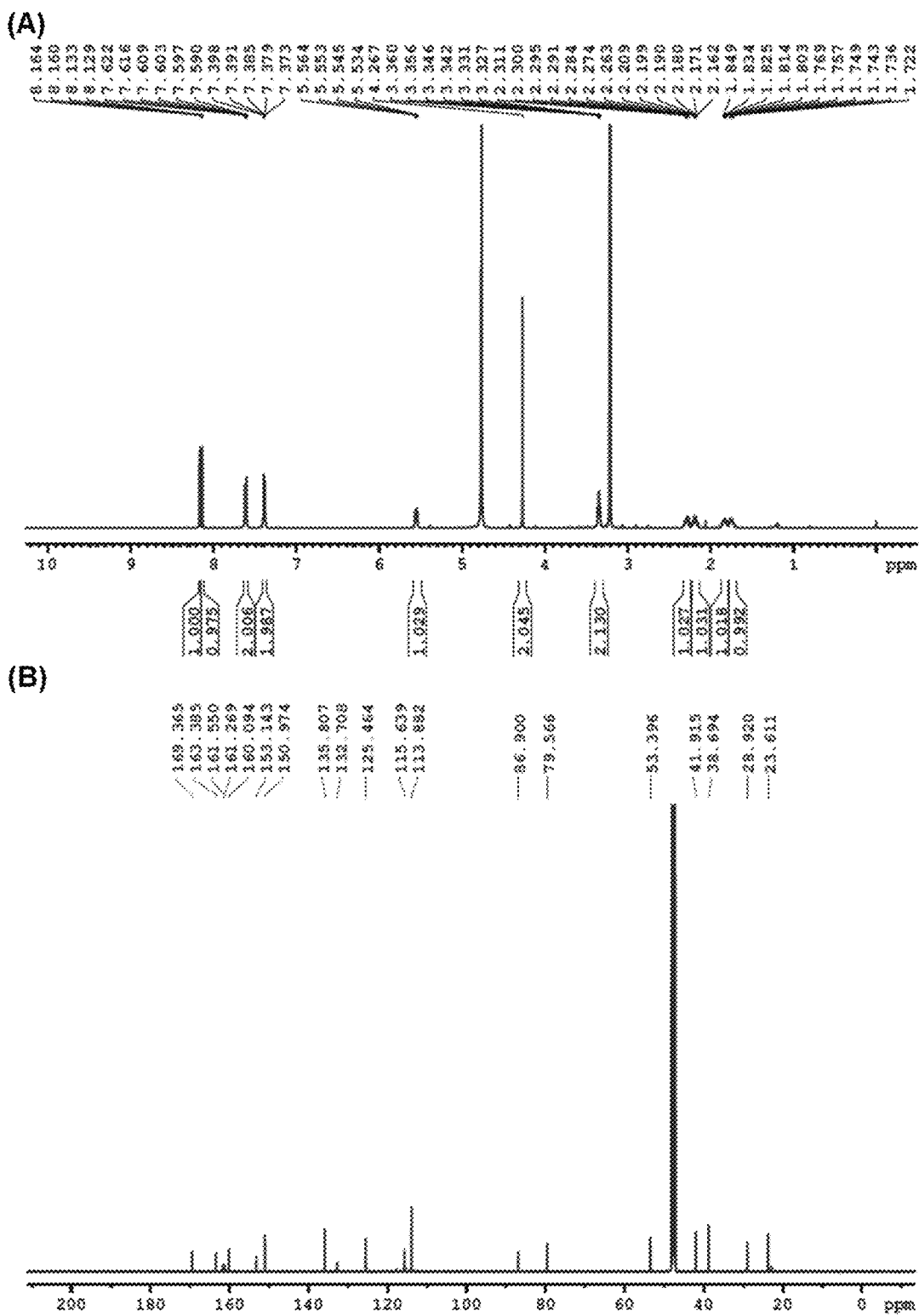
FIG. 20. $^1$H (A) and $^{13}$C (B) NMR spectra of compound 2 in $CD_3OD$.
Figure 21:
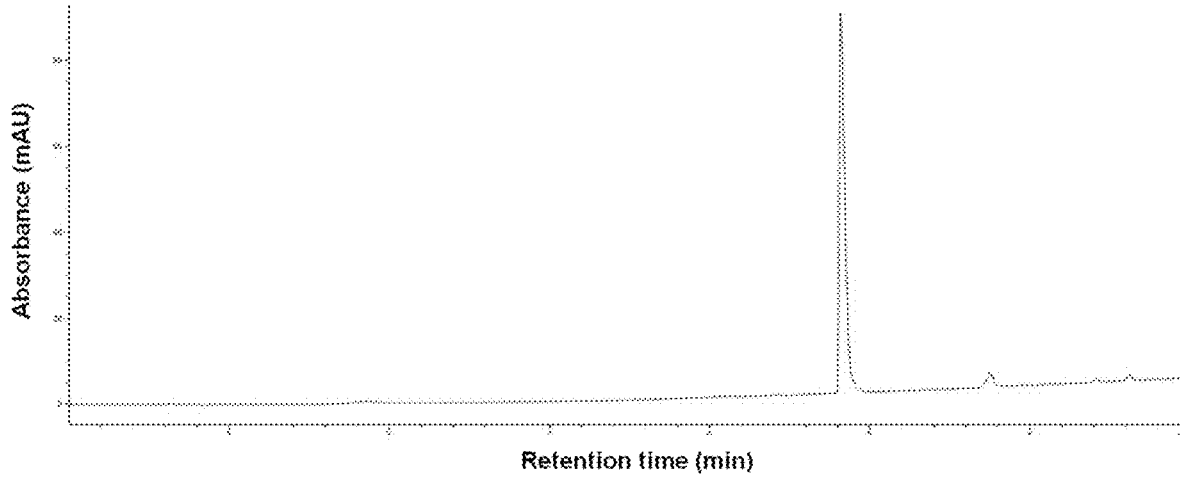
FIG. 21. HPLC trace (A) and ESI-Mass spectra (B) of compound 2.
Figure 21:
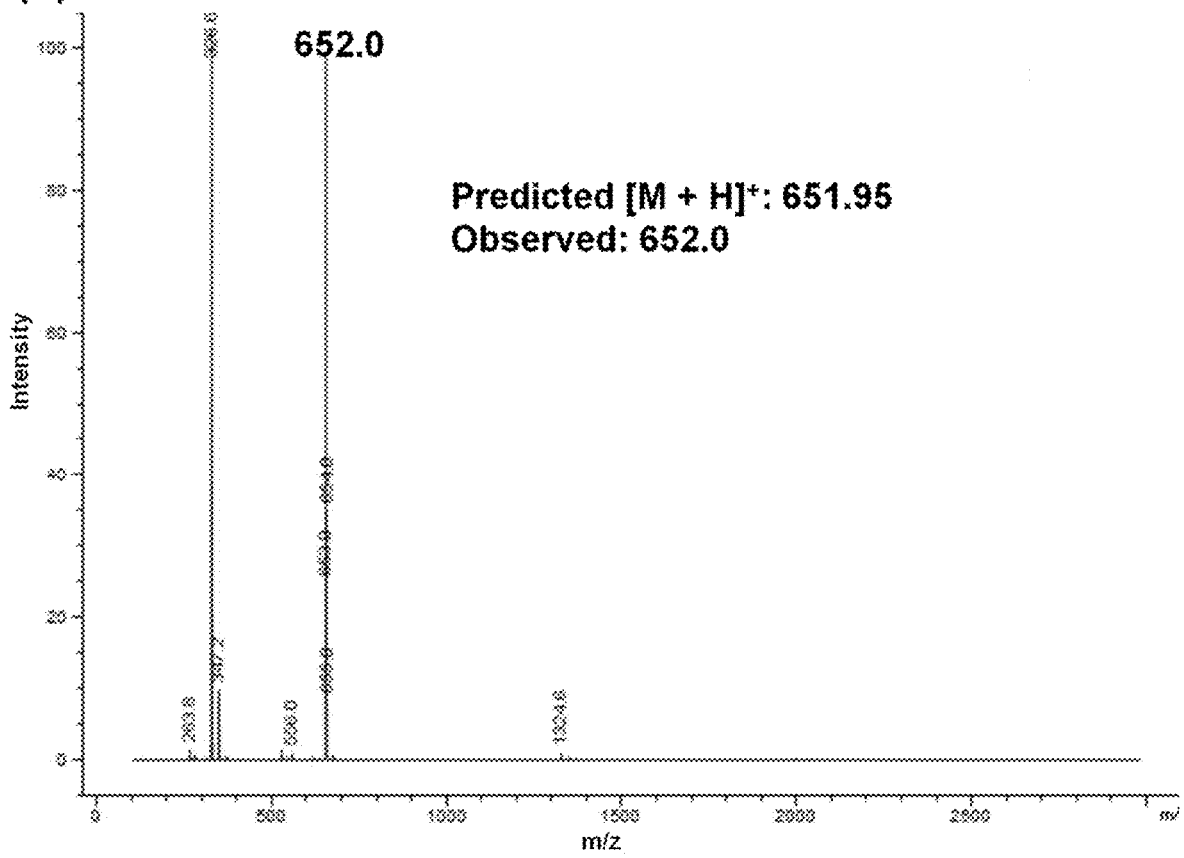
Figure 22:
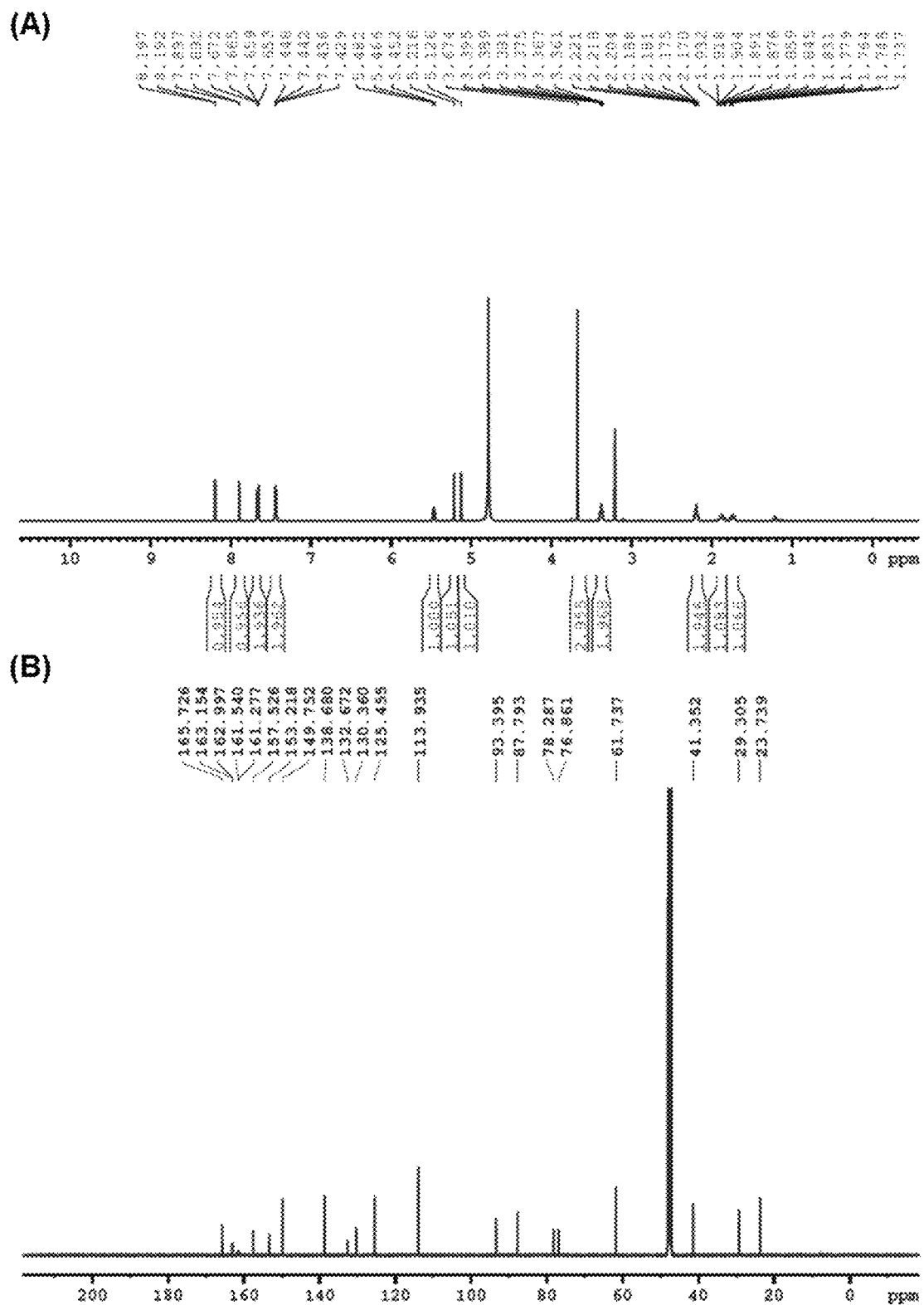
FIG. 22. $^1$H (A) and $^{13}$C (B) NMR spectra of compound 3 in $CD_3OD$.
Figure 23:
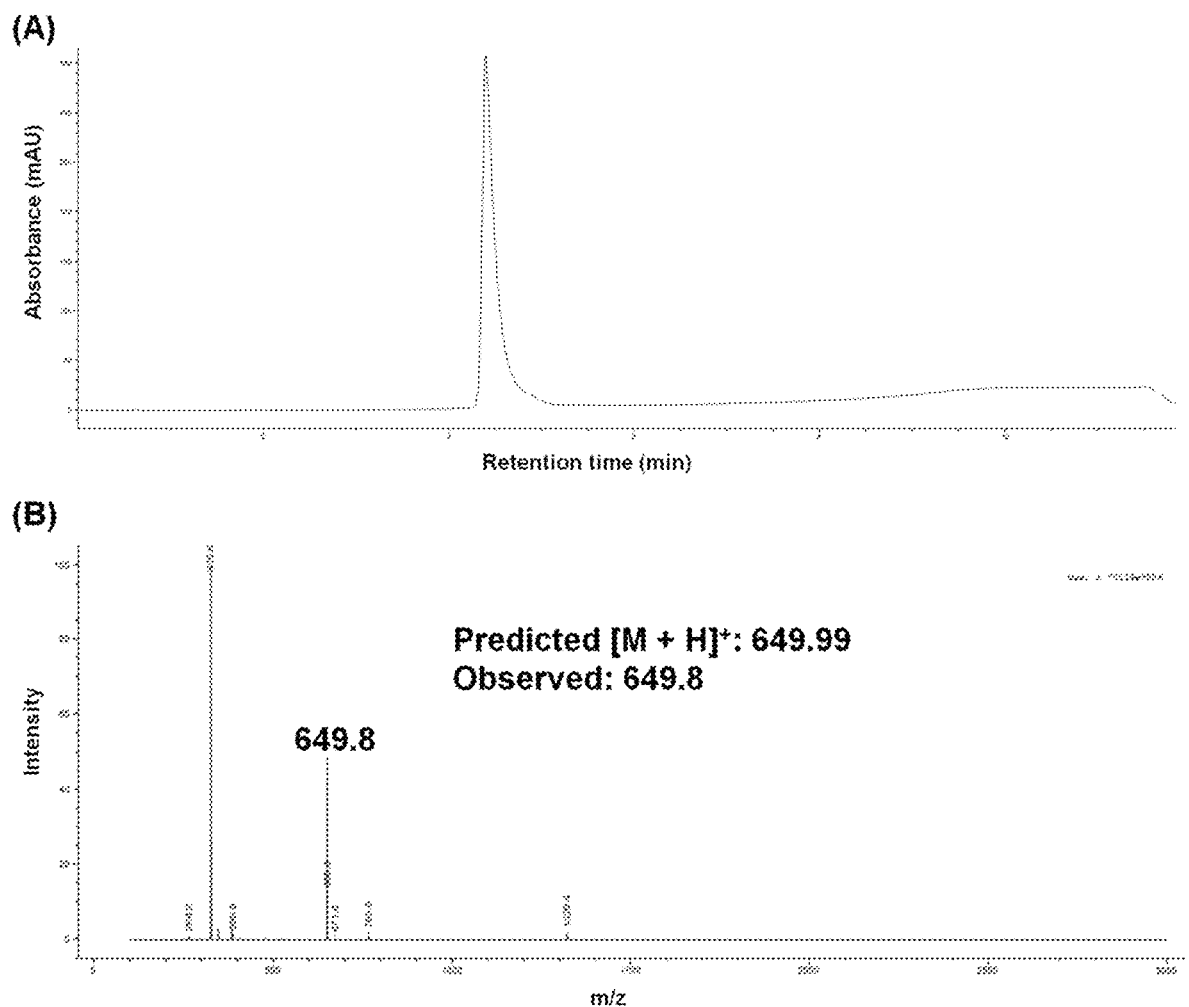
FIG. 23. HPLC trace (A) and ESI-Mass spectra (B) of compound 3.
Figure 24:
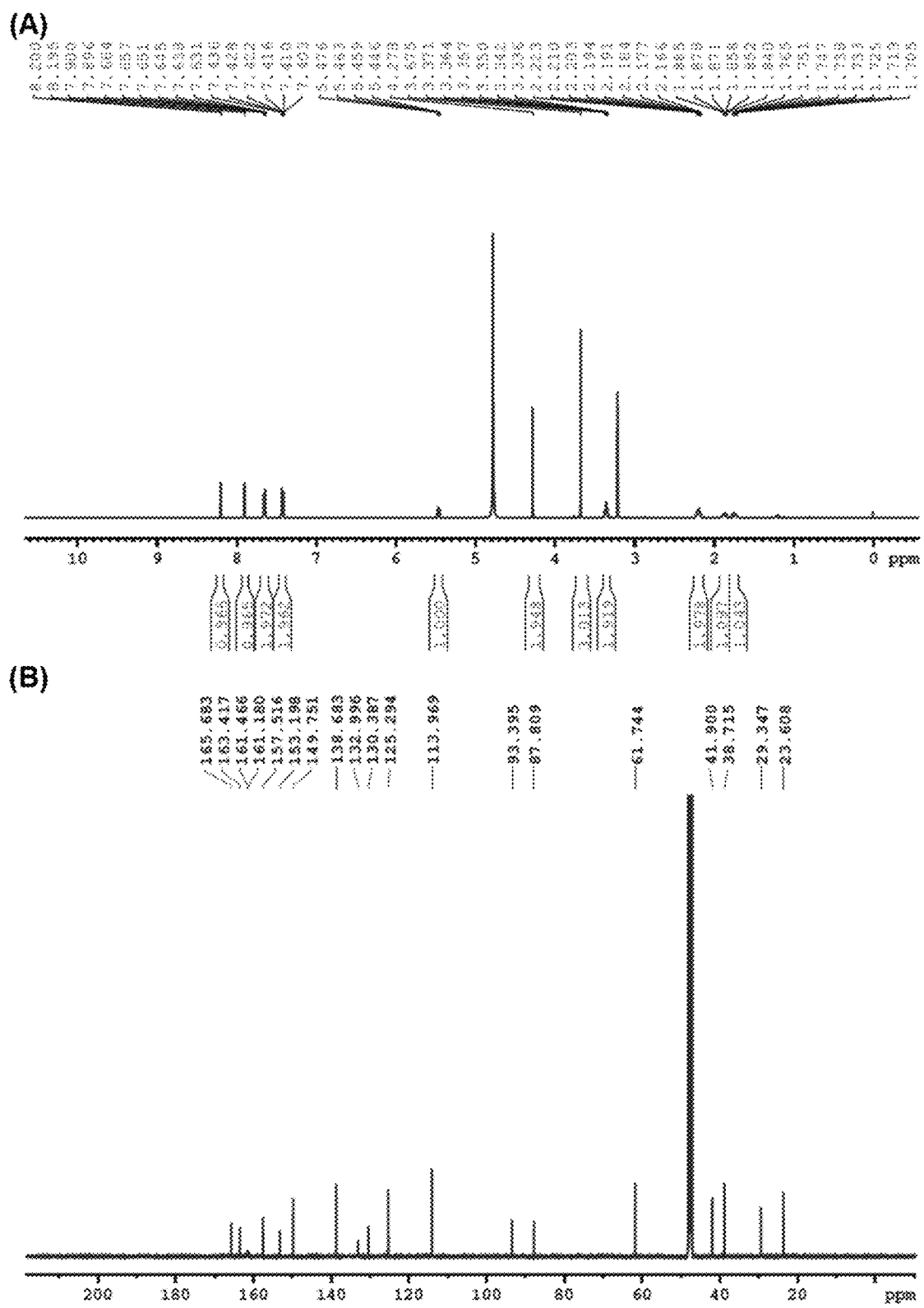
FIG. 24. $^1$H (A) and $^{13}$C (B) NMR spectra of compound 4 in $CD_3OD$.
Figure 25:
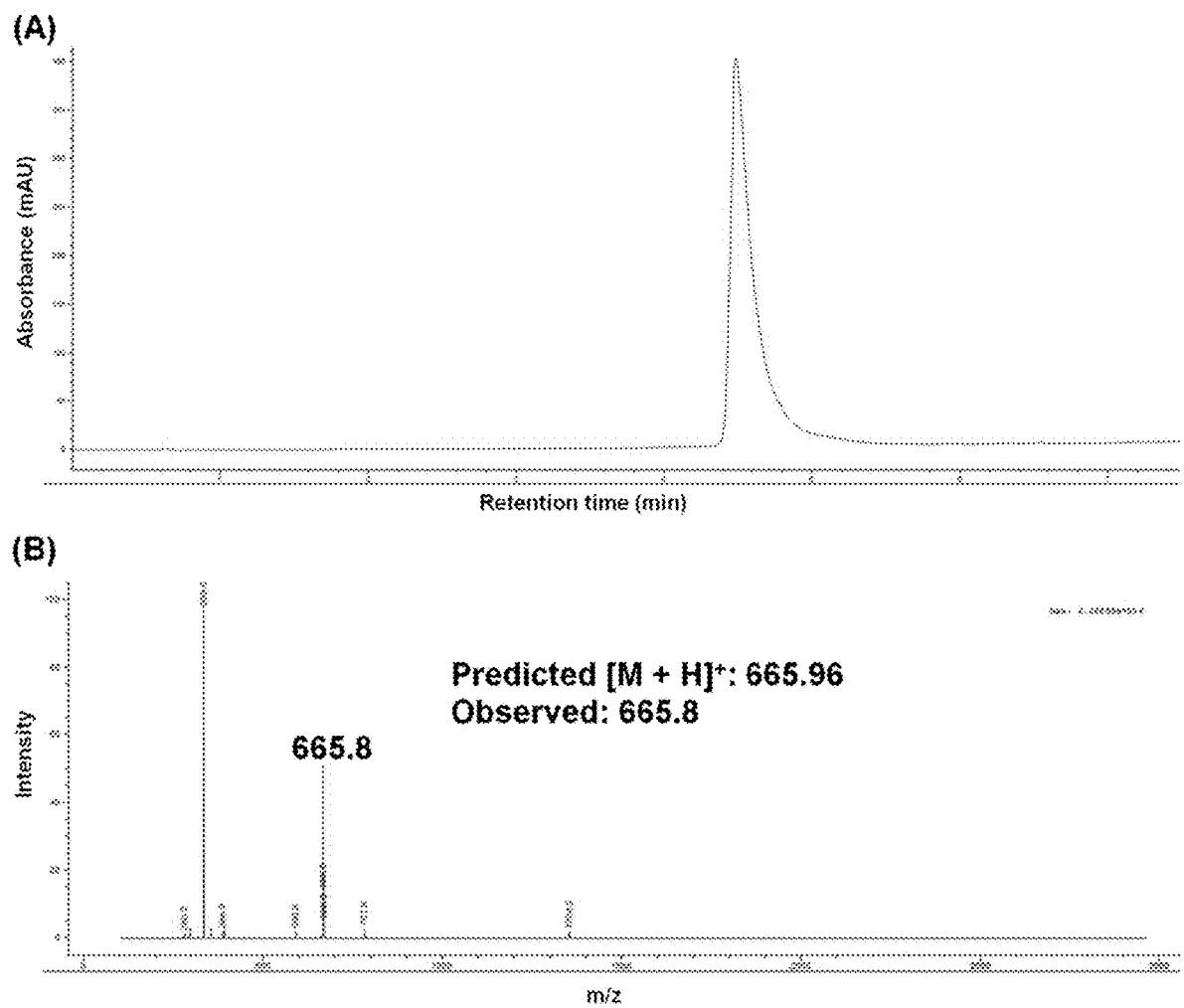
FIG. 25. HPLC trace (A) and ESI-Mass spectra (B) of compound 4.
Figure 26:
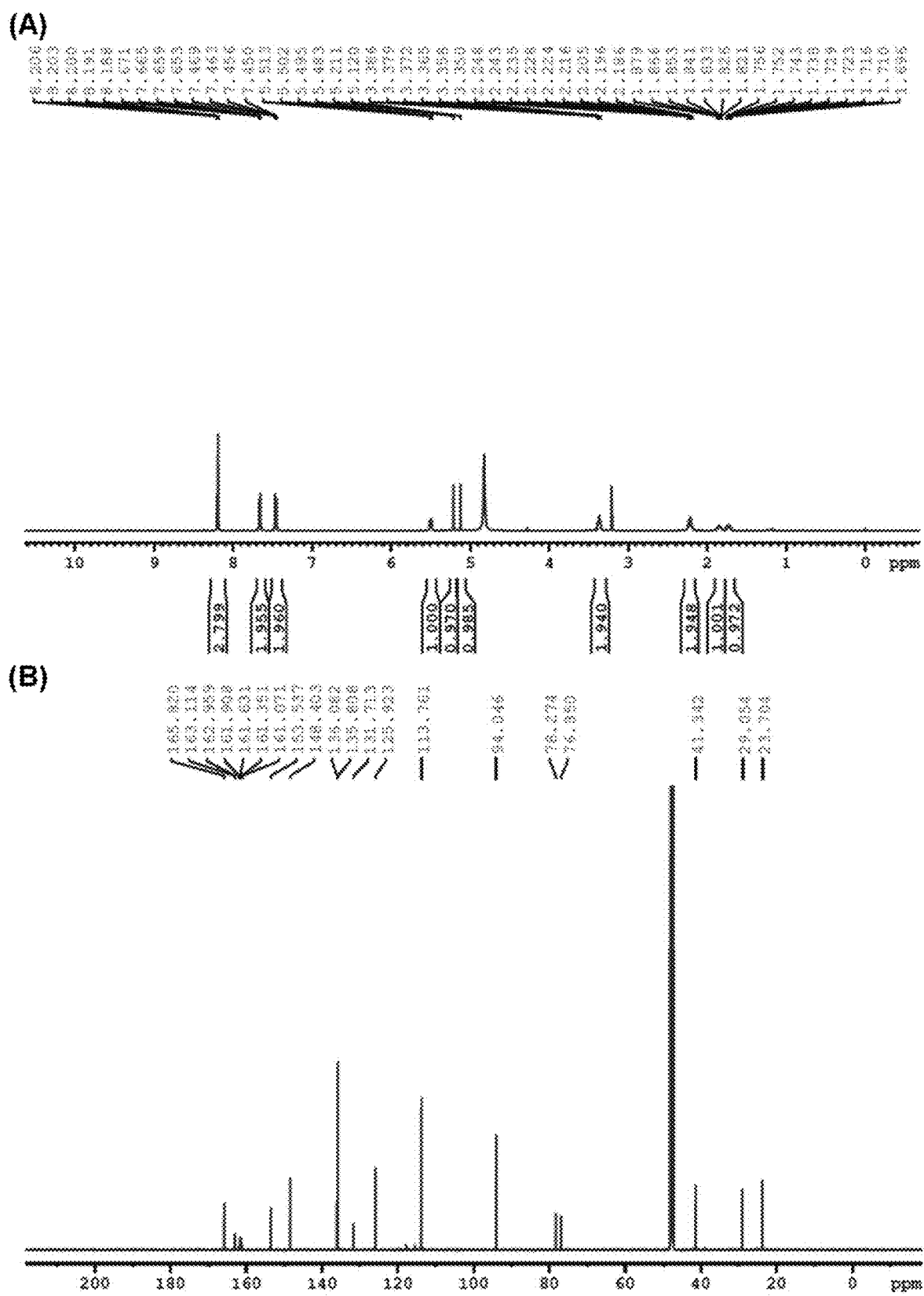
FIG. 26. $^1$H (A) and $^{13}$C (B) NMR spectra of compound 5 in $CD_3OD$.
Figure 27:
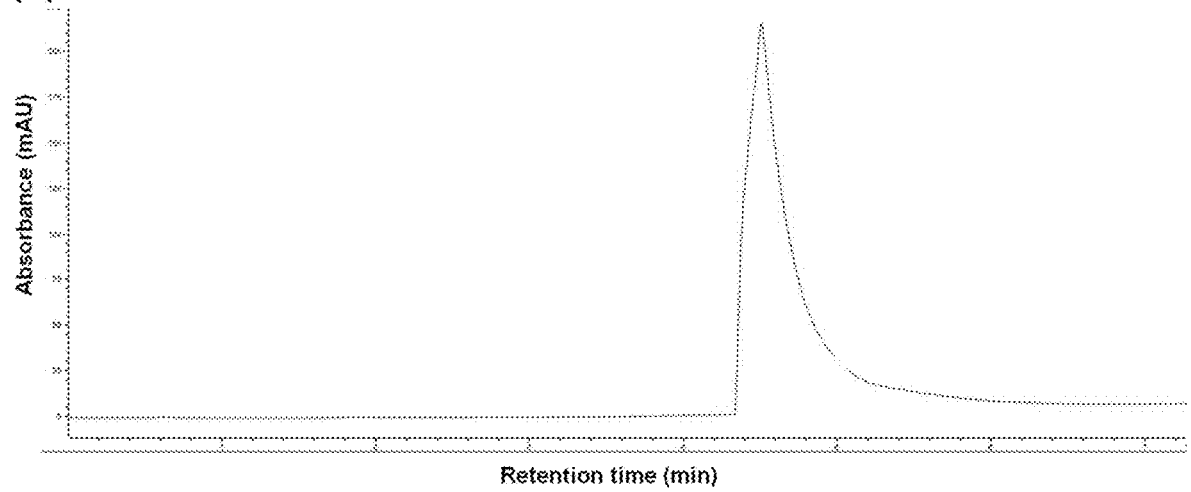
FIG. 27. HPLC trace (A) and ESI-Mass spectra (B) of compound 5.
Figure 27:
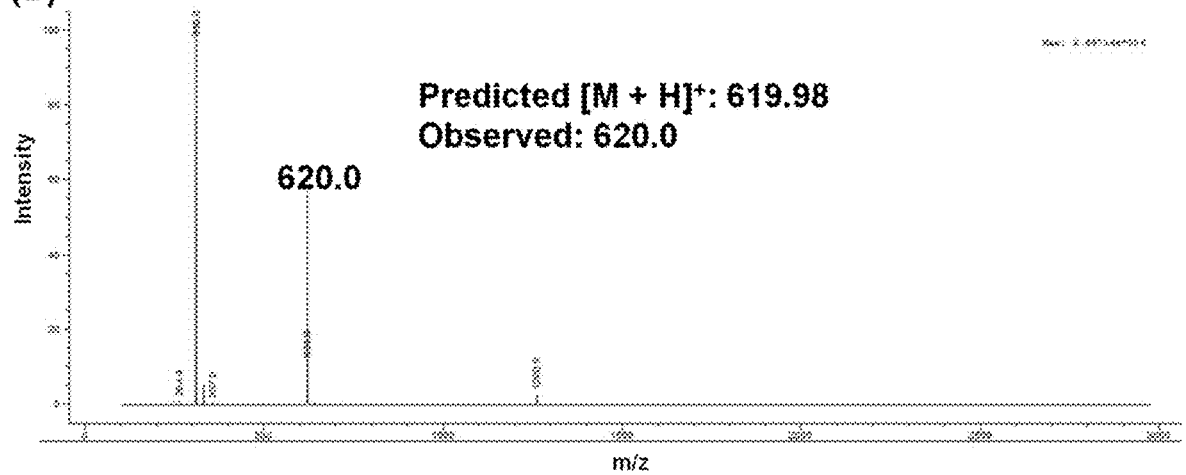
Figure 28:
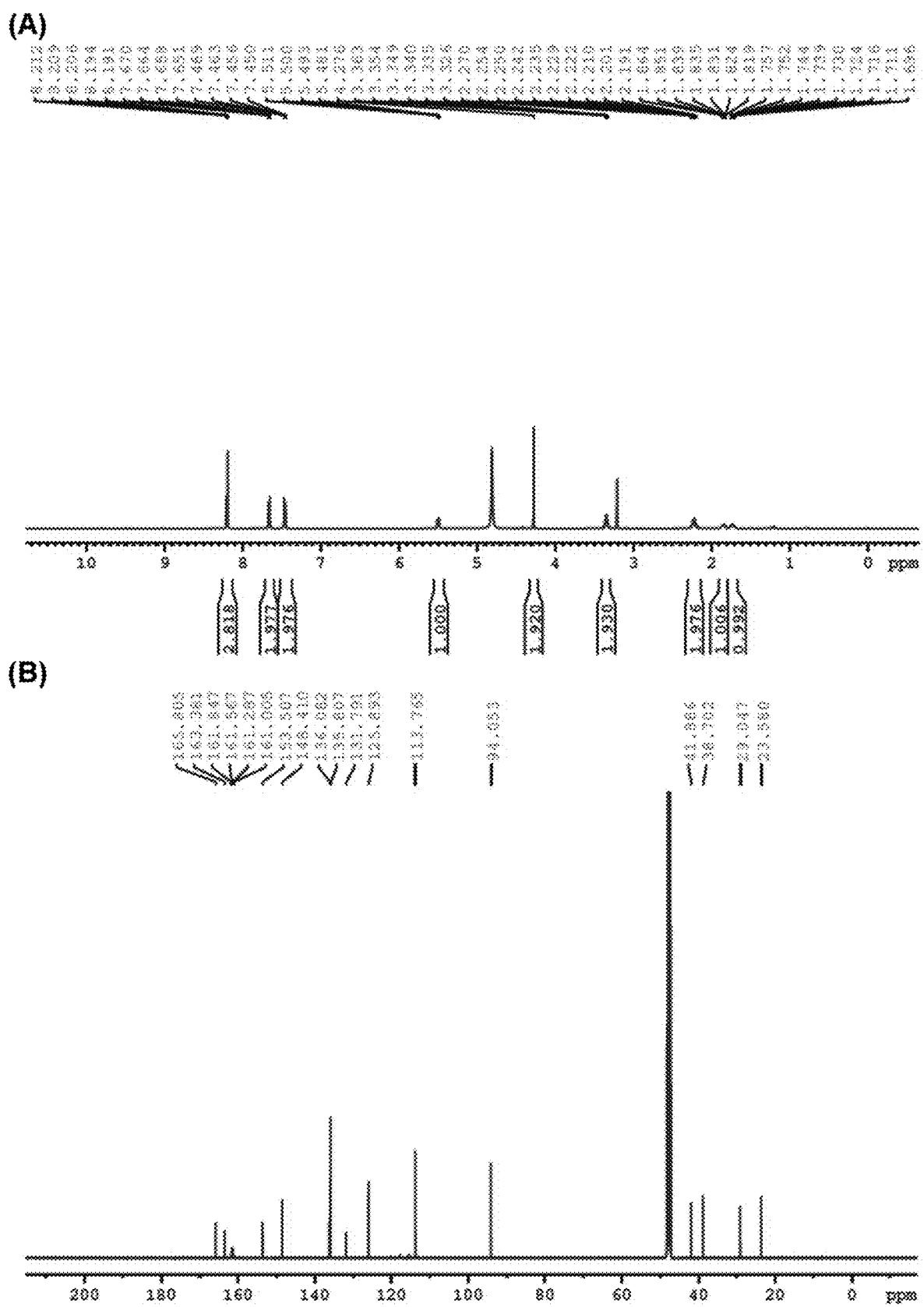
FIG. 28. $^1$H (A) and $^{13}$C (B) NMR spectra of compound 6 in $CD_3OD$.
Figure 29:
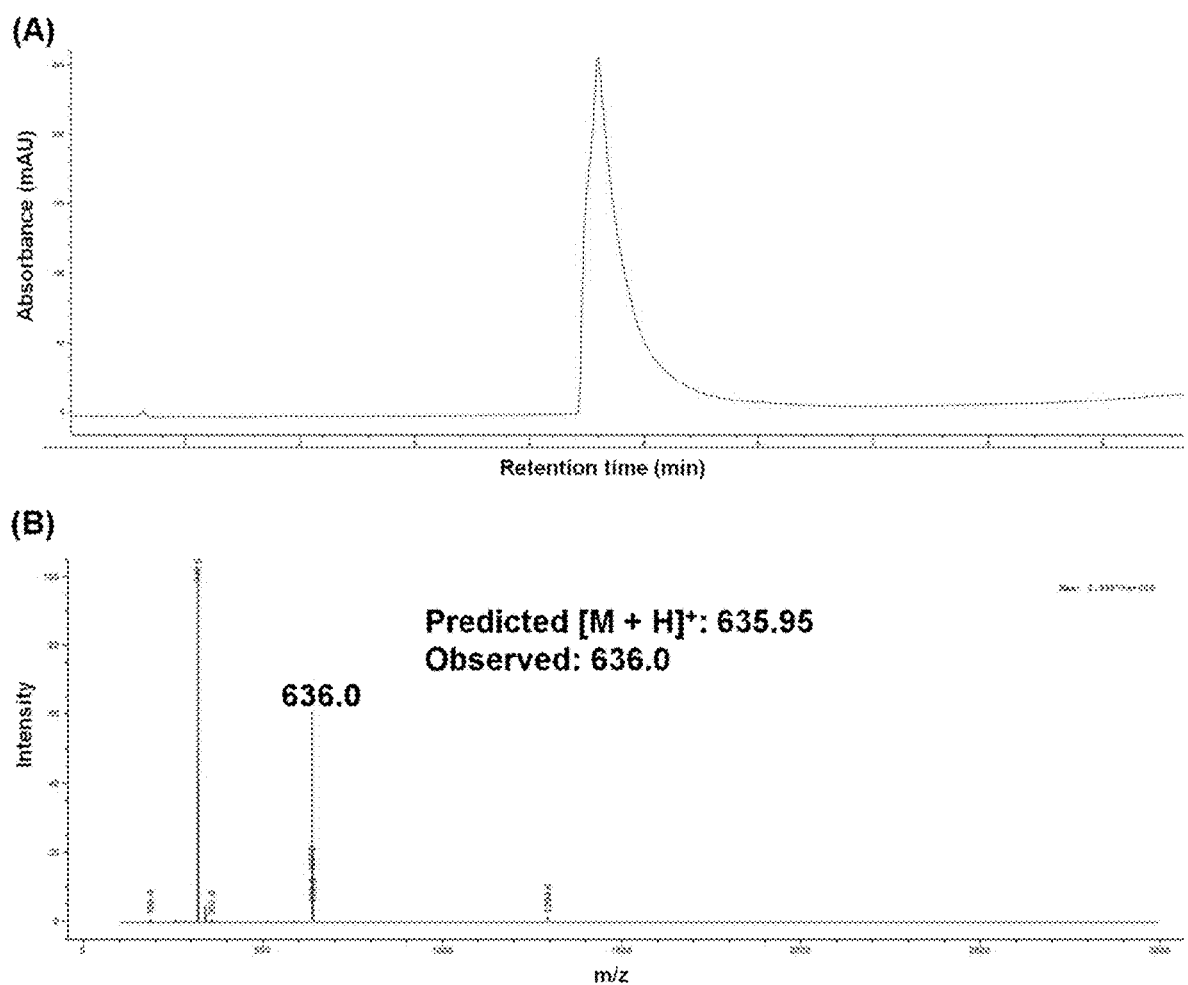
FIG. 29. HPLC trace (A) and ESI-Mass spectra (B) of compound 6.
Figure 30:
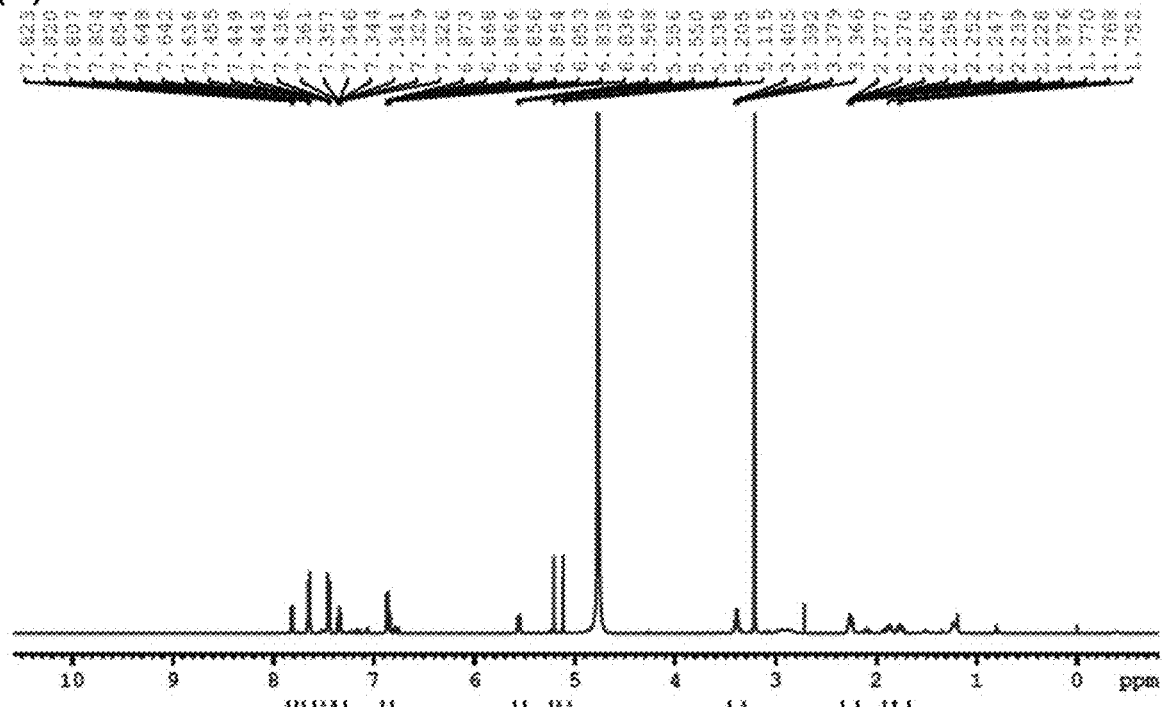
FIG. 30. $^1$H (A) and $^{13}$C (B) NMR spectra of compound 7 in $CD_3OD$.
Figure 30:
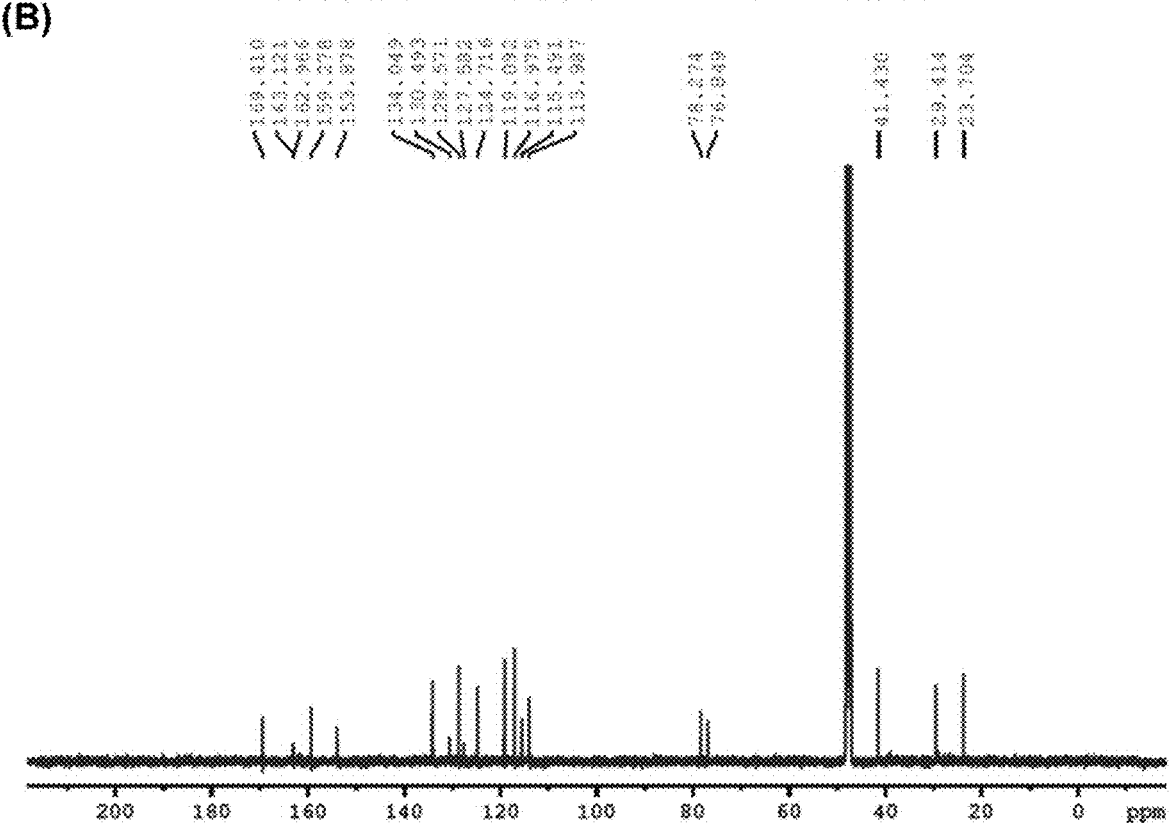
Figure 31:
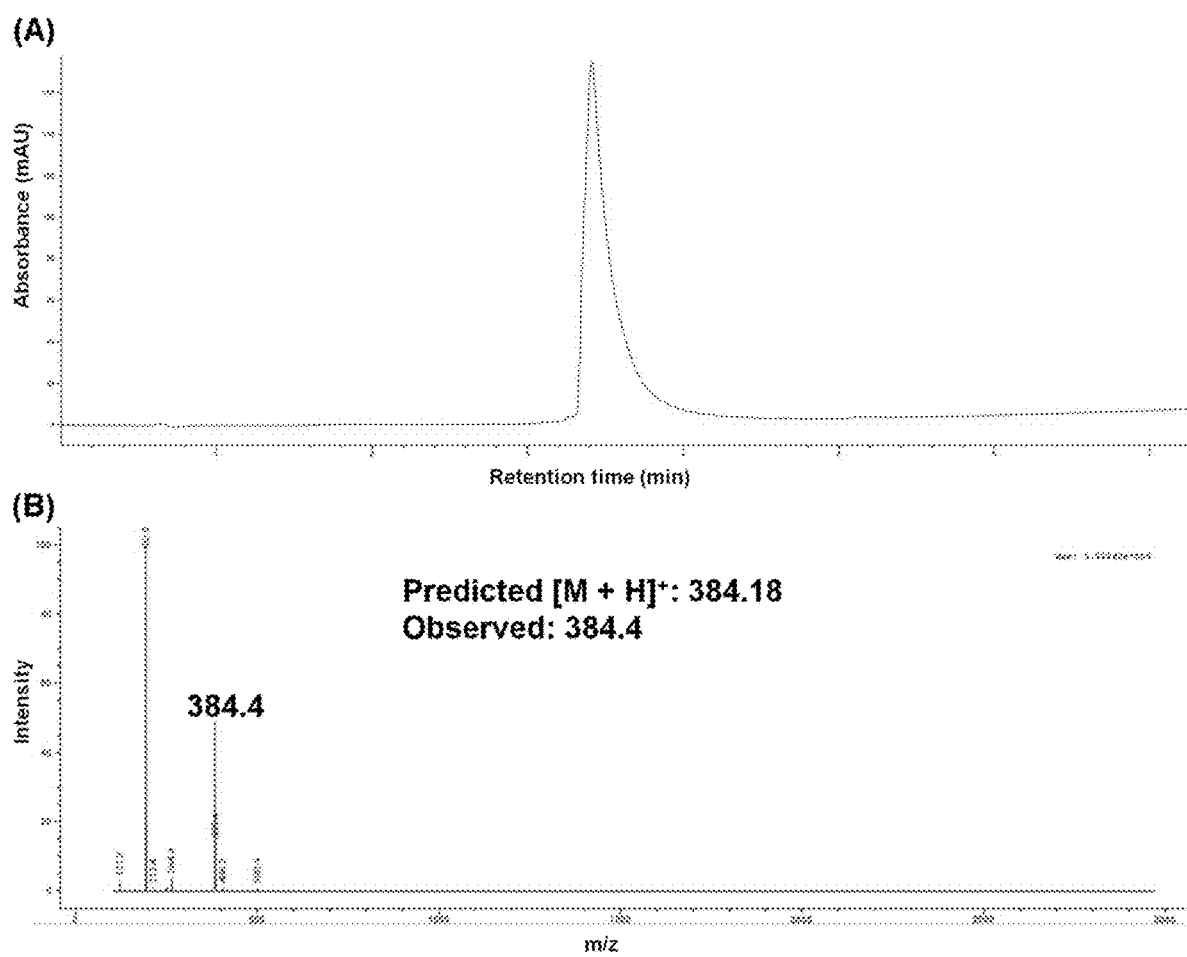
FIG. 31. HPLC trace (A) and ESI-Mass spectra (B) of compound 7.
Figure 32:
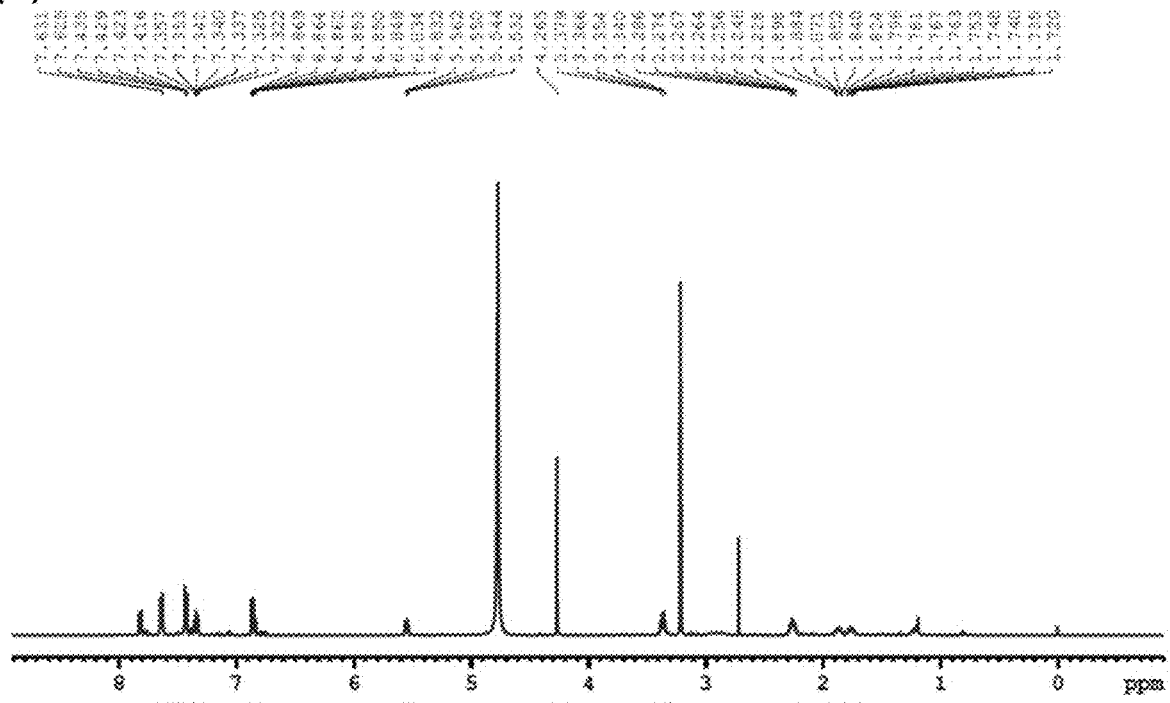
FIG. 32. $^1$H (A) and $^{13}$C (B) NMR spectra of compound 8 in $CD_3OD$.
Figure 32:
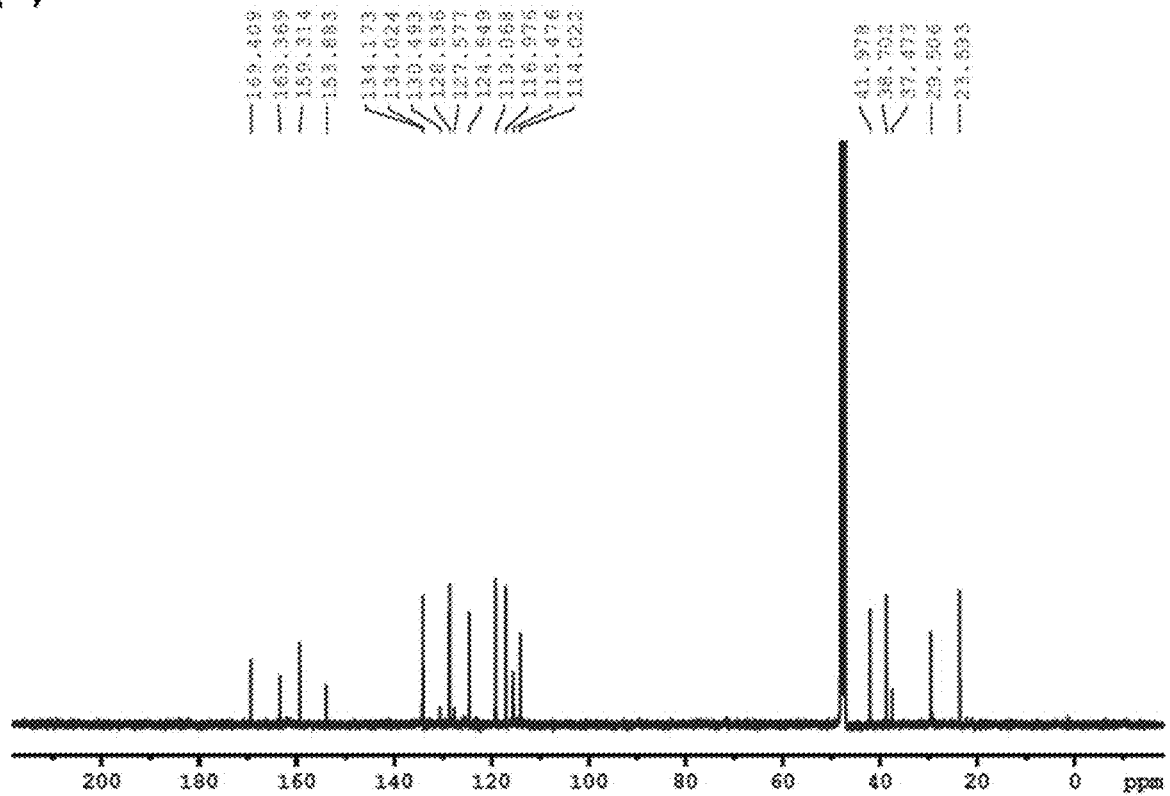
Figure 33:
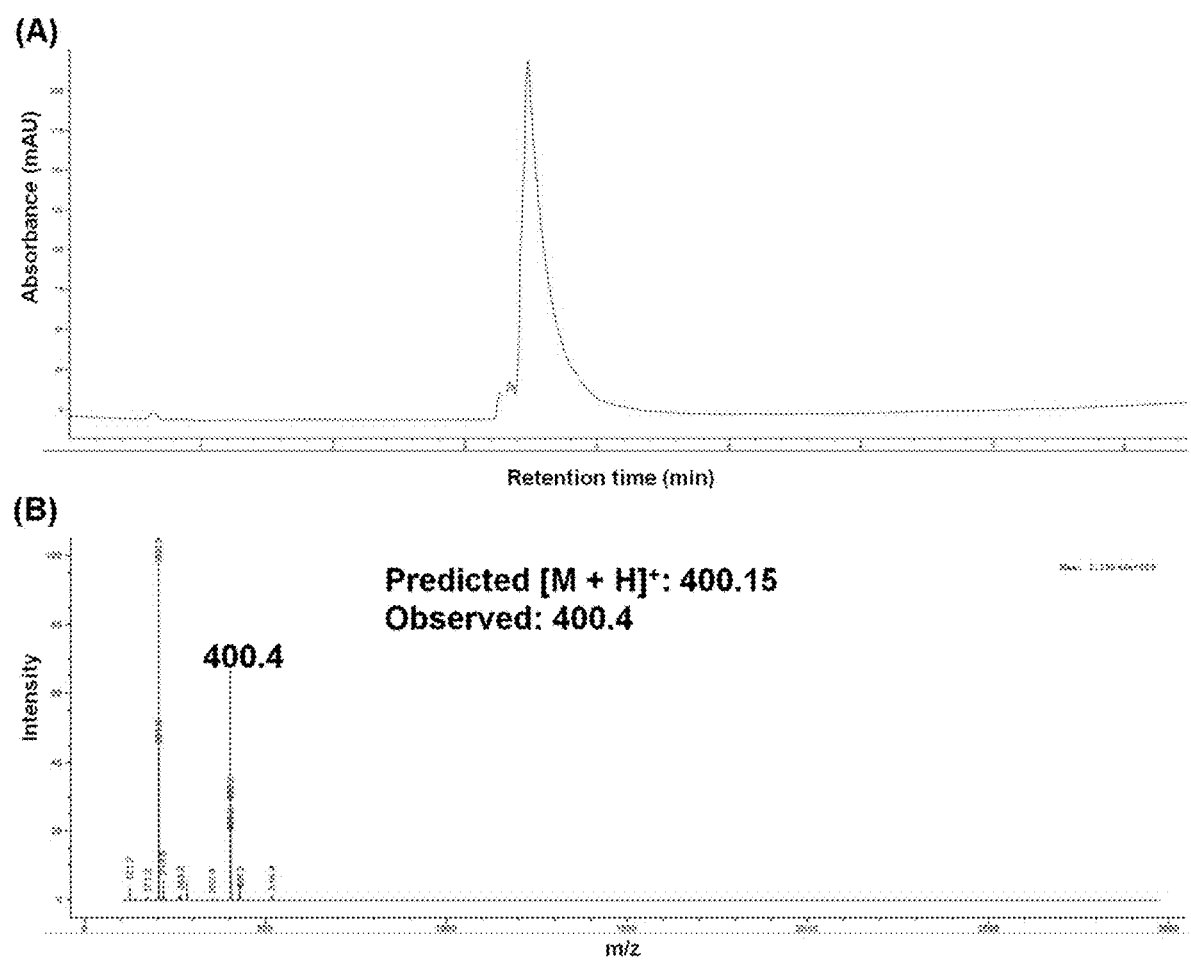
FIG. 33. HPLC trace (A) and ESI-Mass spectra (B) of compound 8.
Figure 34:
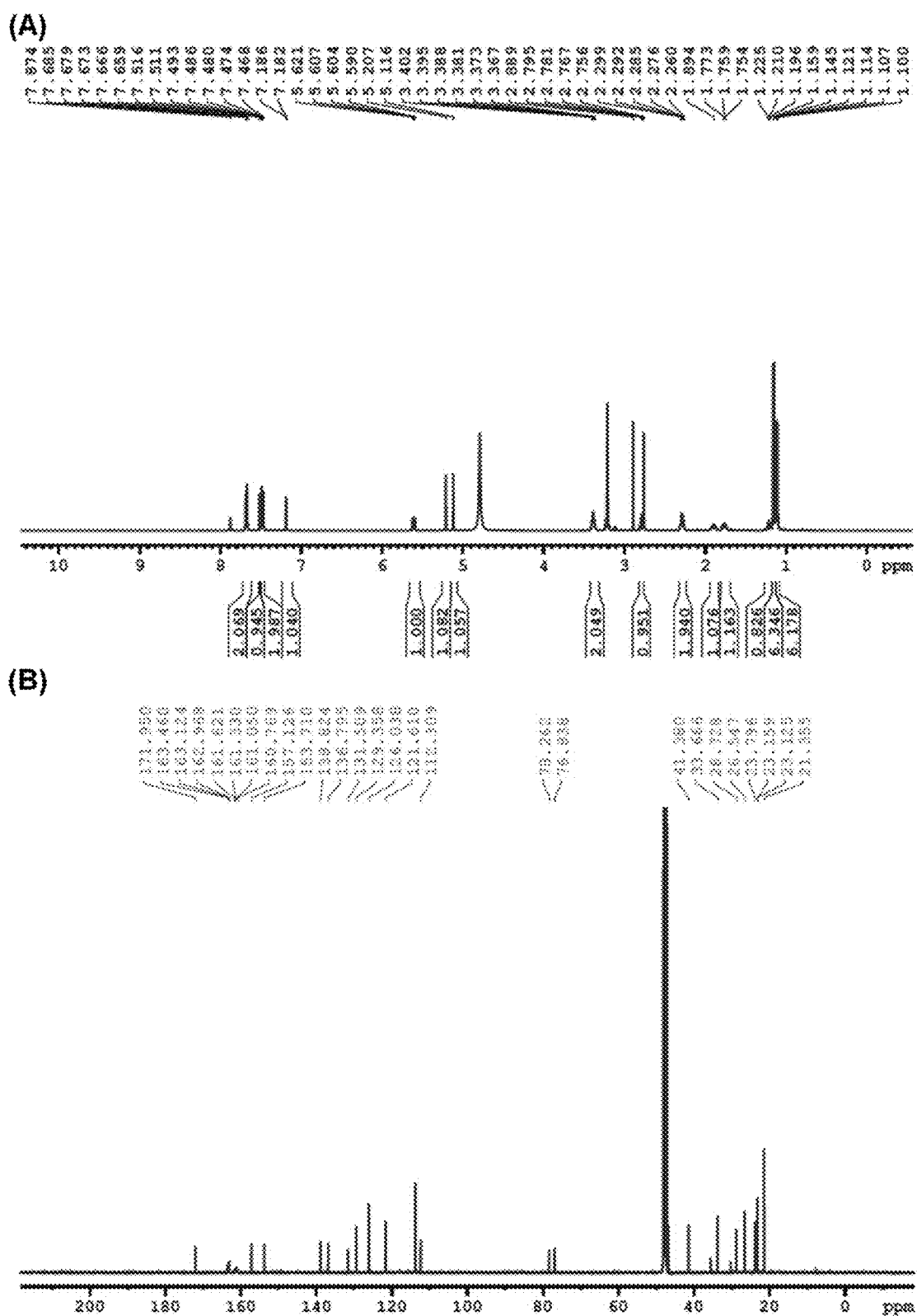
FIG. 34. $^1$H (A) and $^{13}$C (B) NMR spectra of compound 9 in $CD_3OD$.
Figure 35:
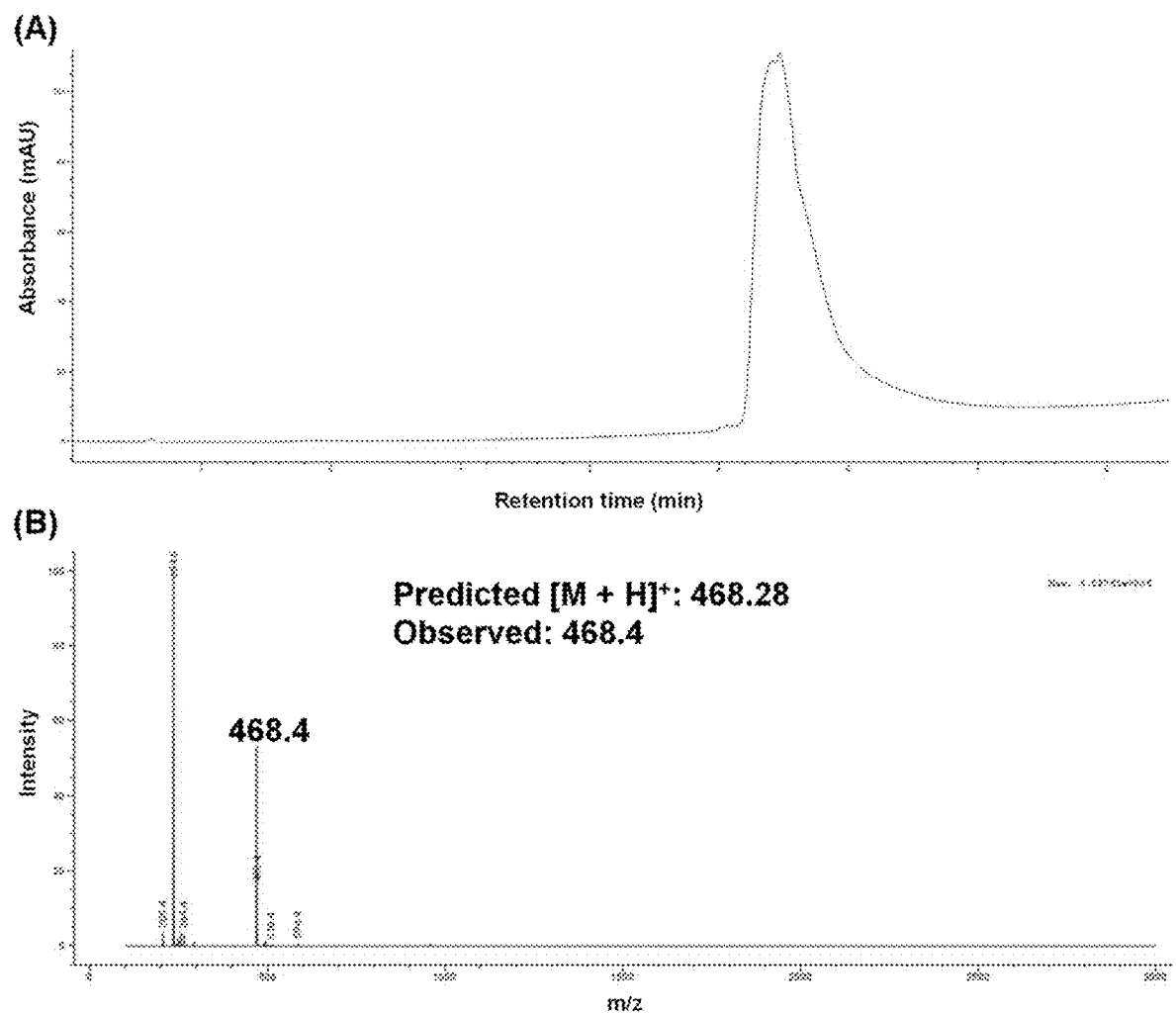
FIG. 35. HPLC trace (A) and ESI-Mass spectra (B) of compound 9.
Figure 36:
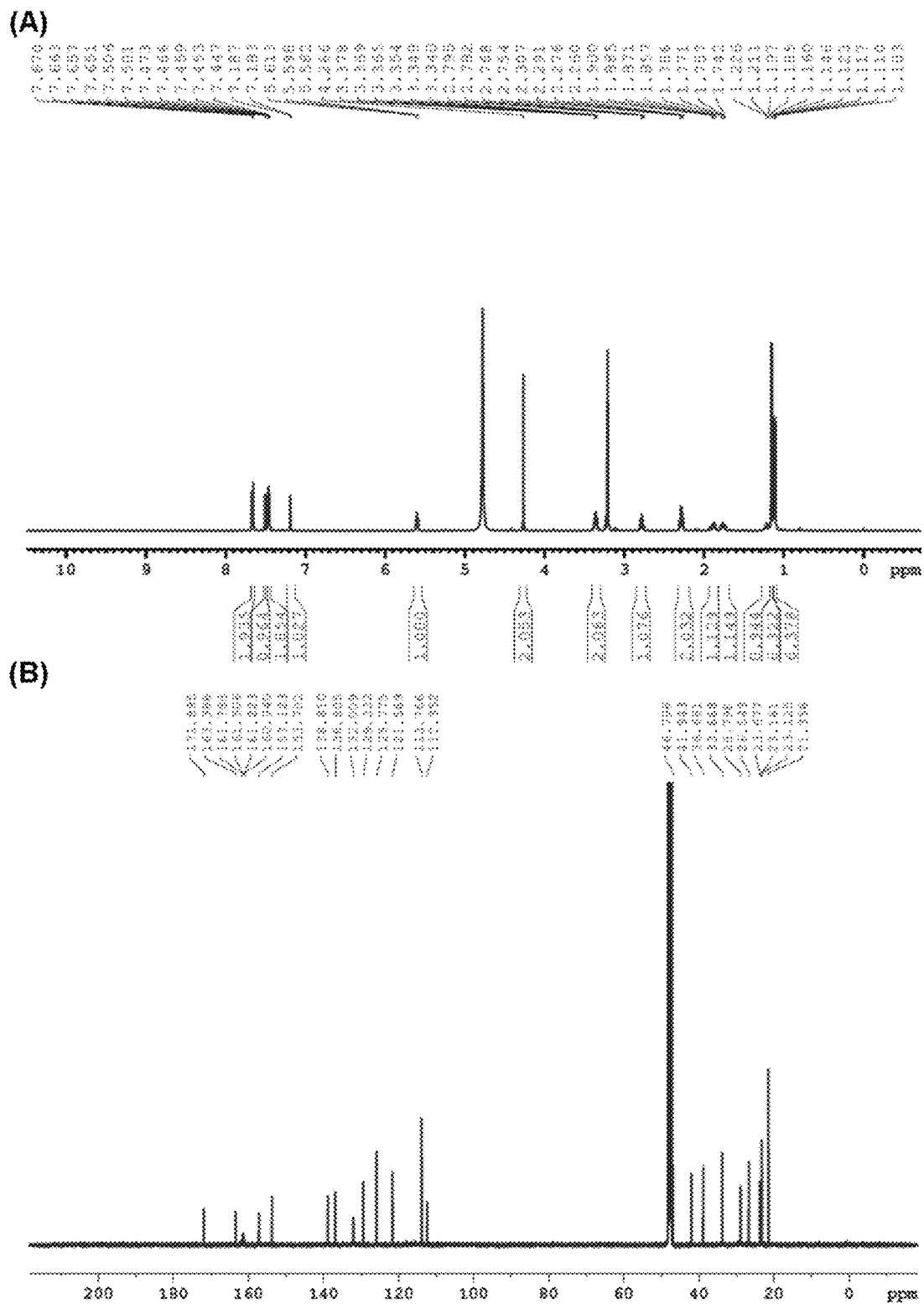
FIG. 36. $^1$H (A) and $^{13}$C (B) NMR spectra of compound 10 in $CD_3OD$.
Figure 37:
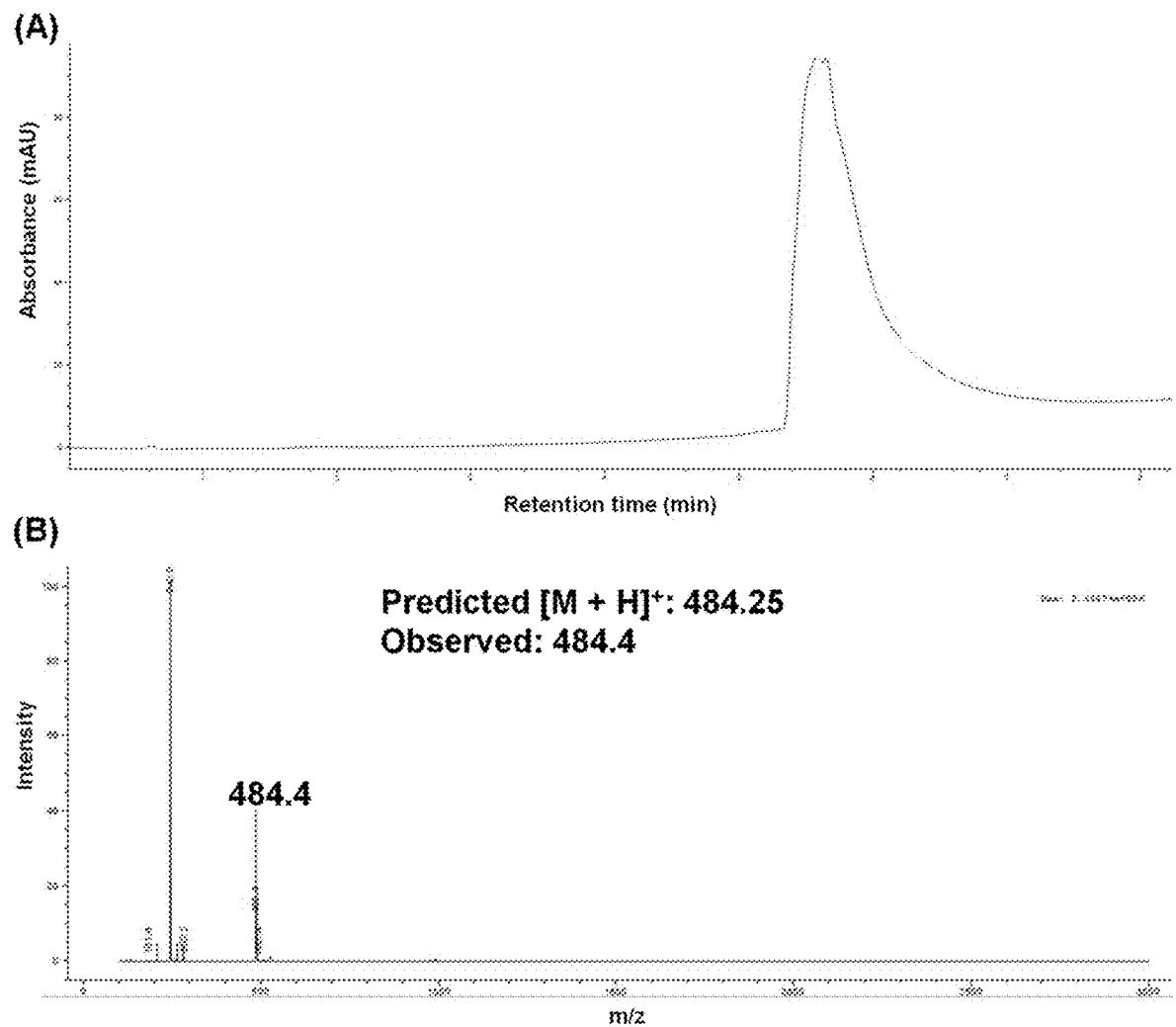
FIG. 37. HPLC trace (A) and ESI-Mass spectra (B) of compound 10.
Figure 38:
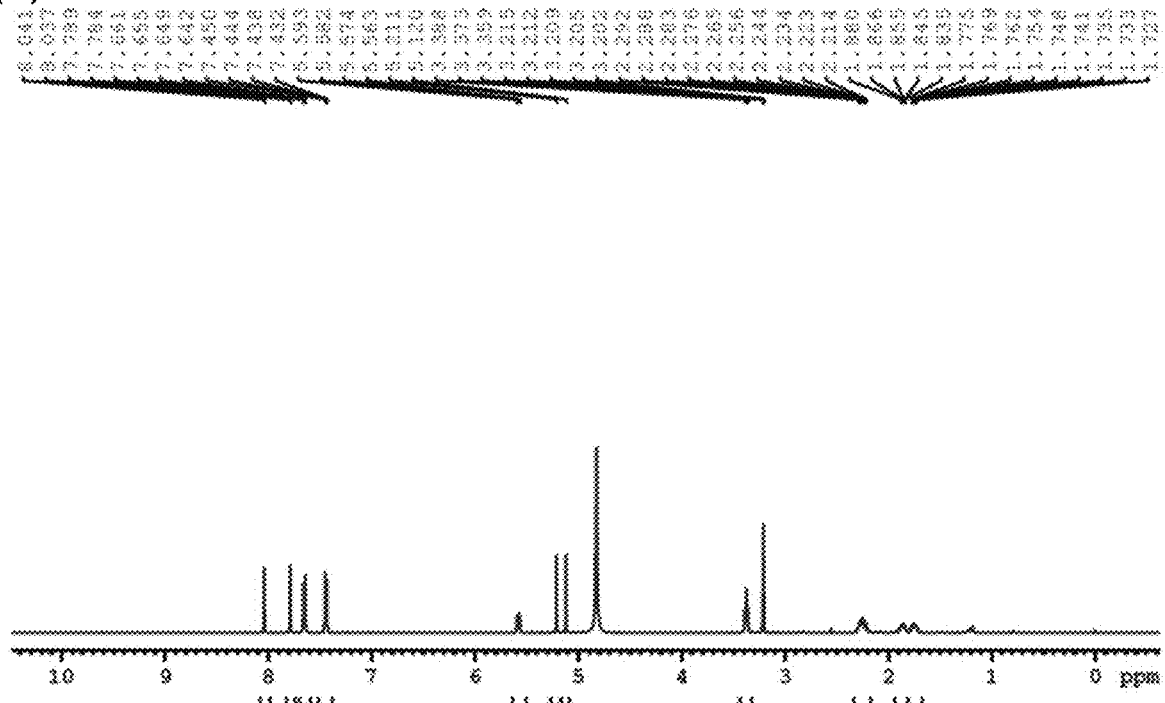
FIG. 38. $^1$H (A) and $^{13}$C (B) NMR spectra of compound 11 in $CD_3OD$.
Figure 38:
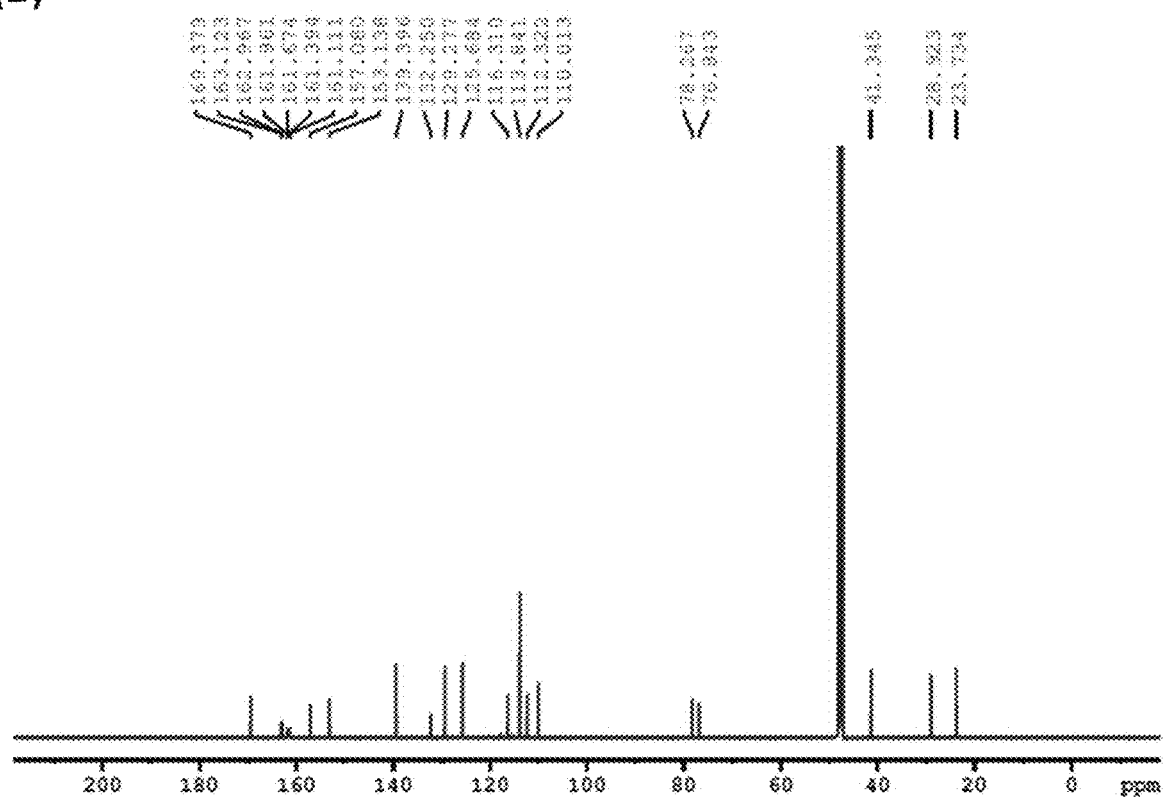
Figure 39:
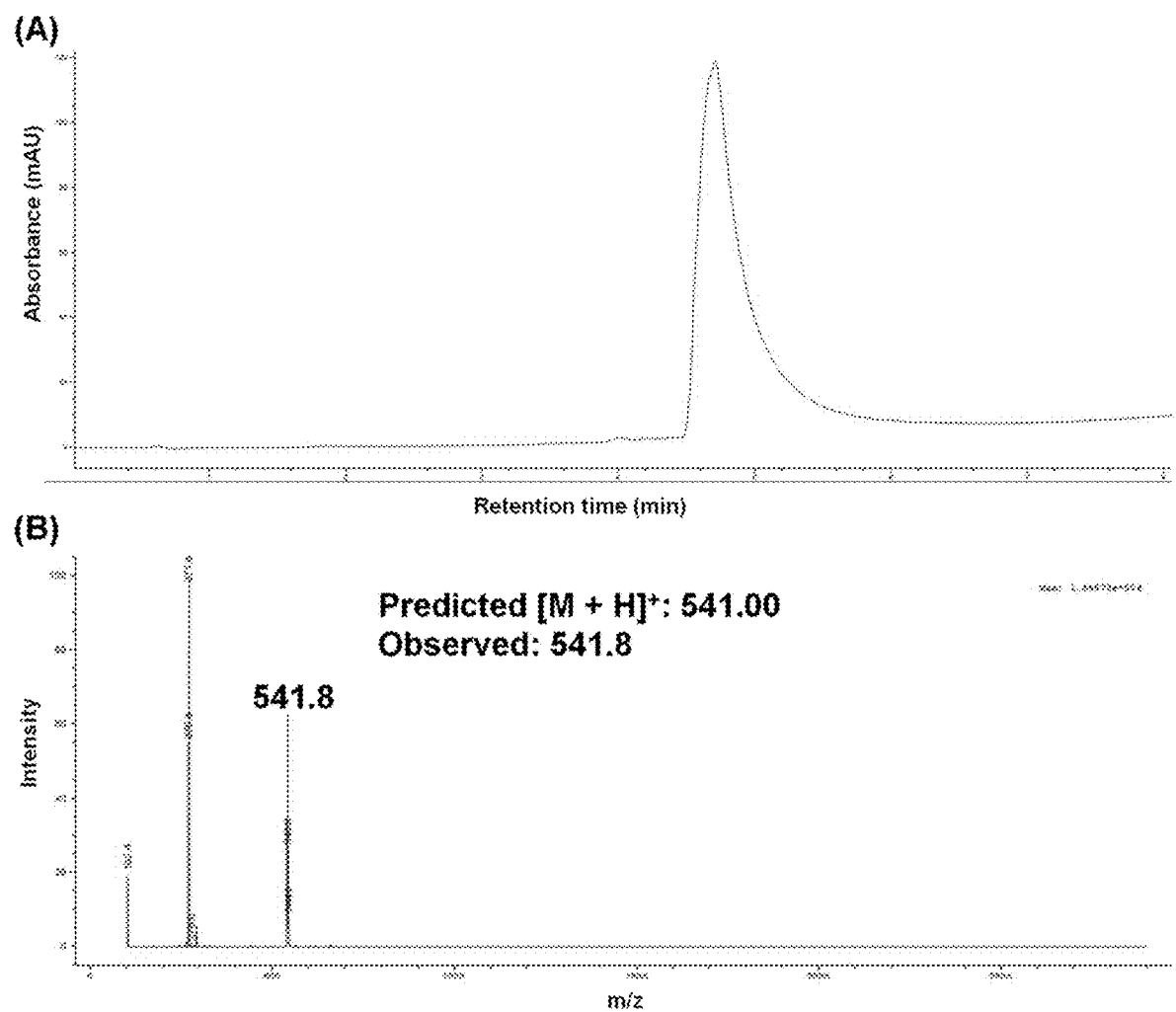
FIG. 39. HPLC trace (A) and ESI-Mass spectra (B) of compound 11.
Figure 40:
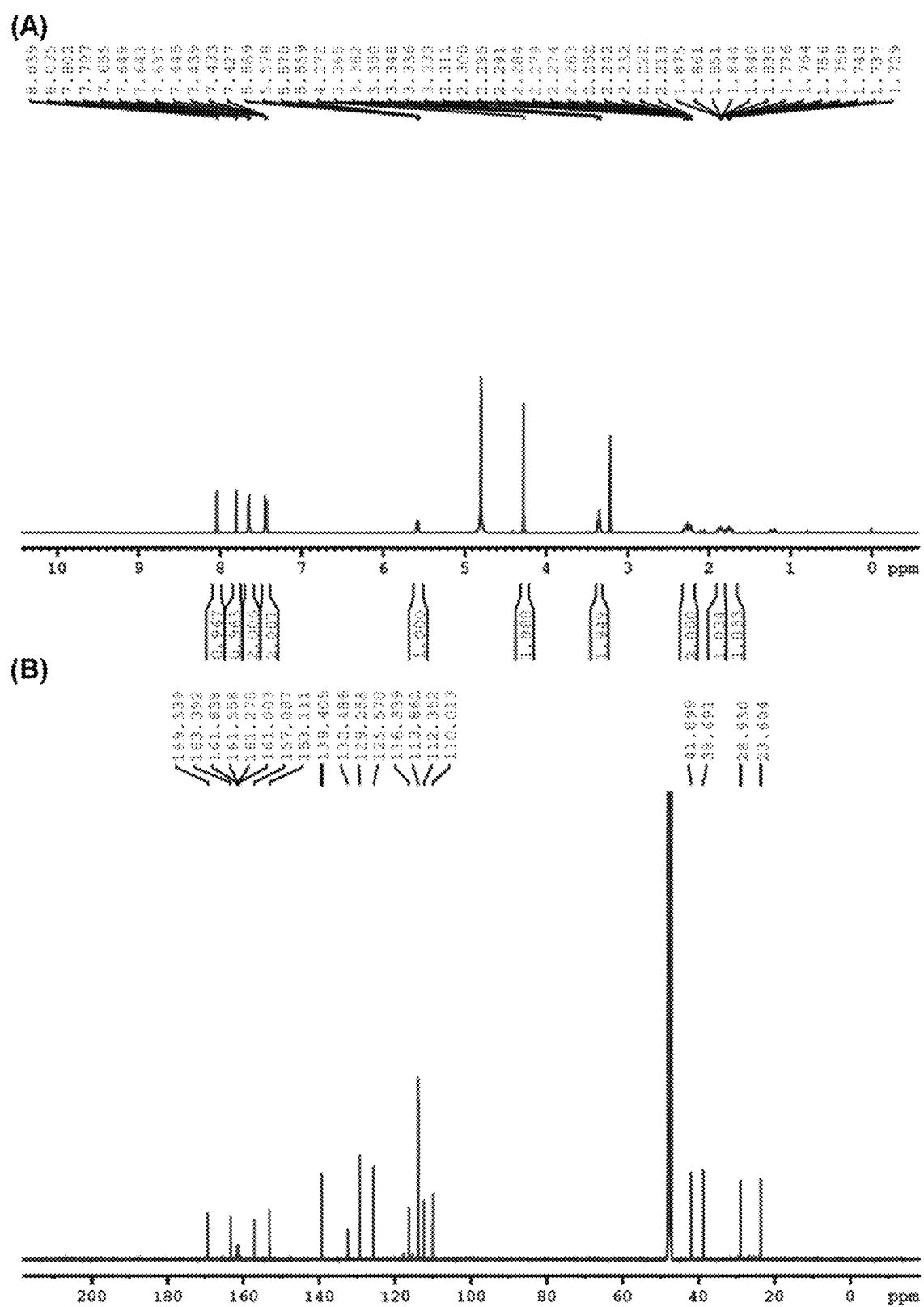
FIG. 40. $^1$H (A) and $^{13}$C (B) NMR spectra of compound 12 in $CD_3OD$.
Figure 41:
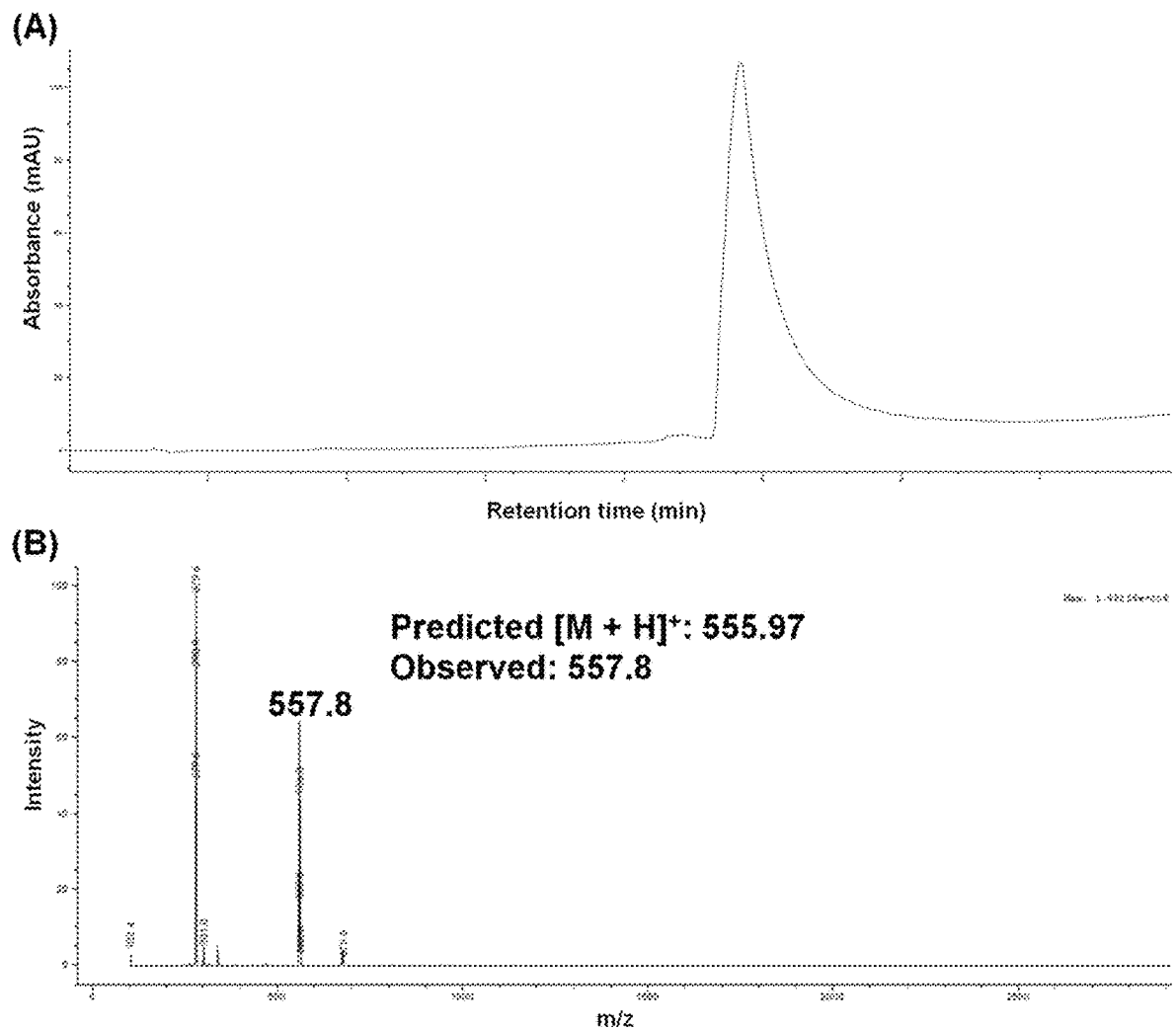
FIG. 41. HPLC trace (A) and ESI-Mass spectra (B) of compound 12.
Figure 42:
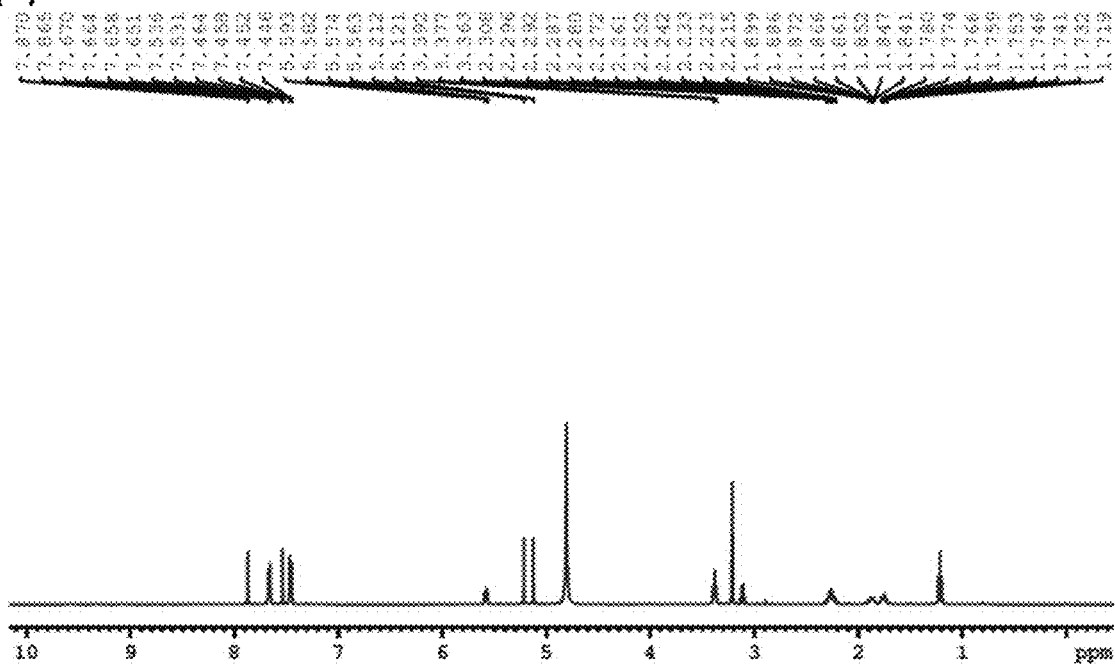
FIG. 42. $^1$H (A) and $^{13}$C (B) NMR spectra of compound 13 in $CD_3OD$.
Figure 42:
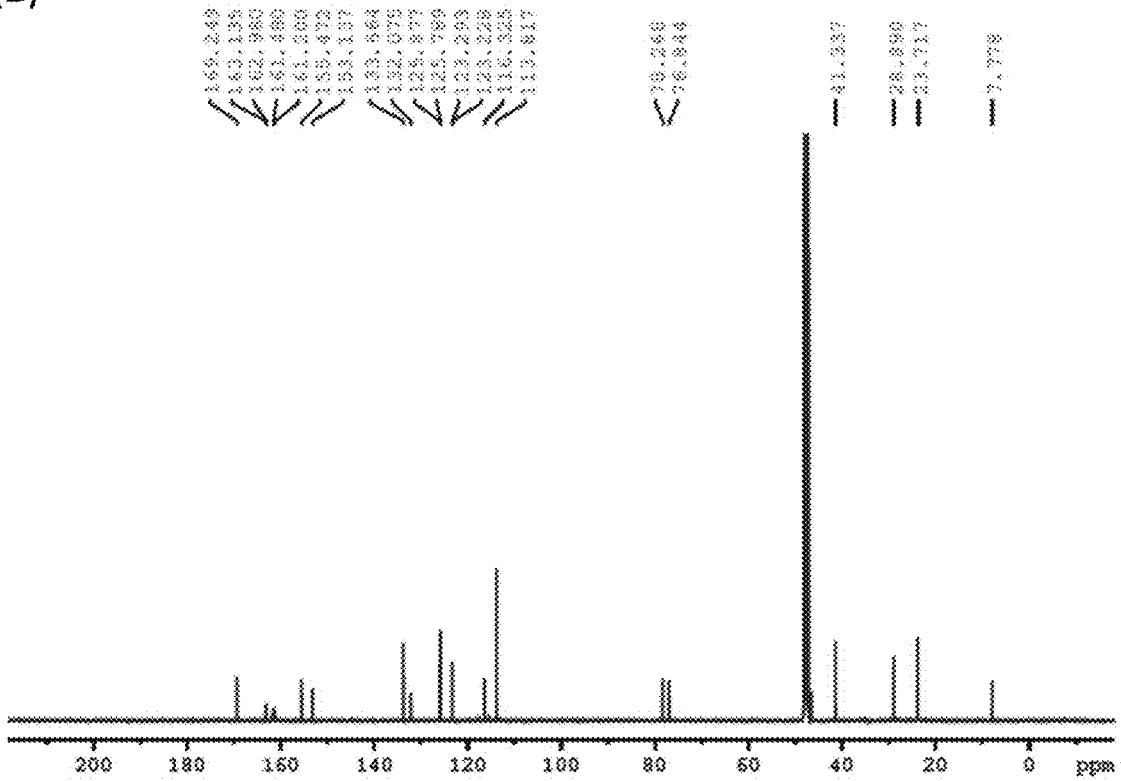
Figure 43:
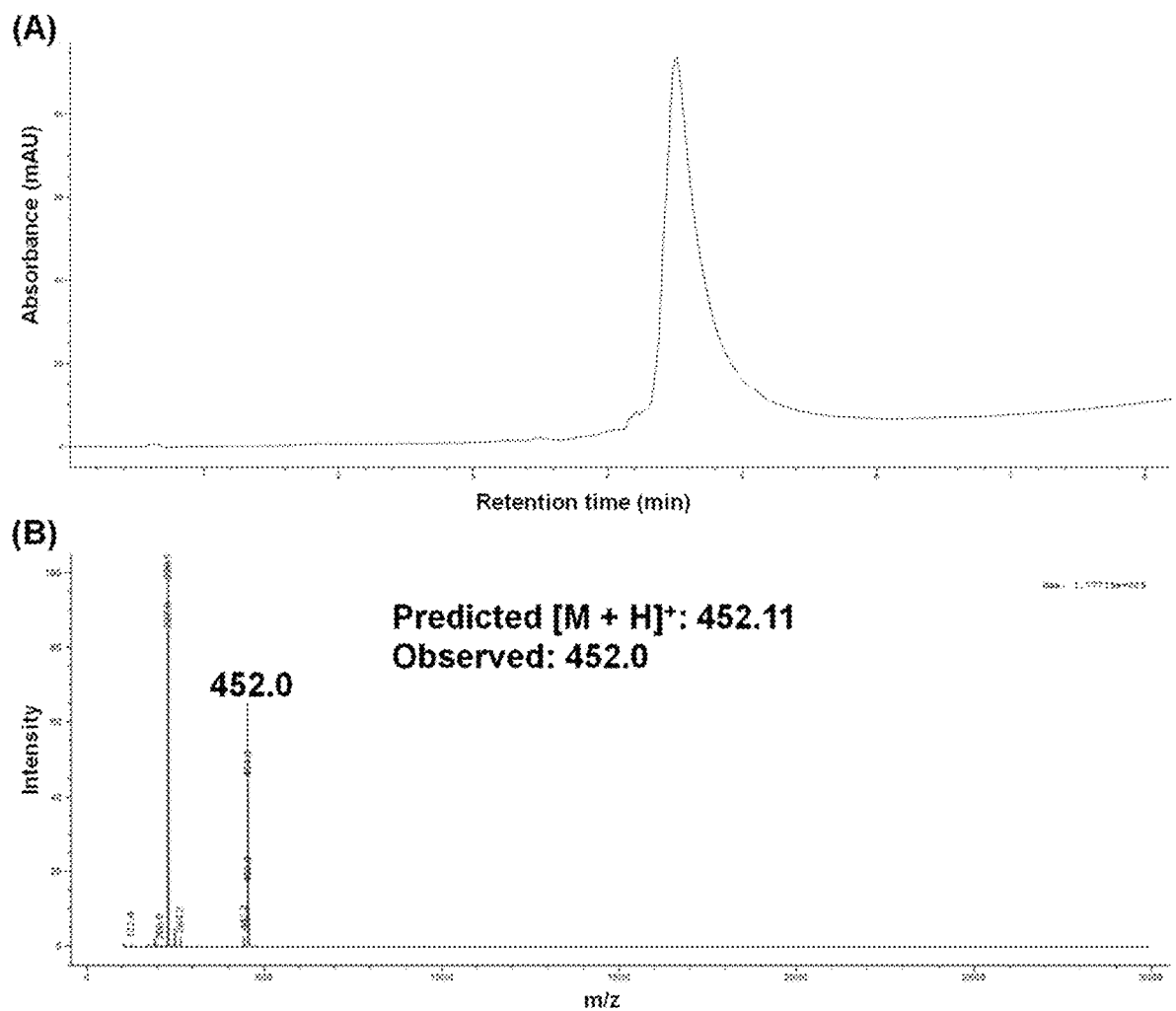
FIG. 43. HPLC trace (A) and ESI-Mass spectra (B) of compound 13.
Figure 44:
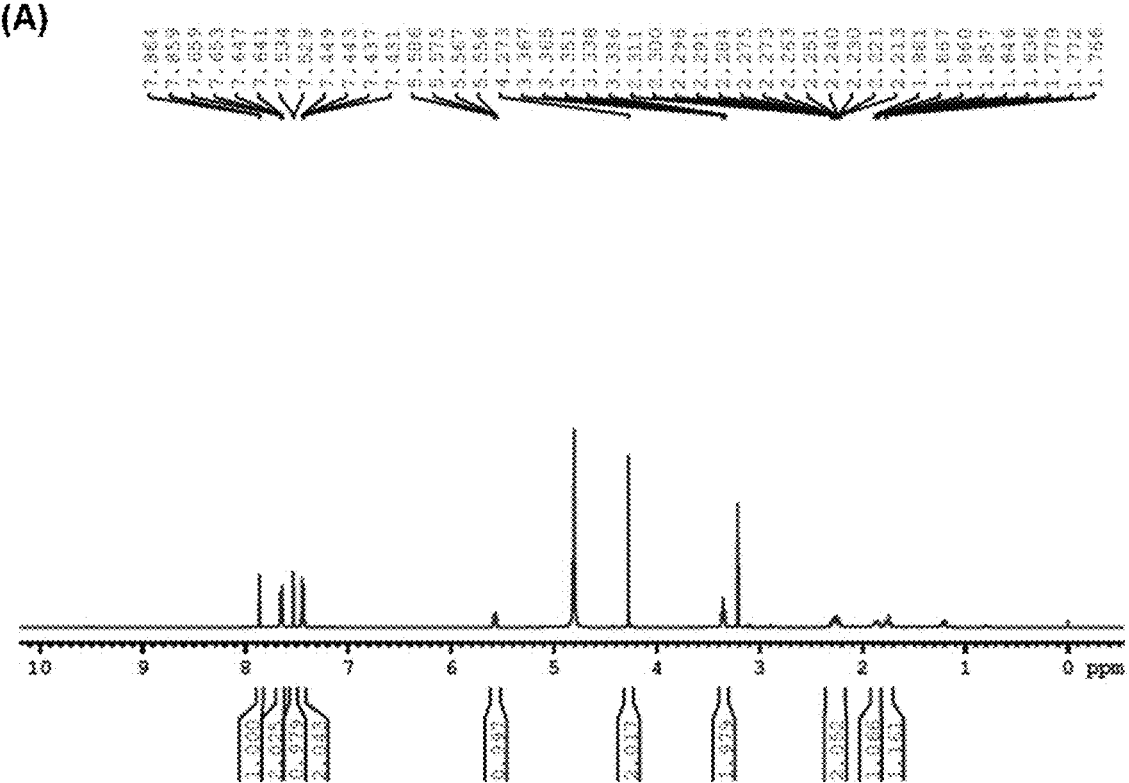
FIG. 44. $^1$H (A) and $^{13}$C (B) NMR spectra of compound 14 in $CD_3OD$.
Figure 44:
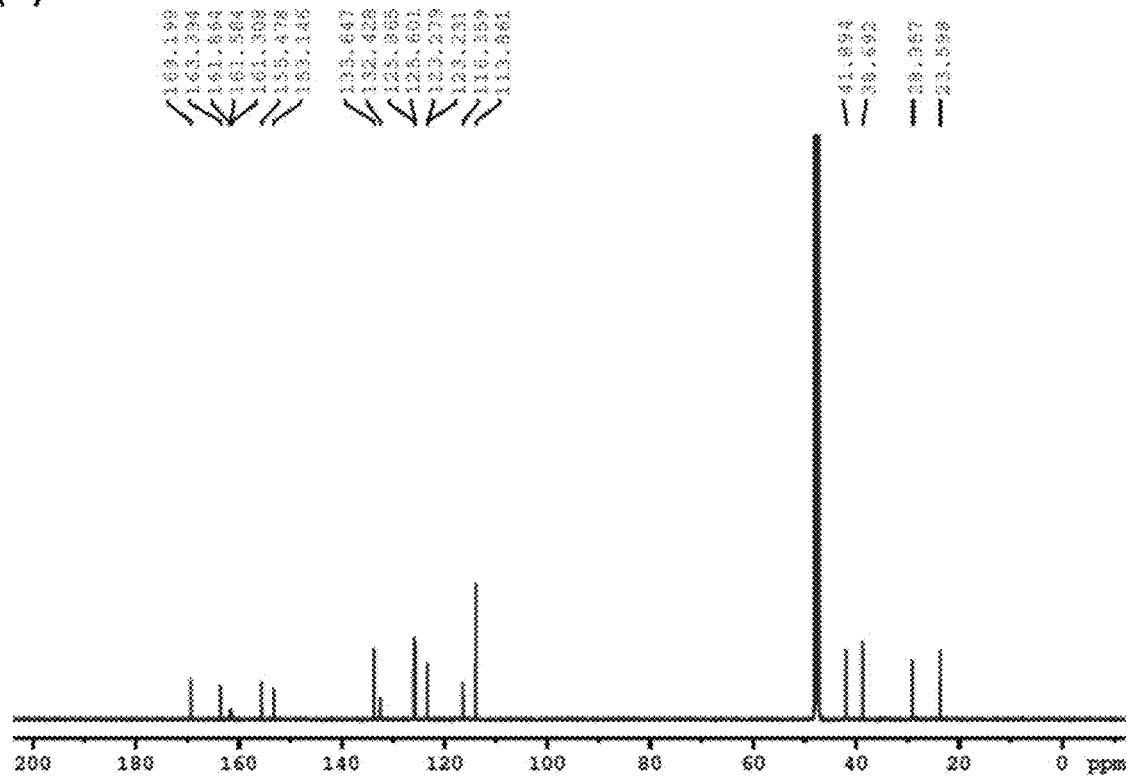
Figure 45:
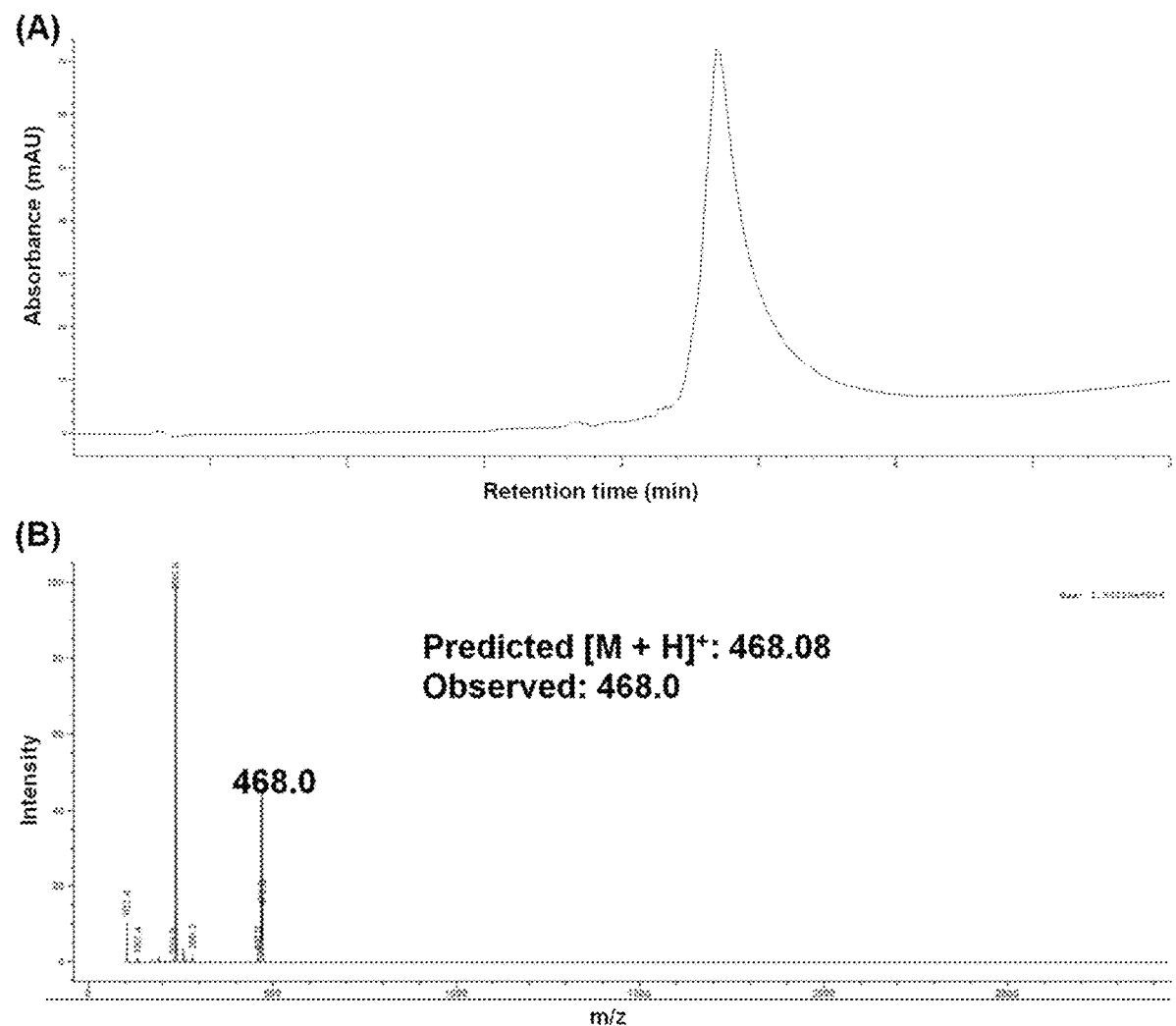
FIG. 45. HPLC trace (A) and ESI-Mass spectra (B) of compound 14.
Figure 46:
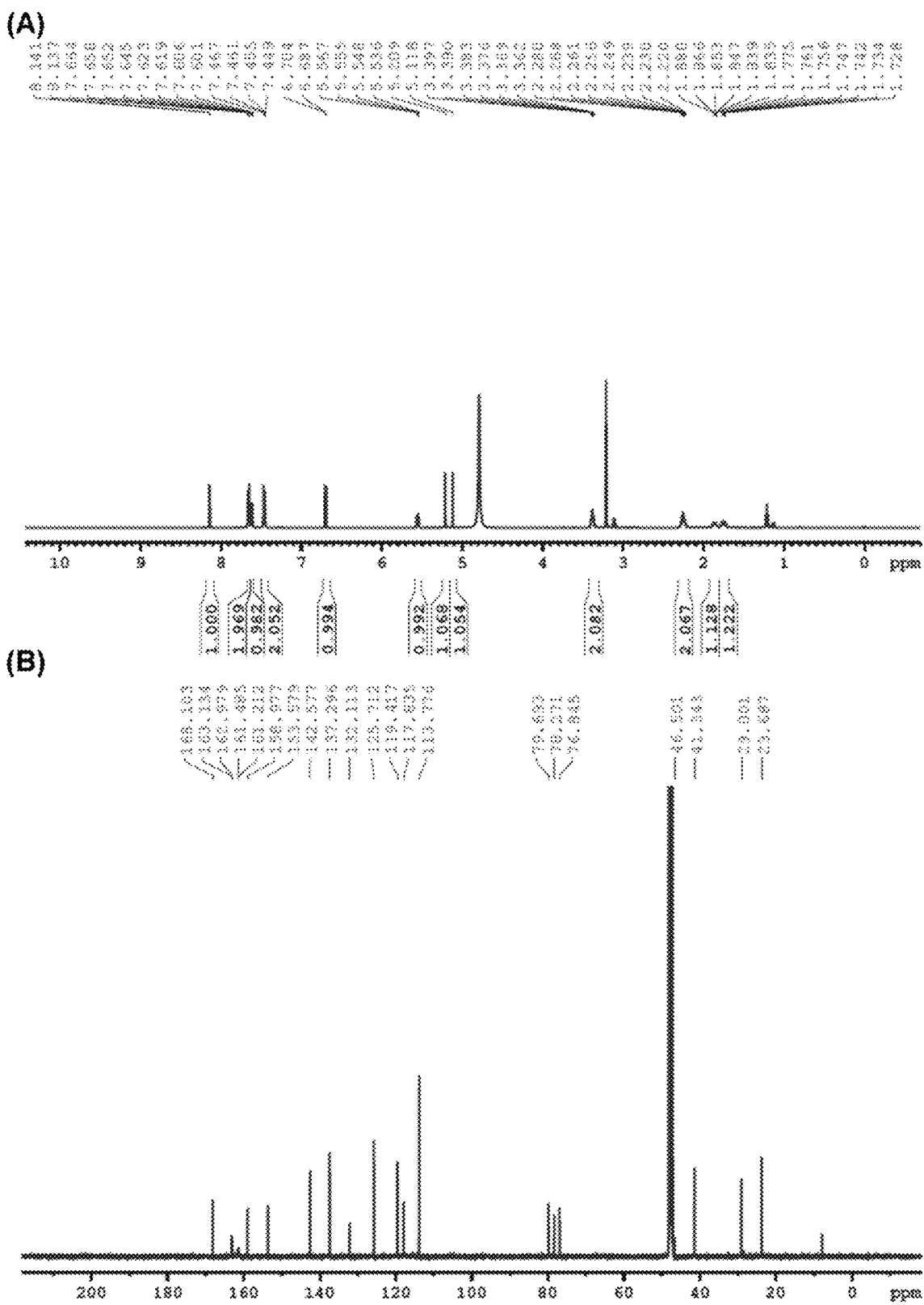
FIG. 46. $^1$H (A) and $^{13}$C (B) NMR spectra of compound 15 in $CD_3OD$.
Figure 47:
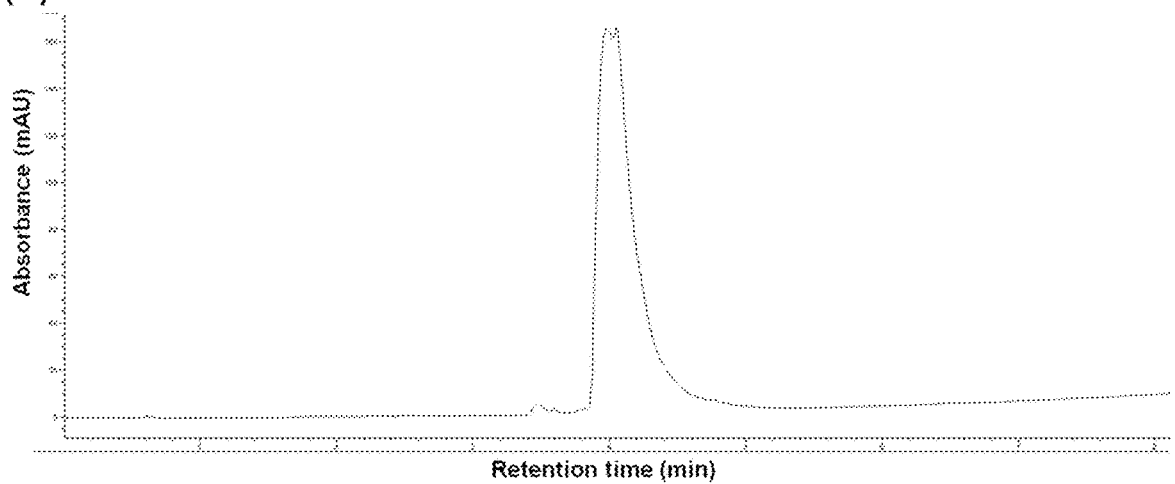
FIG. 47. HPLC trace (A) and ESI-Mass spectra (B) of compound 15.
Figure 47:
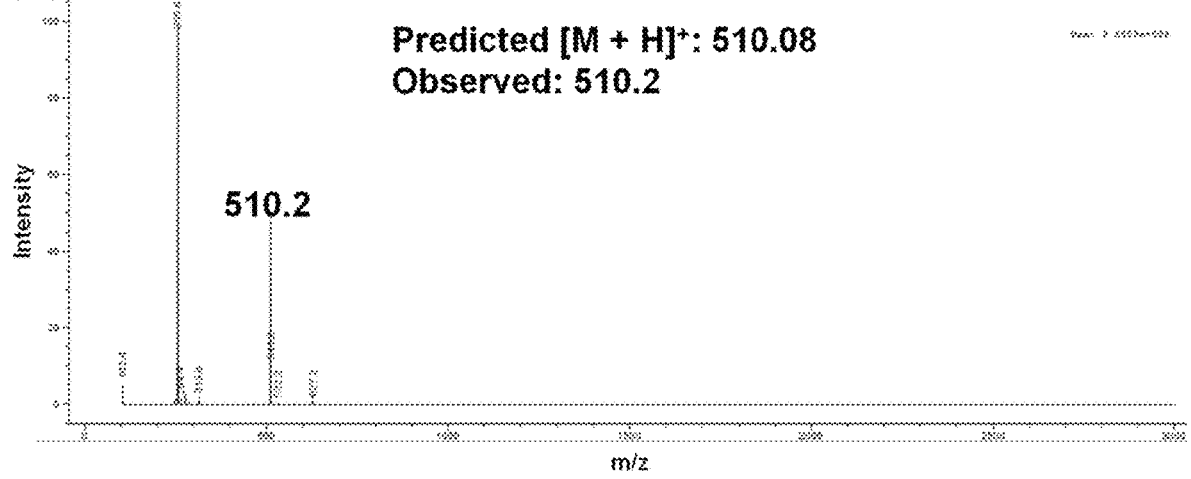
Figure 48:
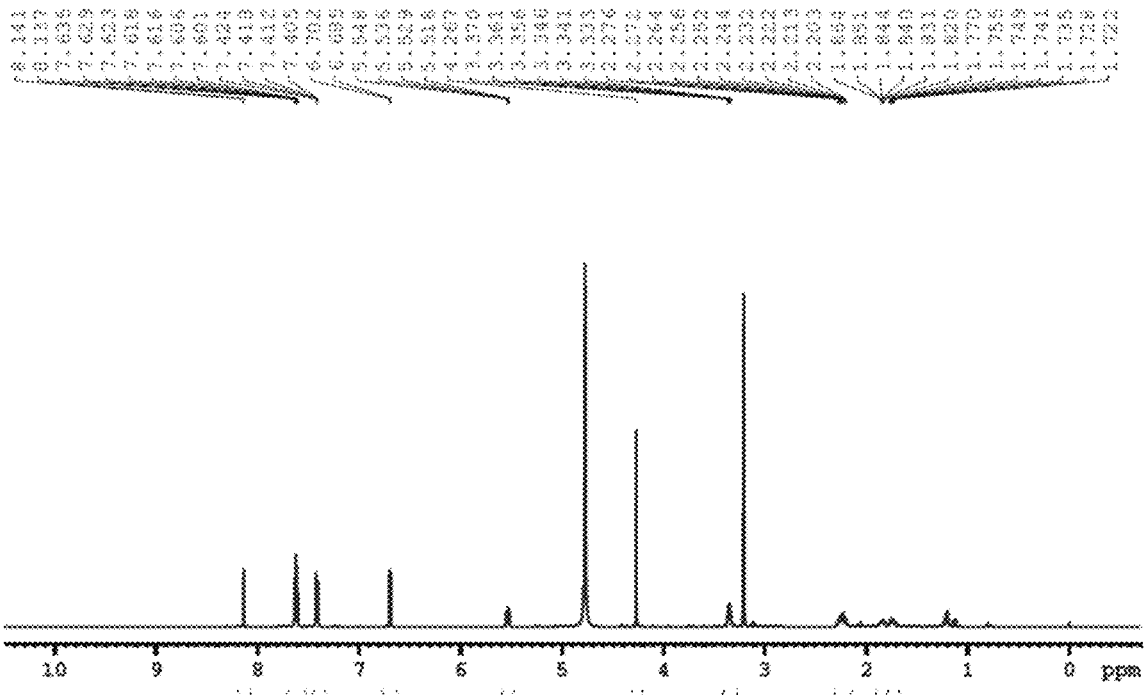
FIG. 48. $^1$H (A) and $^{13}$C (B) NMR spectra of compound 16 in $CD_3OD$.
Figure 48:
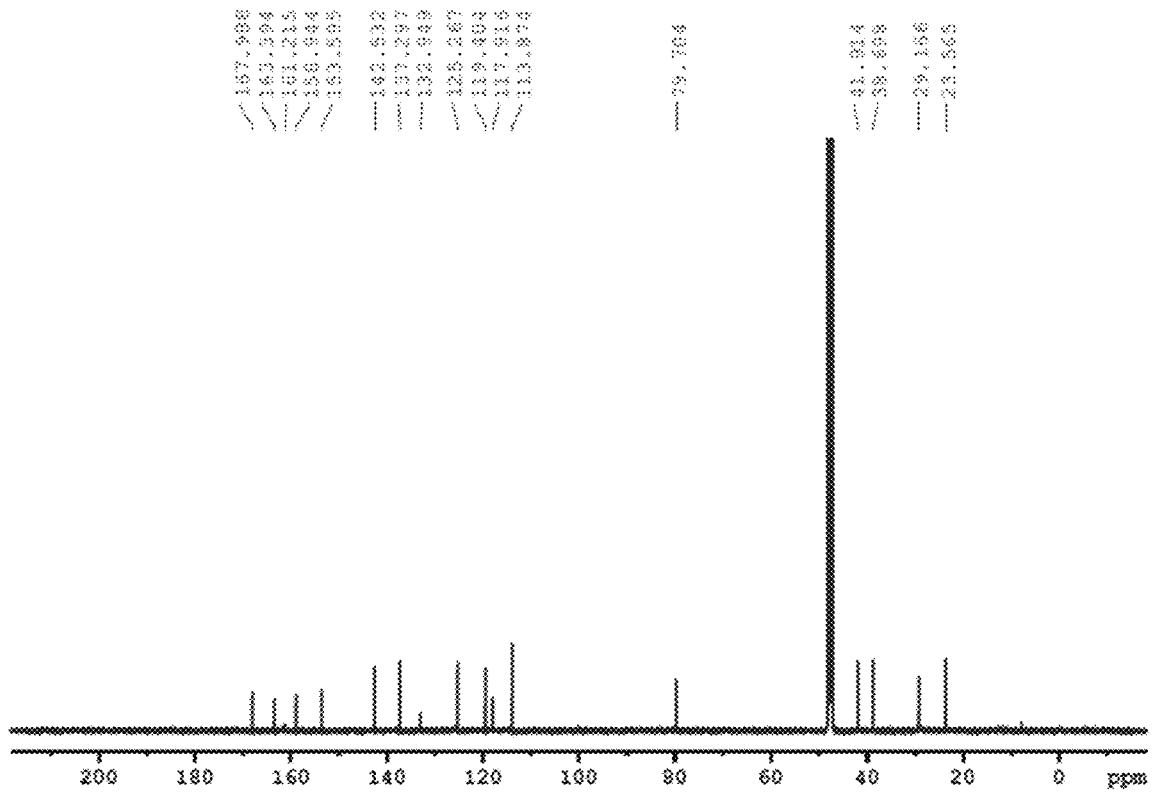
Figure 49:
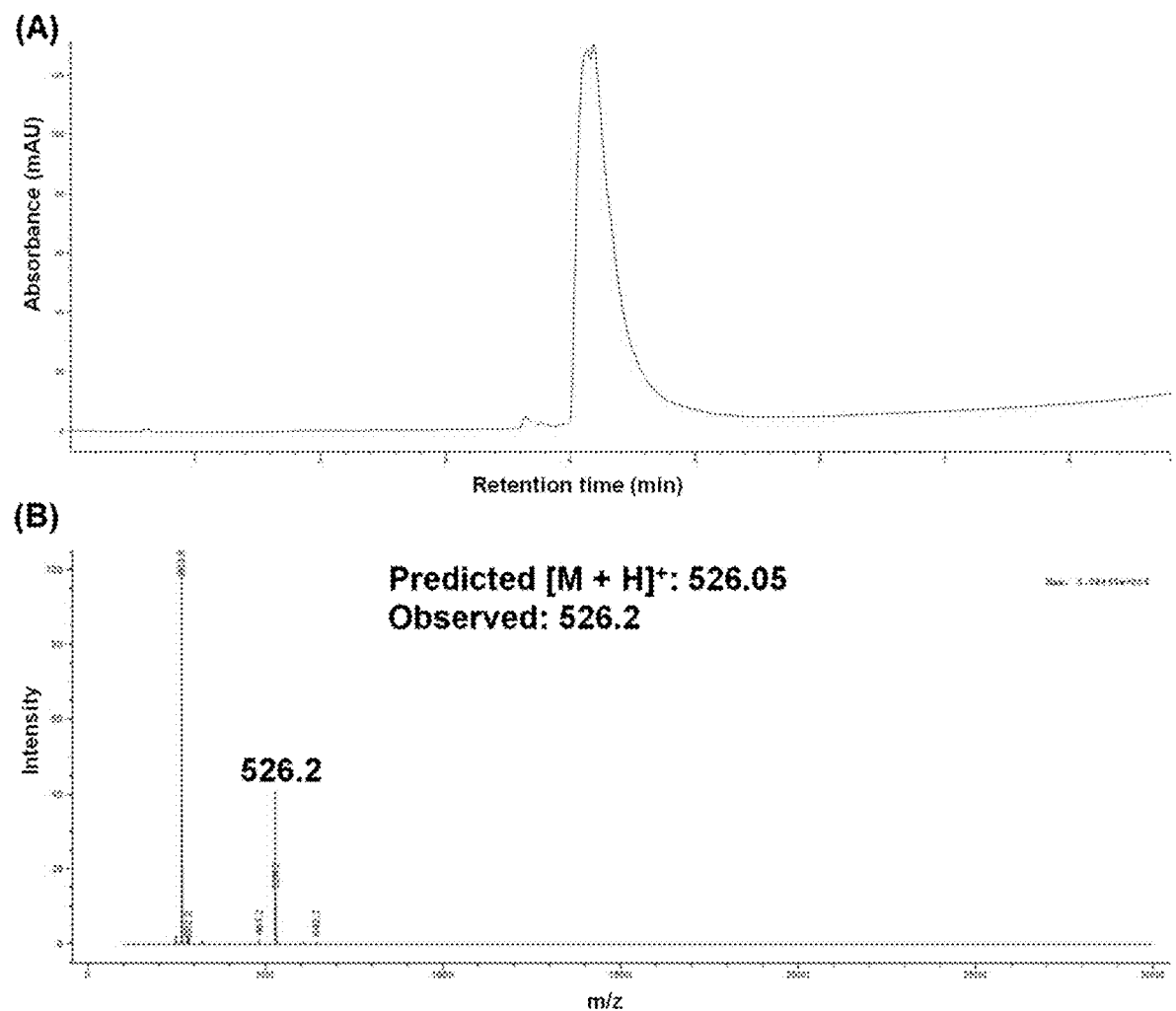
FIG. 49. HPLC trace (A) and ESI-Mass spectra (B) of compound 16.
Figure 50:
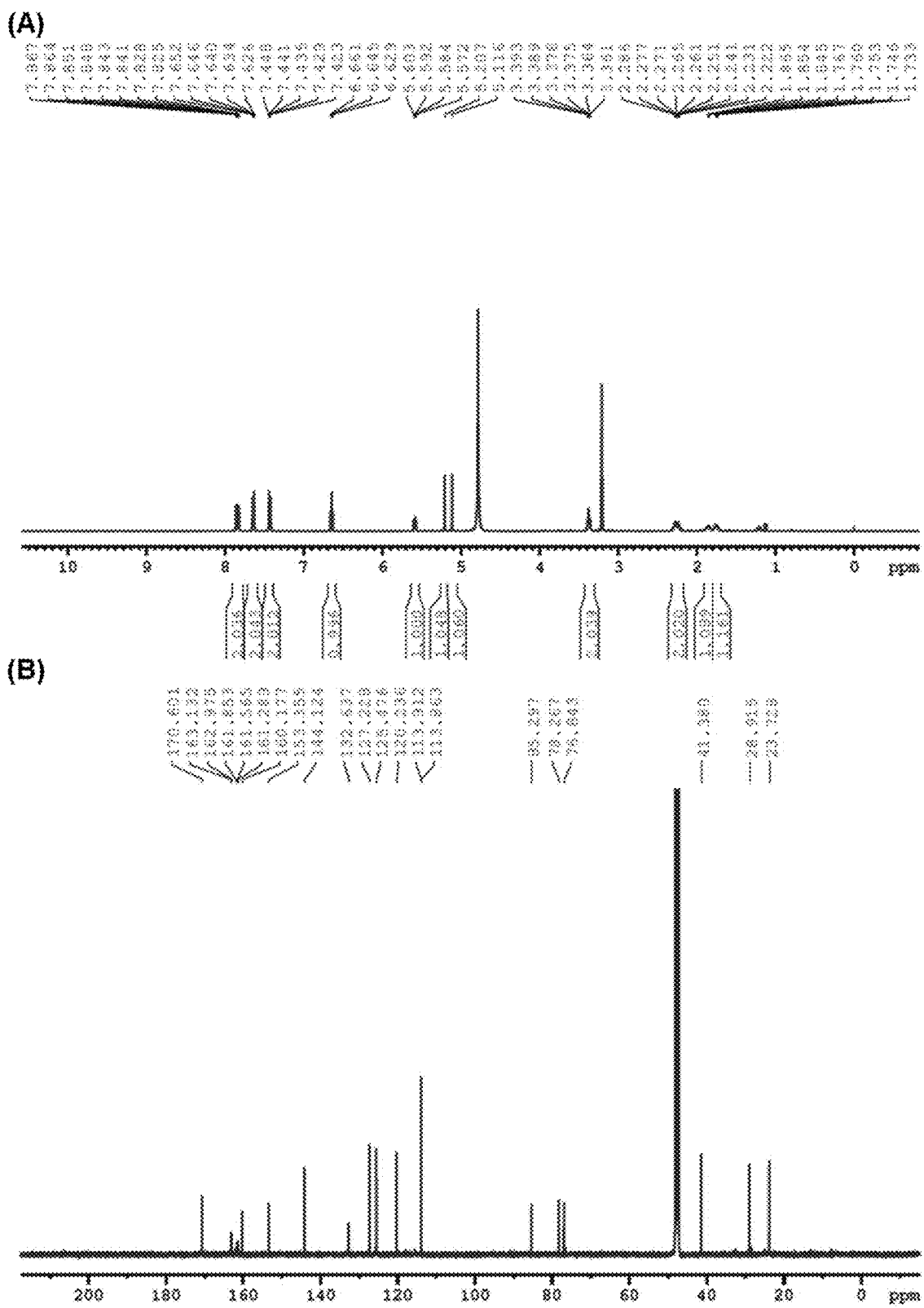
FIG. 50. $^1$H (A) and $^{13}$C (B) NMR spectra of compound 17 in $CD_3OD$.
Figure 51:
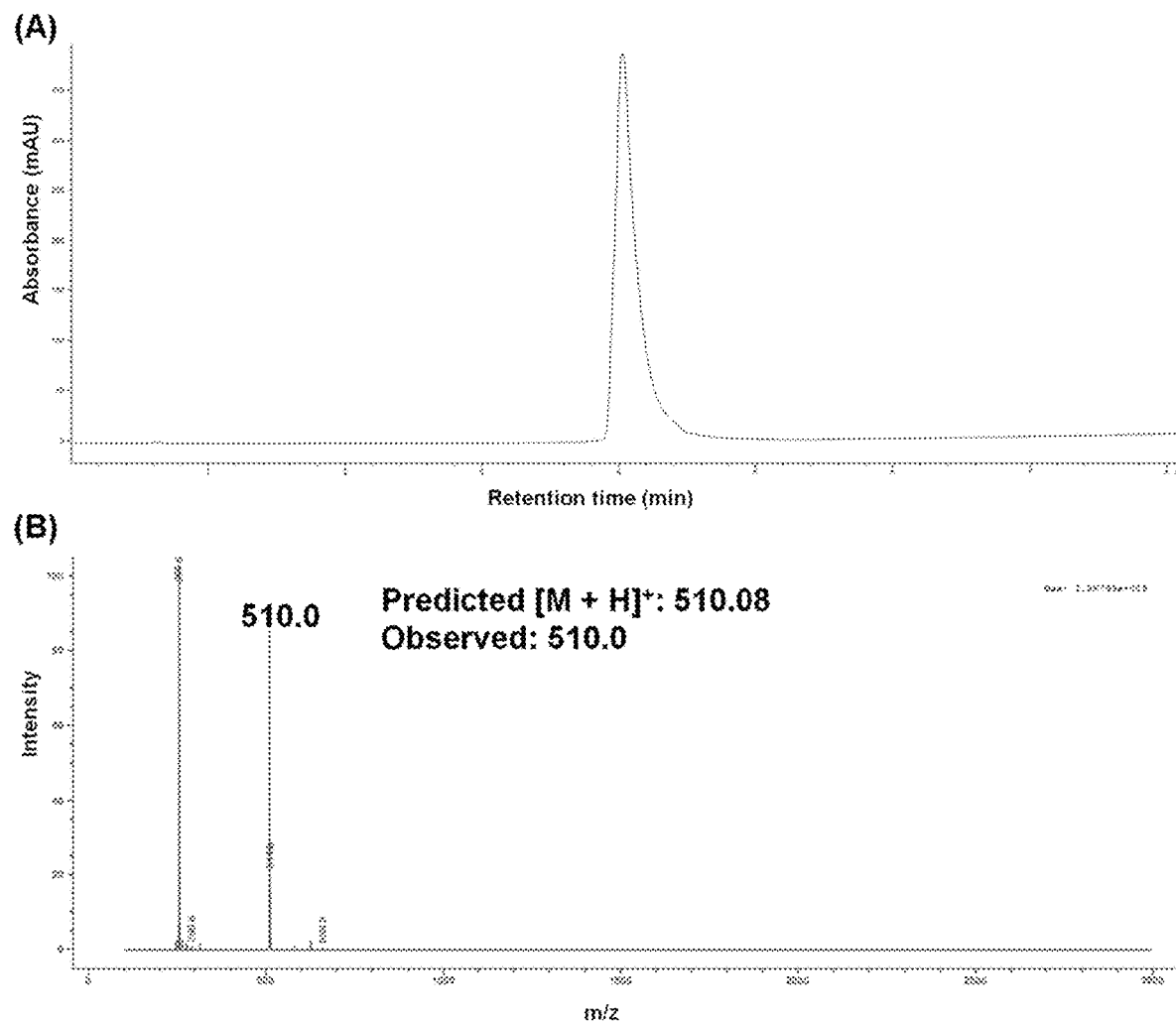
FIG. 51. HPLC trace (A) and ESI-Mass spectra (B) of compound 17.
Figure 52:
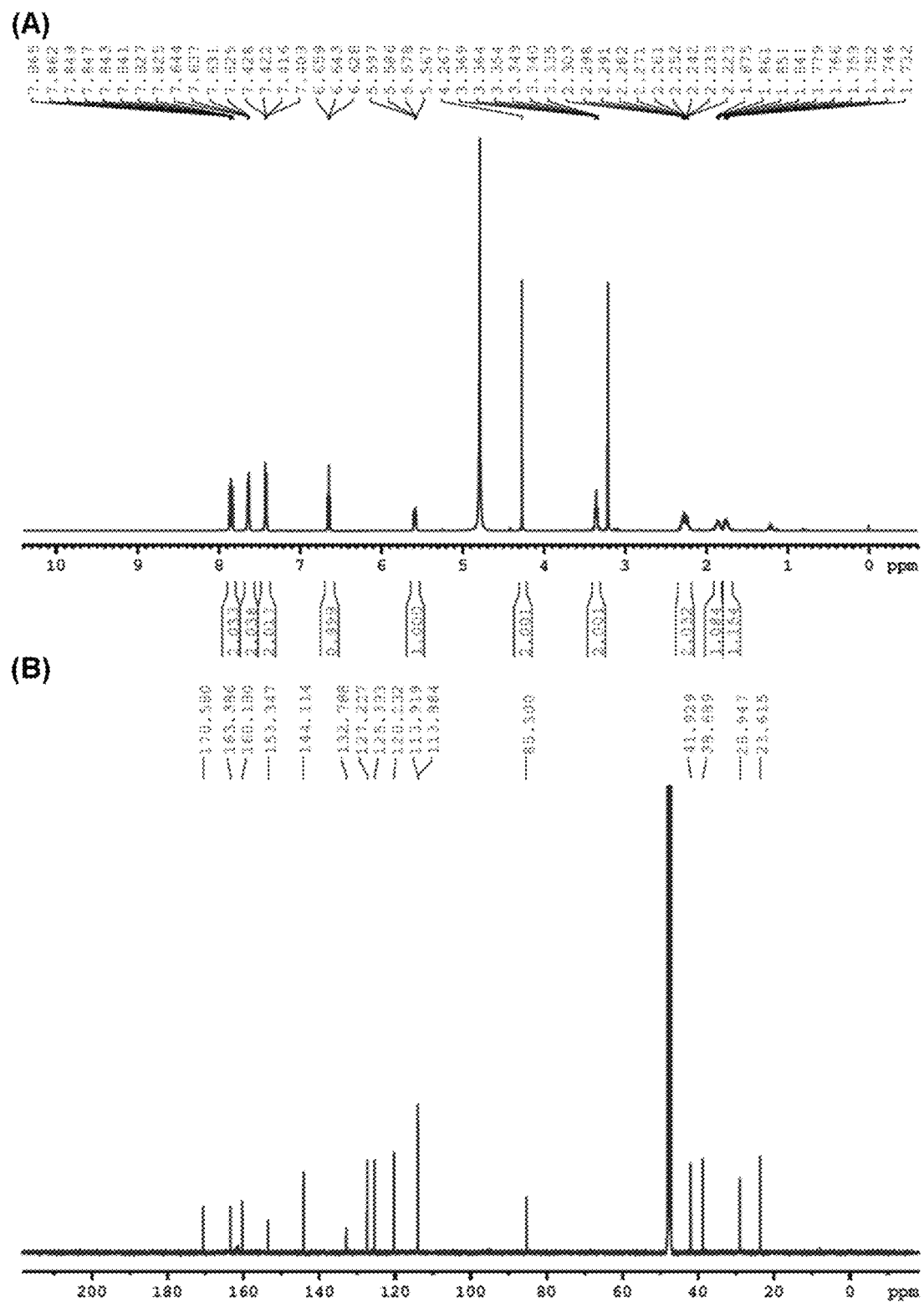
FIG. 52. $^1$H (A) and $^{13}$C (B) NMR spectra of compound 18 in $CD_3OD$.
Figure 53:
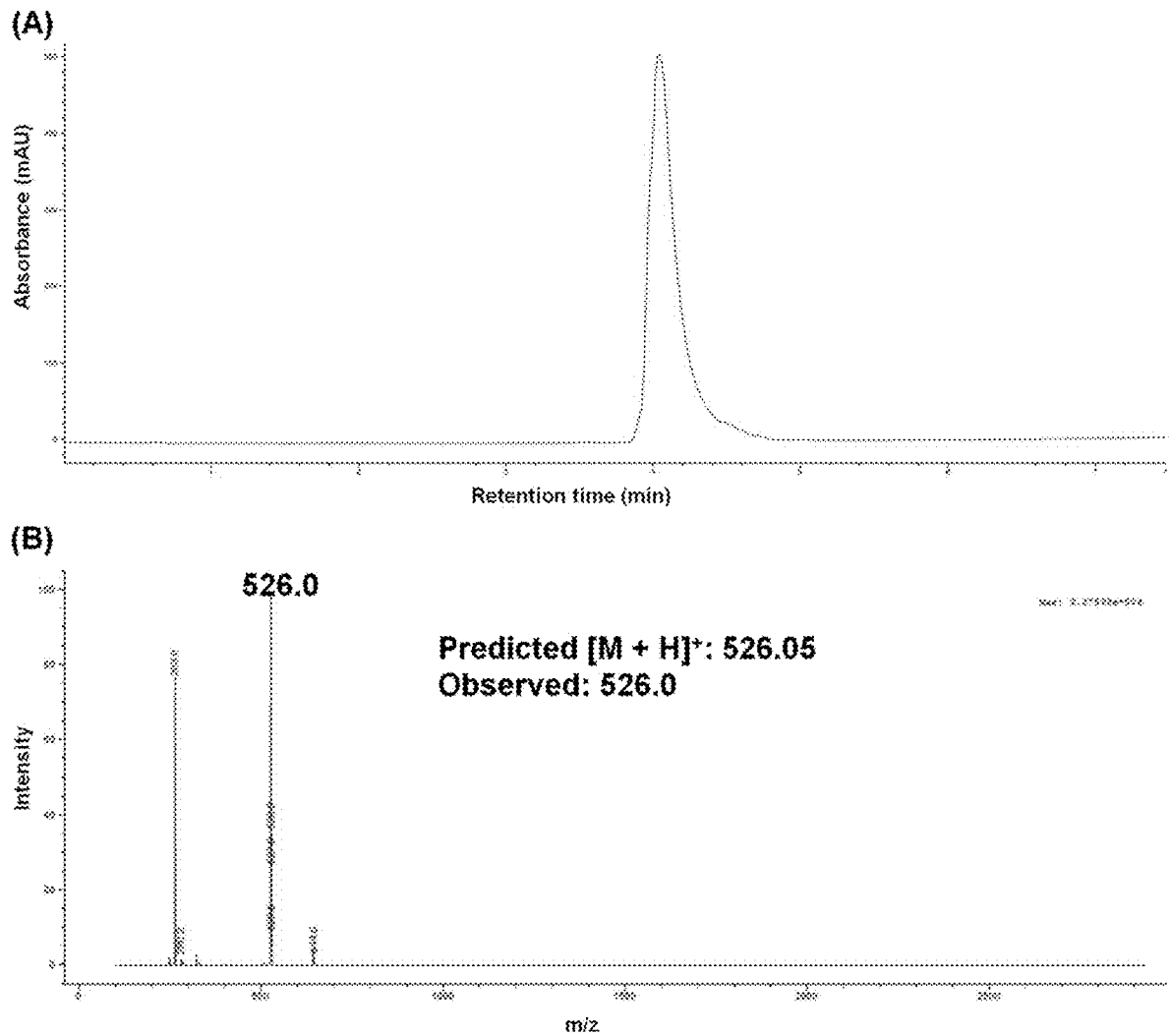
FIG. 53. HPLC trace (A) and ESI-Mass spectra (B) of compound 18.
Figure 54:
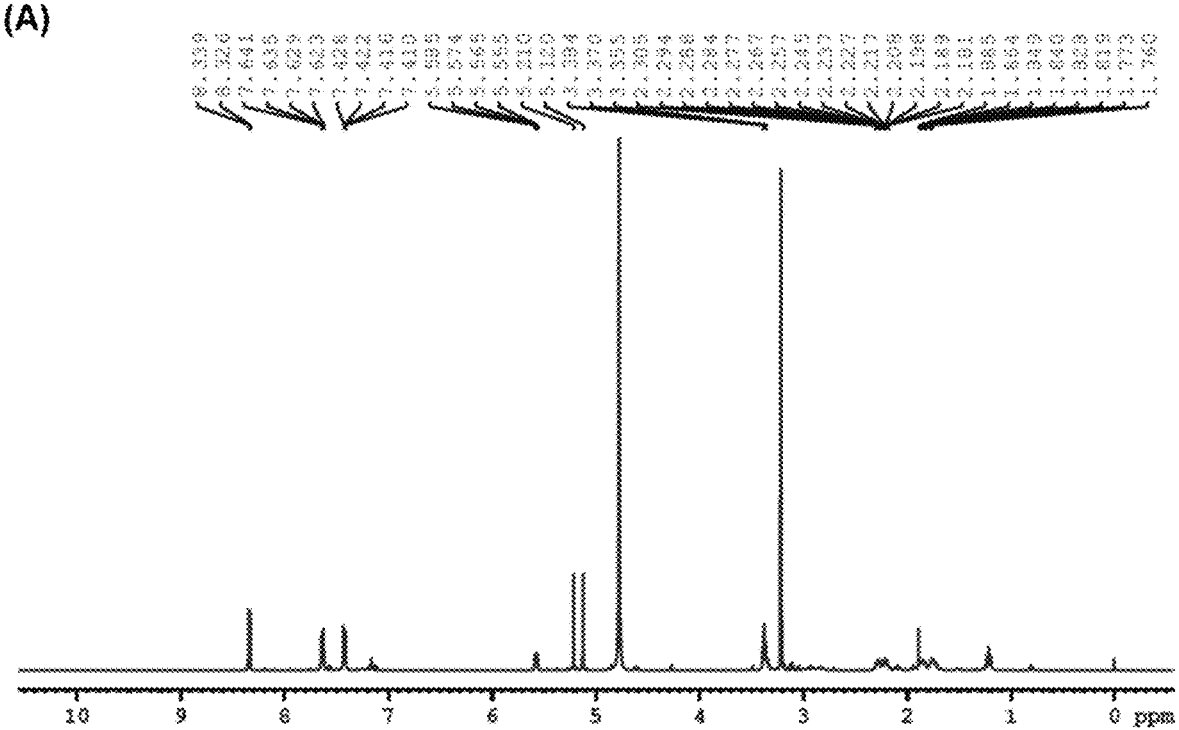
FIG. 54. $^1$H (A) and $^{13}$C (B) NMR spectra of compound 19 in $CD_3OD$.
Figure 54:
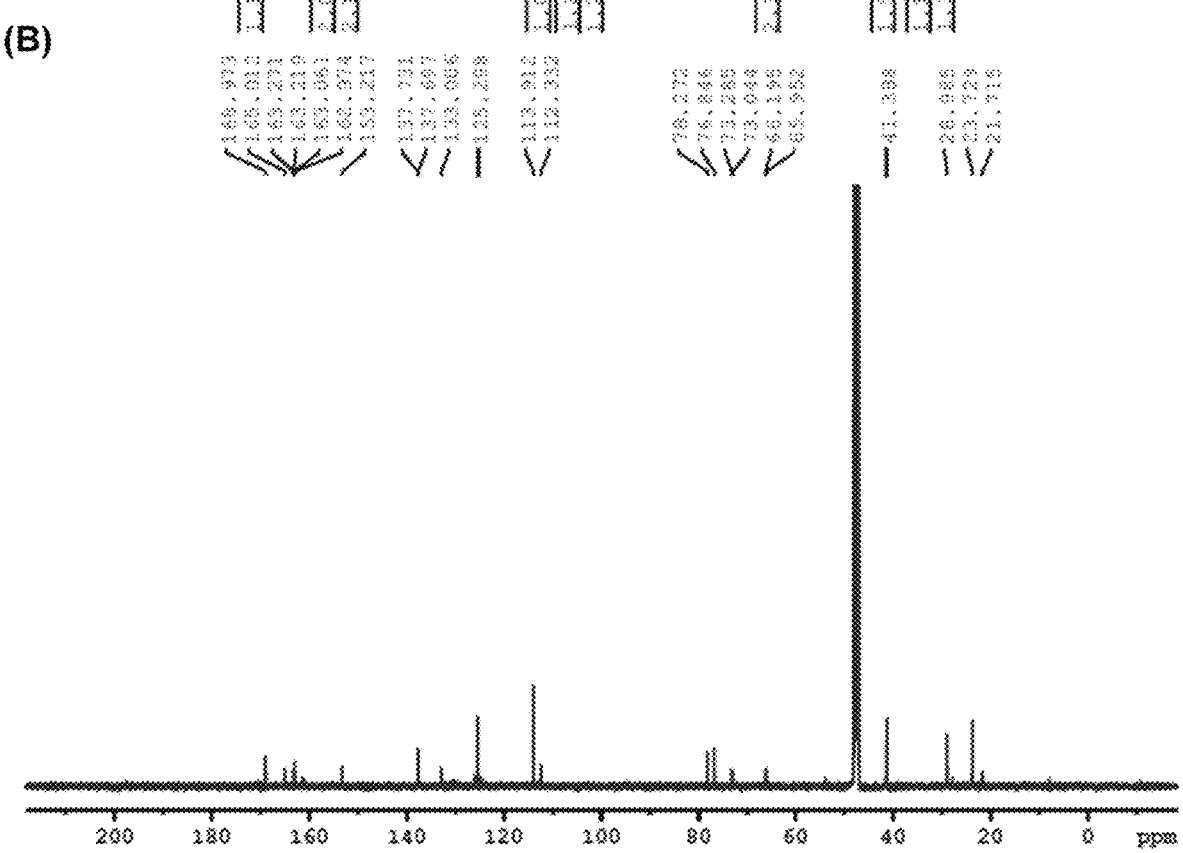
Figure 55:
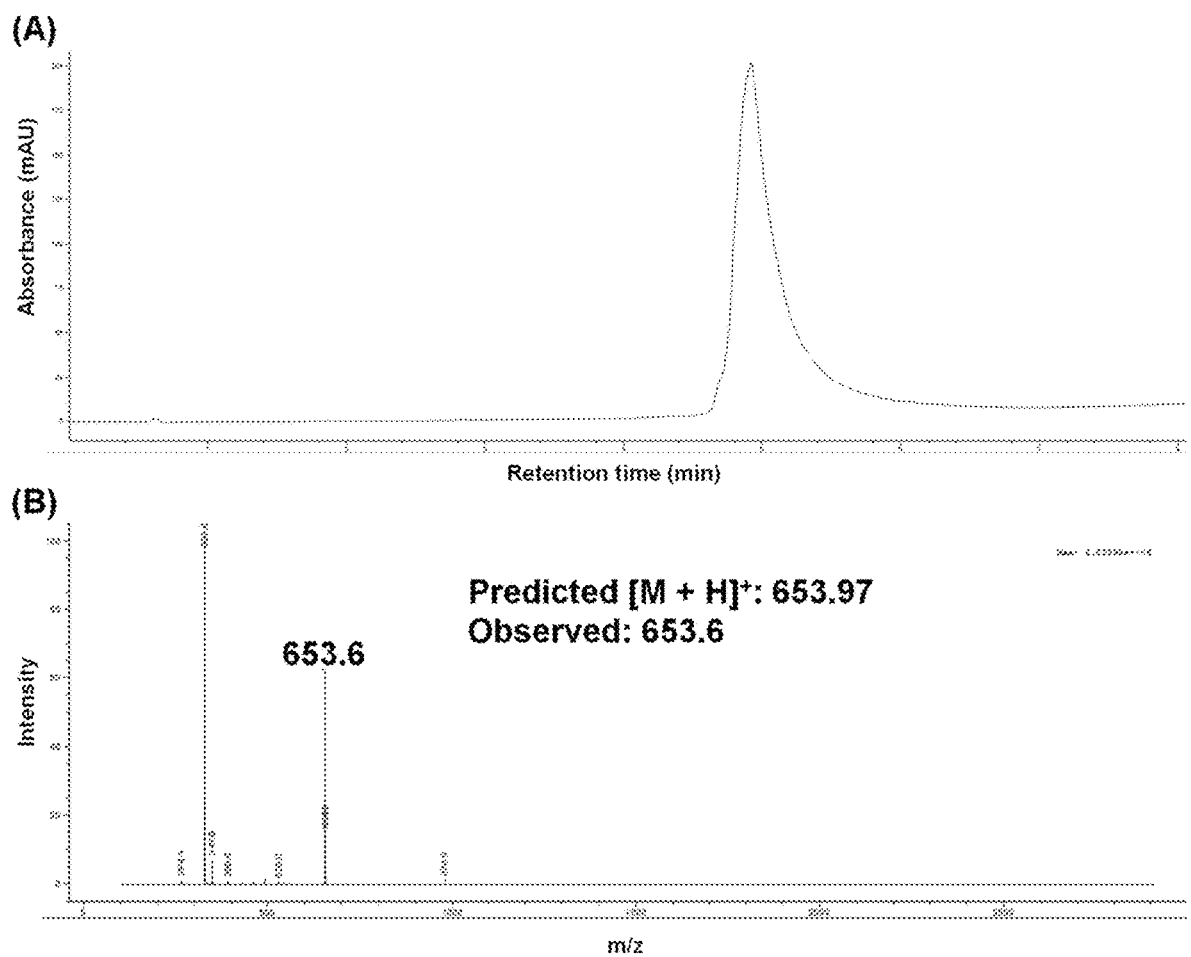
FIG. 55. HPLC trace (A) and ESI-Mass spectra (B) of compound 19.
Figure 56:
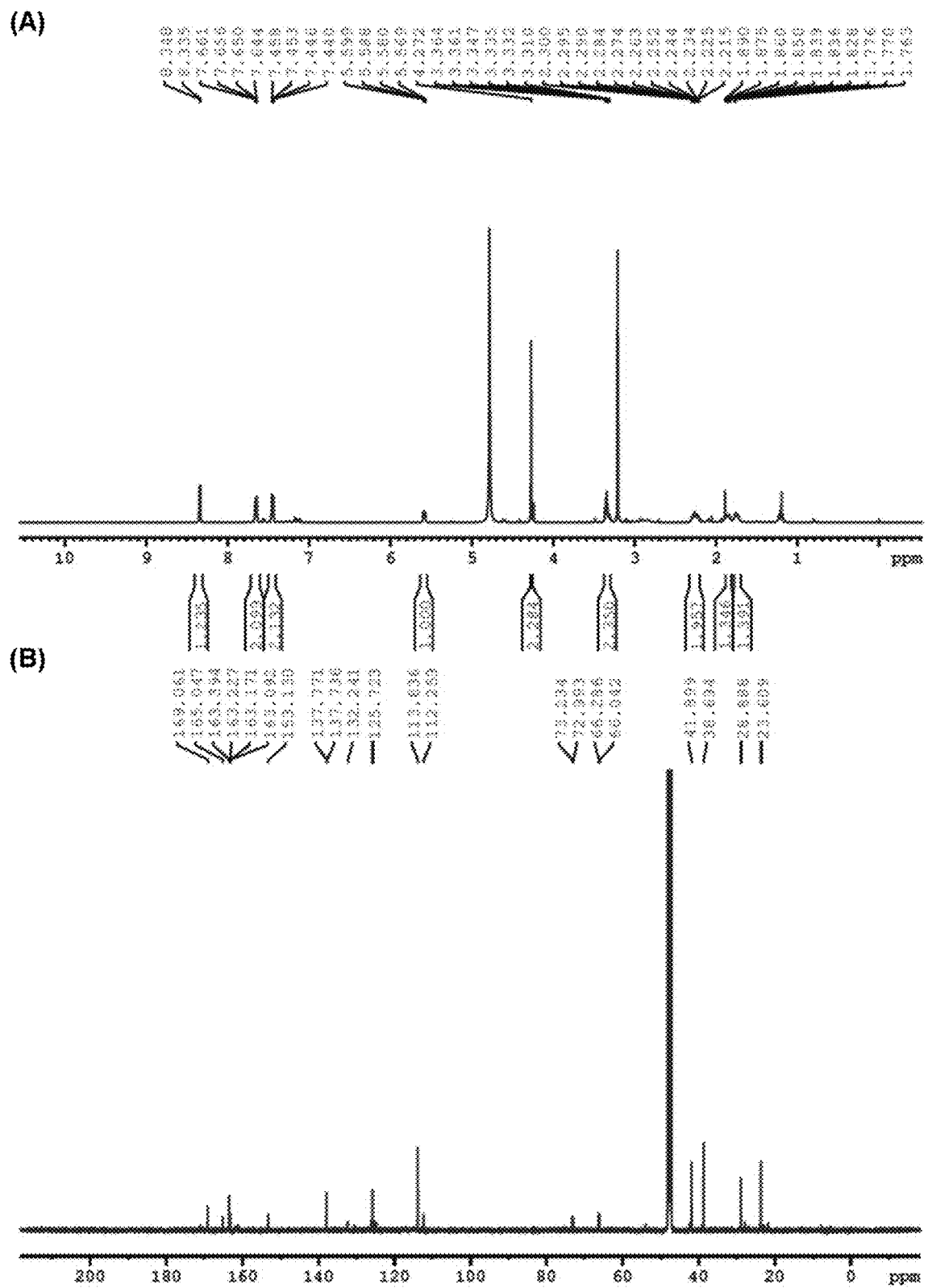
FIG. 56. $^1$H (A) and $^{13}$C (B) NMR spectra of compound 20 in $CD_3OD$.
Figure 57:
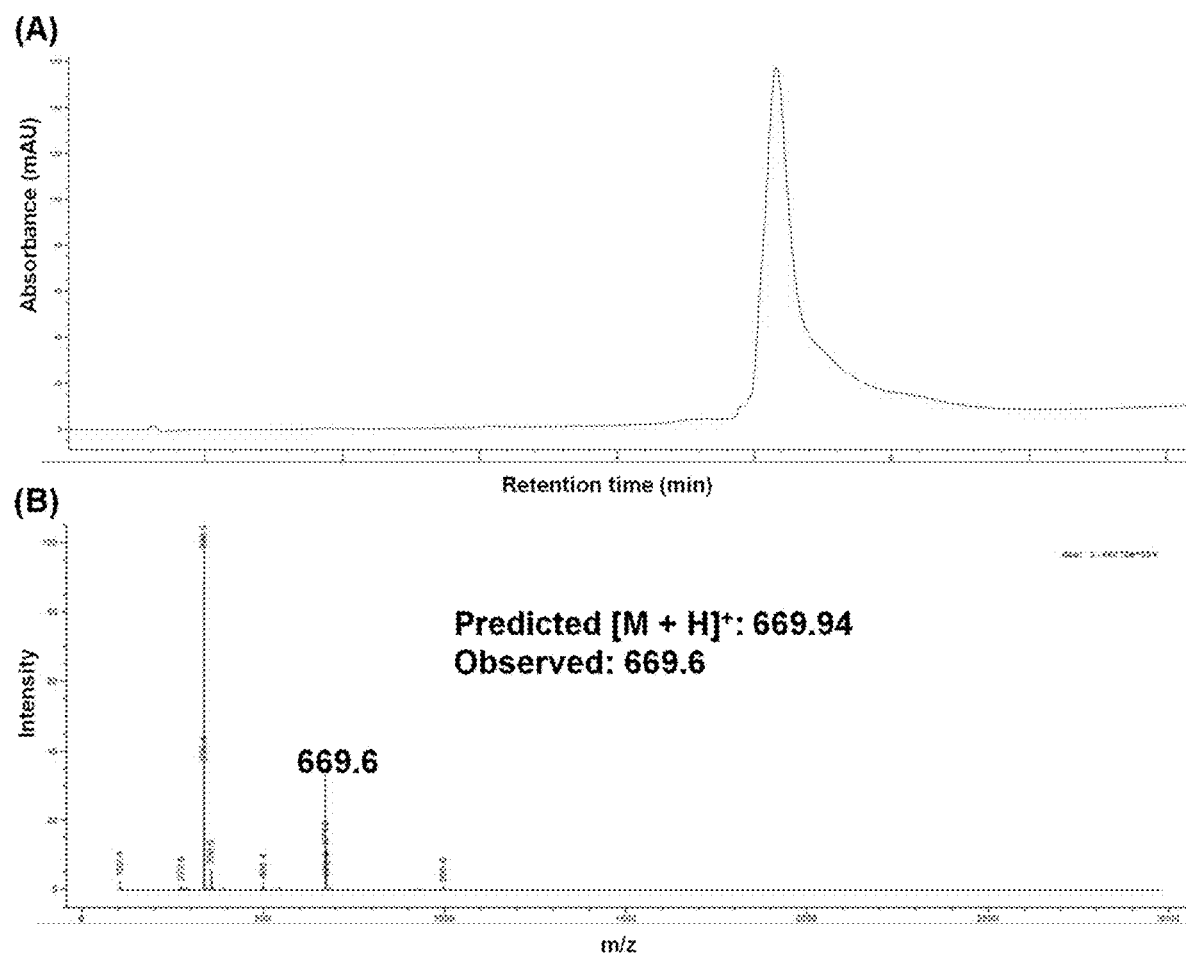
FIG. 57. HPLC trace (A) and ESI-Mass spectra (B) of compound 20.
Figure 58:
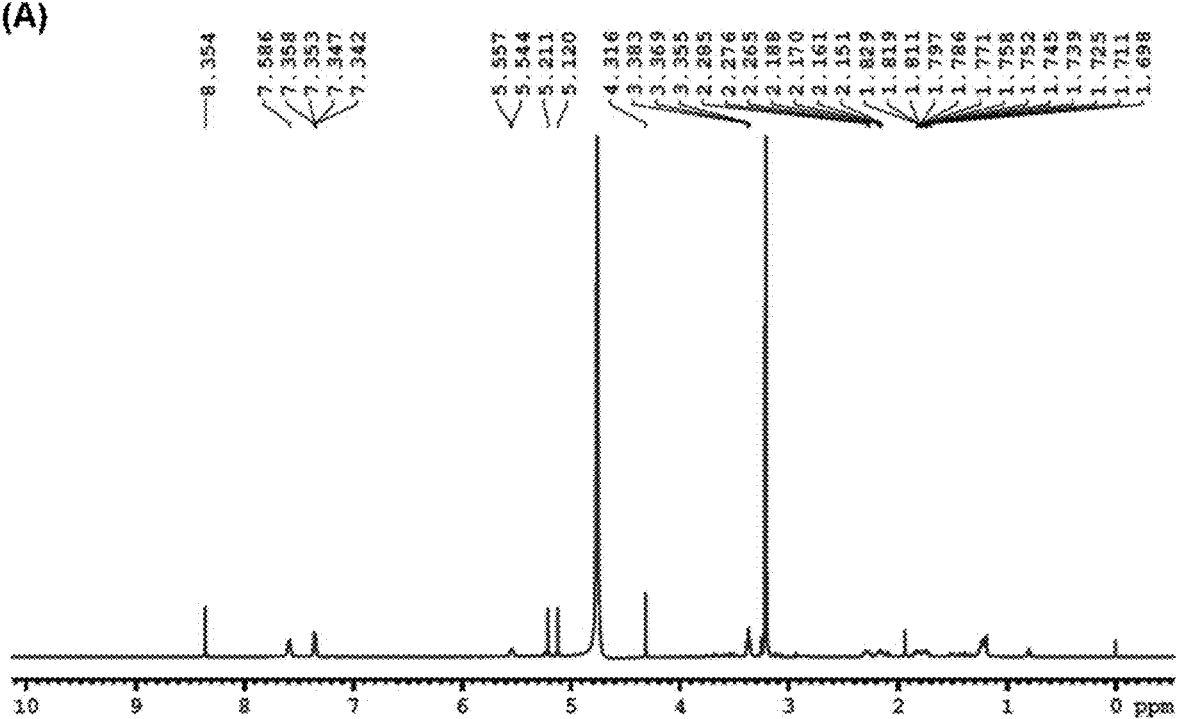
FIG. 58. $^1$H (A) and $^{13}$C (B) NMR spectra of compound 21 in $CD_3OD$.
Figure 58:
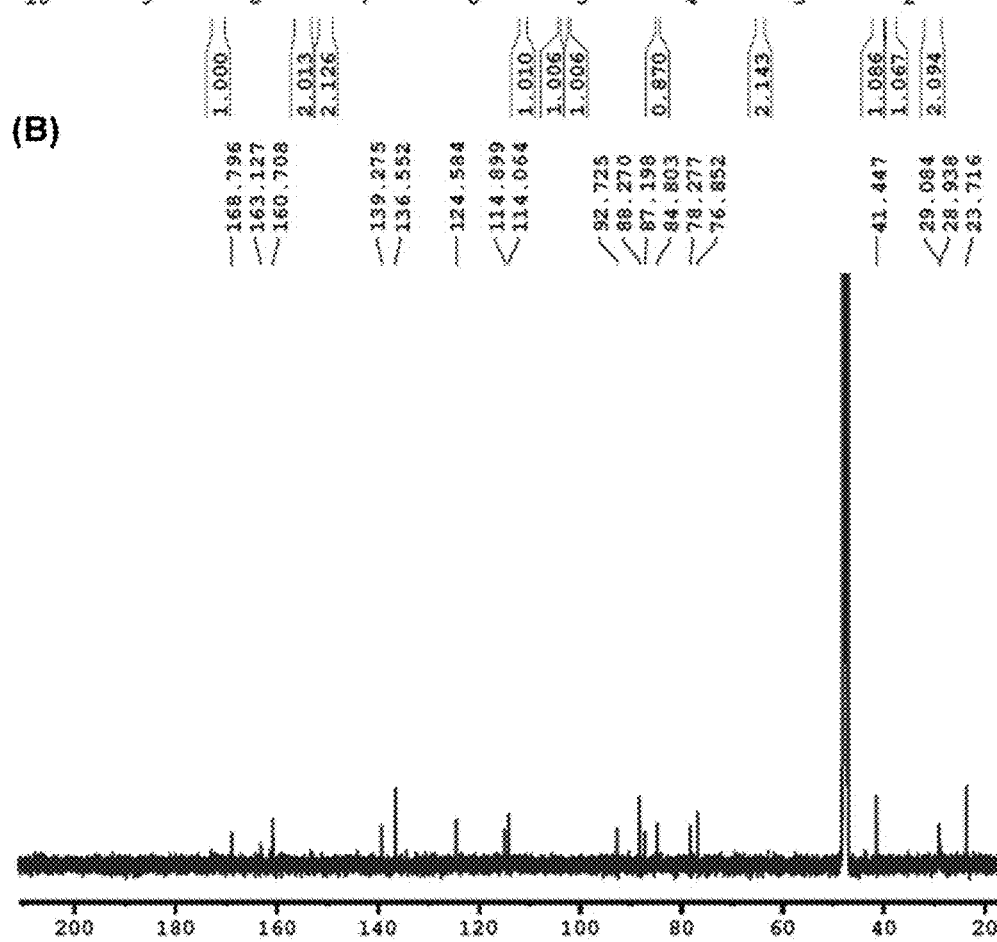
Figure 59:
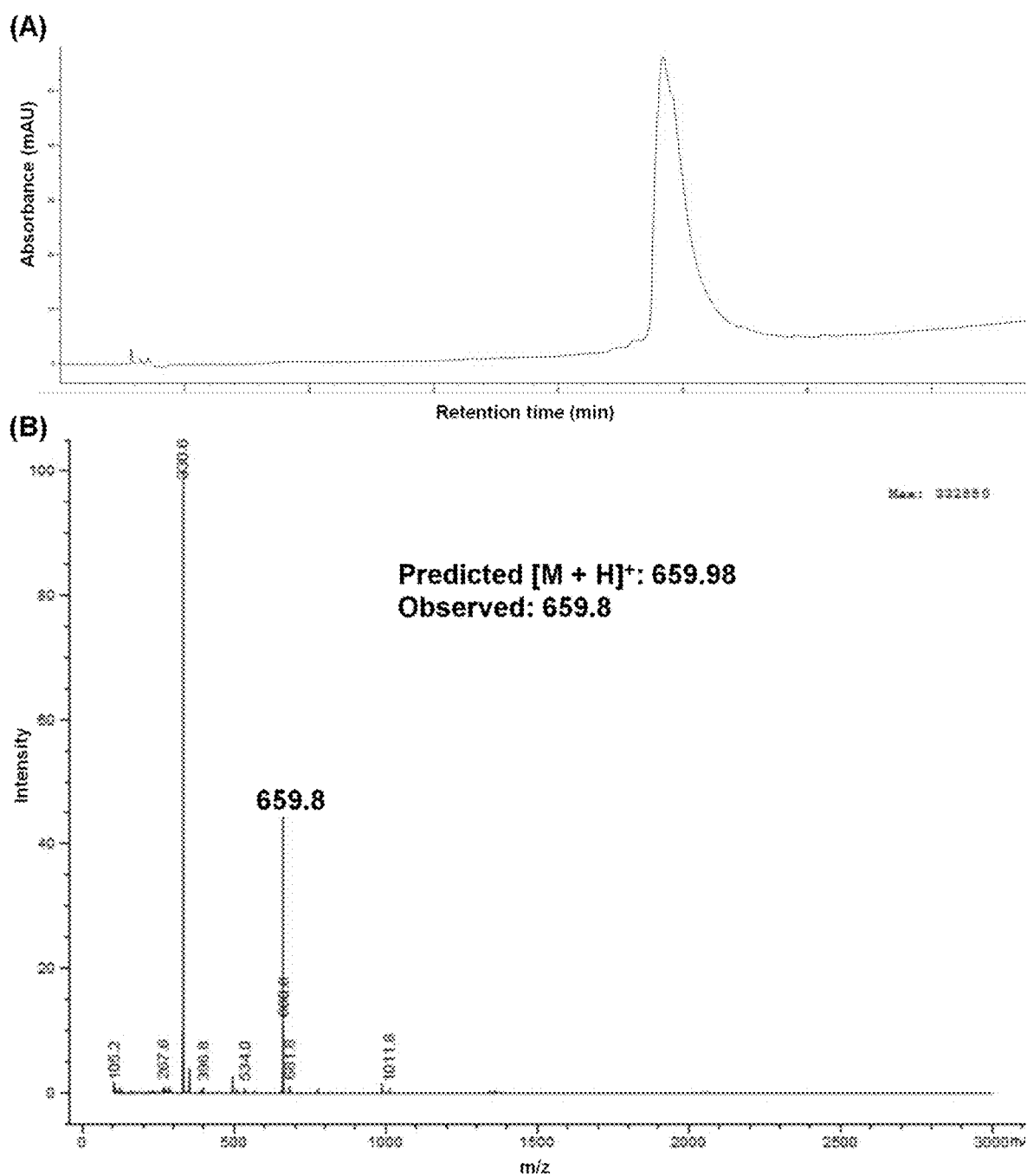
FIG. 59. HPLC trace (A) and ESI-Mass spectra (B) of compound 21.
Figure 60:
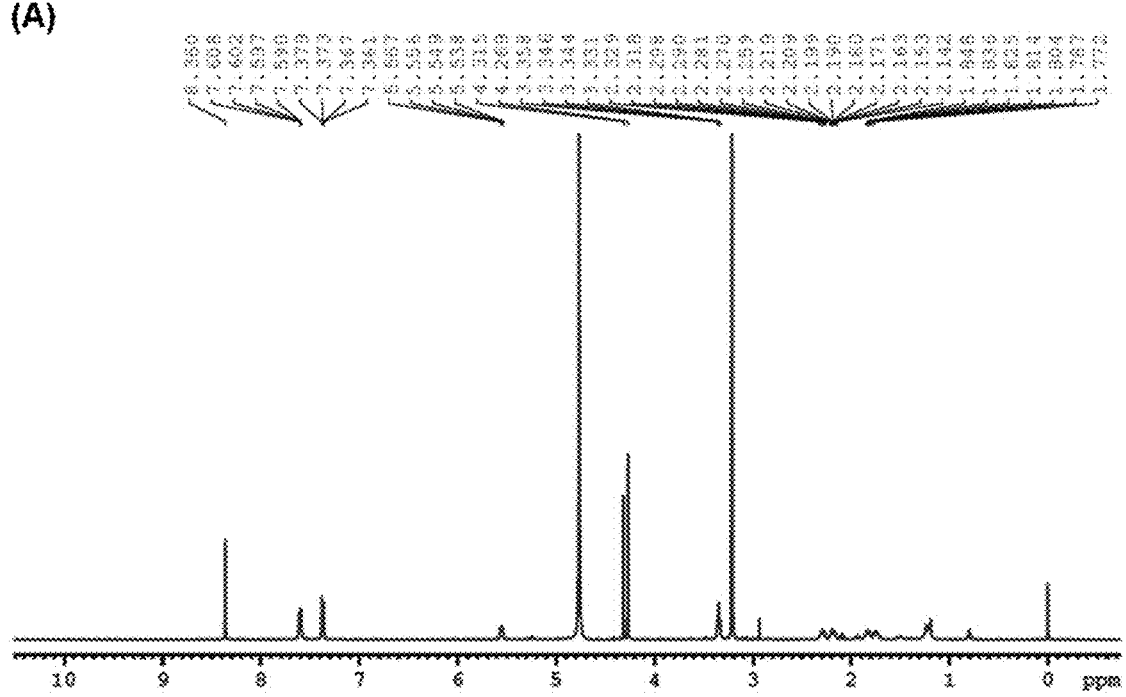
FIG. 60. $^1$H (A) and $^{13}$C (B) NMR spectra of compound 22 in $CD_3OD$.
Figure 60:
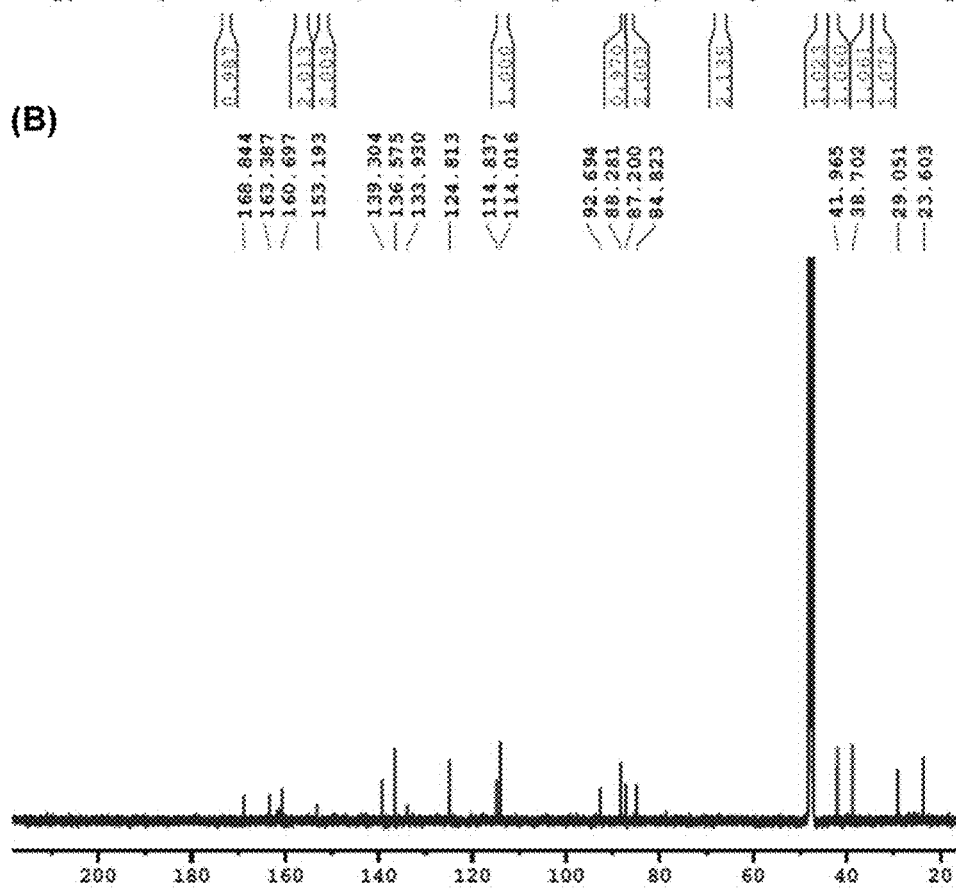
Figure 61:
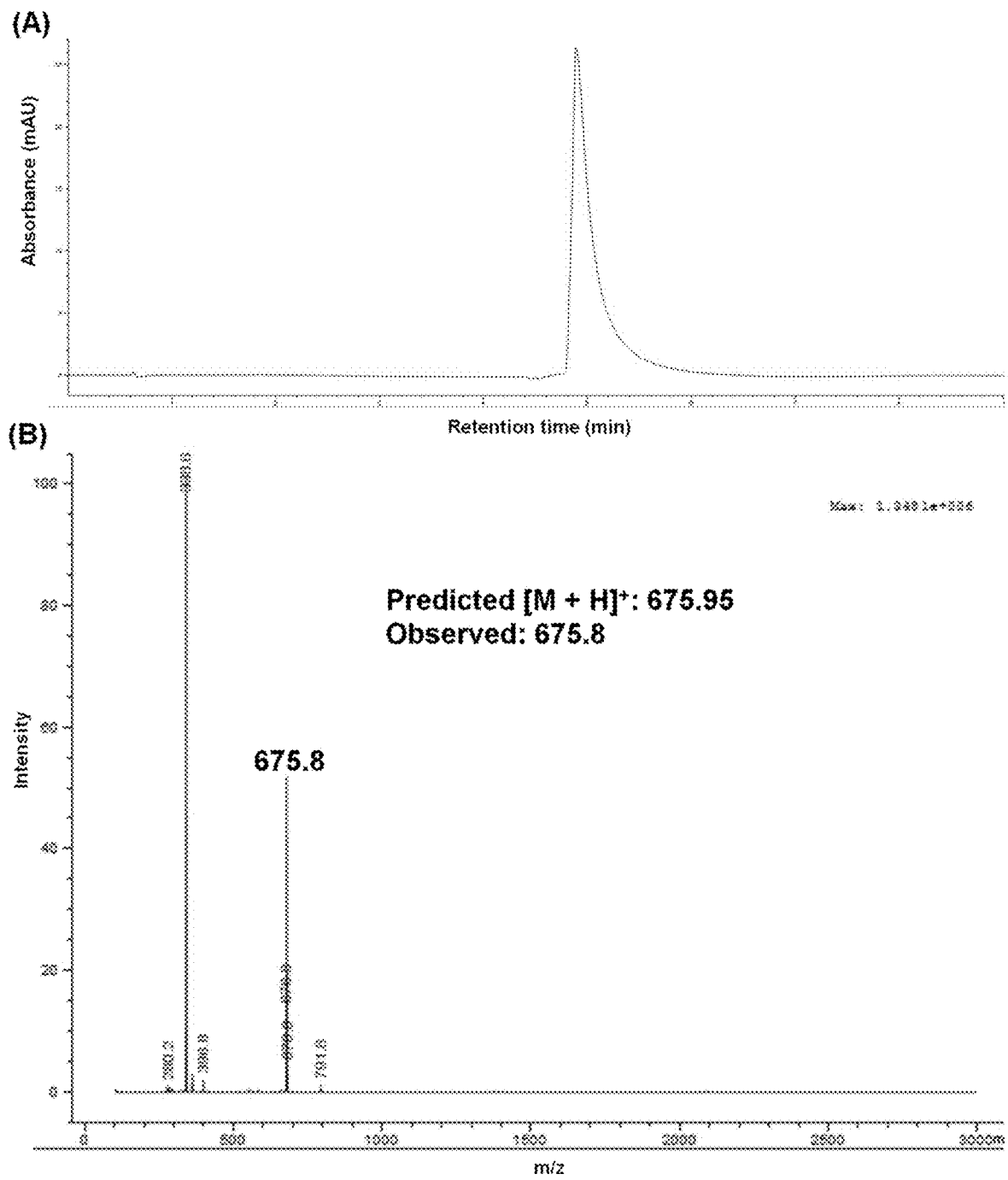
FIG. 61. HPLC trace (A) and ESI-Mass spectra (B) of compound 22.

Furthermore, CuAAC was performed on a 21-labeled proteome from HEK293TPAD1 cells with Biotin-$N_3$ and selectively captured the biotinylated proteins on streptavidin-agarose beads followed by an on-bead digestion of the captured proteins with trypsin (FIGS. 4C and 17). Reductive methylation (ReDiMe) was then performed on the trypsin digest with heavy (for the 21-treated samples) or light (for control samples) formaldehyde and sodium cyanoborohydride. Subsequent proteomic analysis afforded the enrichment ratio of the proteins that were covalently modified by 21. PAD1 was main protein isolated by 21 in HEK293TPAD1 cells, indicating the remarkable proteome-wide selectivity of this molecular scaffold. (FIG. 4F).

In summary, iodinated chemical probes were developed with excellent potency and PAD1 selectivity. The high potency and selectivity arise mainly from the iodo groups, which form halogen bonding interactions with PAD1. These PAD1 inhibitors inhibit histone H3 citrullination in HEK293TPAD1 cells and mouse embryos with excellent efficacy. Significantly, this is the first demonstration of a potent PAD1 inhibitor with a fluoroacetamidine warhead and the potential use of halogens to increase the potency and isozyme-selectivity of PAD inhibitors.

Experimental

Materials and Methods:

Fmoc-Orn(Boc)-OH, HBTU, HOBt and N-iodosuccinimide were bought from Chem-Impex International, Inc. Fluoroacetonitrile was purchased from Reagent World, Inc. 3-iodosalicylic acid and 4-fluoro-2-hydroxy-3,5-diiodobenzoic acid were obtained from Enamine and Aurum Pharmatech, respectively. Methyl 4-bromo-2-hydroxybenzoate was bought from Ark Pharm. Salicylic acid, 3,5-diiodosalicylic acid, 3,5-dibromosalicylic acid, 3,5-dichlorosalicylic acid, 3,5-isopropylsalicylic acid, 5-iodosalicylic acid, 3,5-diiodobenzoic acid, DIPEA, anhydrous methanol, anhydrous DMF, anhydrous dichloromethane, piperidine, triethylamine, trifluoroacetic acid, chloroacetonitrile and HPLC-grade acetonitrile were purchased from Sigma-Aldrich. TCEP, streptavidin agarose beads (catalogue no. 20353) and Halt protease inhibitor cocktail (EDTA-free) were obtained from Thermo Scientific. Precoated silica gel plates were bought from Merck. Deuterated solvents were purchased from Cambridge Isotope Laboratories. Plasmid purification kit was bought from Bio Basic Canada Inc. Rabbit polyclonal anti-PAD1 (catalogue no. ab181762), mouse monoclonal anti-histone H3 (catalogue no. ab10799) and rabbit polyclonal anti-H3 (Citrulline R2, R8 and R17) (catalogue no. ab5103) were obtained from Abcam. $^1$H and $^{13}$C NMR spectra were recorded in $d_4$-MeOH or $d_6$-DMSO as solvent using a Bruker 500 MHz NMR spectrometer. Chemical shift values are cited with respect to $SiMe_4$ (TMS) as the internal standard. Column chromatography was performed in glass columns. All the inhibitors and probes (compounds 1-22) were purified by reverse-phase HPLC using a semi-preparative C18 column (Agilent, 21.2×250 mm, 10 μm) and a water/acetonitrile gradient supplemented with 0.05% trifluoroacetic acid. Fluorographs were recorded using a Typhoon scanner with excitation/emission maxima of ~546/579, respectively. PADs 1, 2, 3 and 4 were expressed and purified as reported earlier. (Dreyton, et al. *Biochemistry* 2014, 53, 4426-4433; Knuckley, et al. *Biochemistry* 2010, 49, 4852-4863.)

Synthesis.

Synthesis of 25.

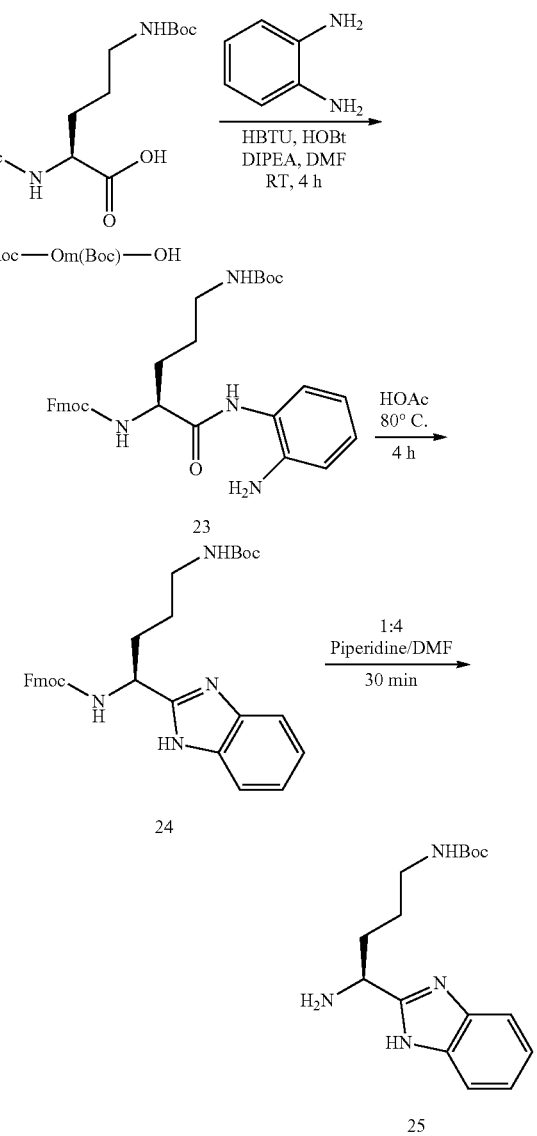

Compound 25 was synthesized as reported earlier with minor modifications. (Knight, et al. *Ann. Rheum. Dis.* 2015, 74, 2199-2206.) Briefly, diisopropyl ethylamine (DIPEA) (1.2 mL, 6.6 mmol), HBTU (1.3 g, 3.3 mmol) and HOBt (297 mg, 2.2 mmol) were added sequentially to a solution of Fmoc-Orn(Boc)-OH (1 g, 2.2 mmol) and 1,2-phenylenediamine (238 mg, 2.2 mmol) in anhydrous dimethylformamide (DMF) and the mixture was stirred for 4 h at 25° C. under nitrogen atmosphere. Then the reaction mixture was poured into water to precipitate compound 23 and it was recovered by vacuum filtration, washed with water and dried in vacuo. Crude 23 was then dissolved in glacial acetic acid (20 mL) and was refluxed for 4 h. Then the mixture was evaporated in vacuo to afford a gummy brown liquid which was poured into brine, neutralized with sodium bicarbonate and extracted with excess dichloromethane. The organic extract was washed thoroughly with water, brine, dried over anhydrous sodium sulphate and concentrated in vacuo to afford compound 24. Compound 24 was treated with 1:4 piperidine/DMF (v/v) for 30 min to remove the Fmoc-group and the mixture was vigorously stirred with excess hexane. The hexane layer was decanted off and this procedure was repeated for several times until most of the DMF was removed. Fmoc-removal afforded compound 25 as gummy brown oil which was used in subsequent steps without further purification.

Synthesis of 27.

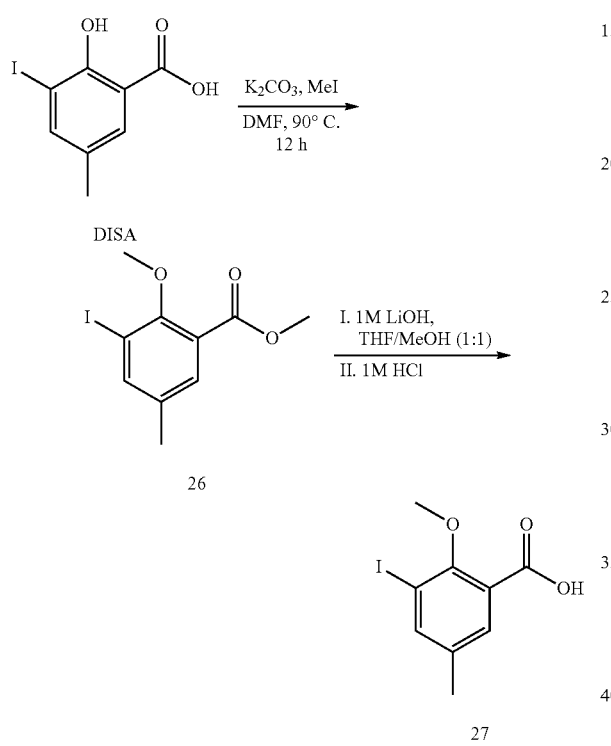

Synthesis of 30.

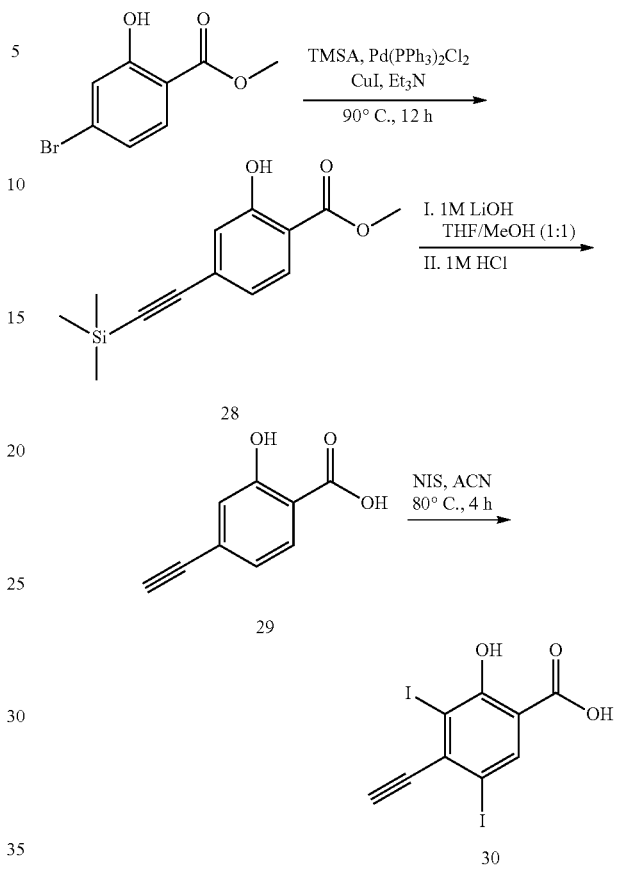

Methyl iodide (0.18 mL, 2.9 mmol) was added dropwise to a suspension of 3,5-diiodosalicylic acid (DISA) (0.5 g, 1.3 mmol) and potassium carbonate (0.45 g, 3.3 mmol) in anhydrous DMF. The mixture was heated in a sealed tube at 90° C. for 12 h followed by pouring into water to precipitate compound 26, which was recovered by vacuum filtration, washed with water and dried in vacuo. Crude compound 26 (0.22 g, 0.53 mmol) was then dissolved in 1:1 THF/MeOH (10 mL) and was treated with 1 M aqueous lithium hydroxide solution (5.3 mL). The mixture was allowed to stir for 2 h at 25° C. and the organic solvents were removed under reduced pressure. The mixture was then acidified with 2 M aqueous hydrochloric acid and was extracted twice with excess diethyl ether. The combined ether extracts were washed with water, dried over anhydrous sodium sulphate and concentrated in vacuo to afford 27 as an off-white solid. Crude 27 was purified by column chromatography using hexane/ethyl acetate as the eluent and was characterized by $^1$H, $^{13}$C NMR spectroscopy and mass spectrometry. Overall yield: 60%. $^1$H NMR (DMSO-$d_6$) δ (ppm): 13.4 (s, 1H), 8.3 (s, 1H), 7.95 (s, 1H), 3.76 (s, 3H); $^{13}$C NMR (DMSO-$d_6$) δ (ppm): 165.6, 158.6, 149.7, 139.7, 129.1, 97.0, 89.6, 62.3; ESI-MS (m/z) calculated for $C_8H_6I_2O_3$ [M+H]$^+$: 404.85, found 404.8.

Deoxygenated triethylamine (20 mL) and trimethylsilyl acetylene (TMSA) (2.4 mL, 17.3 mmol) was added to methyl 4-bromo-2-hydroxy benzoate (1 g, 4.3 mmol), Pd(PPh$_3$)$_2$Cl$_2$ (304 mg, 0.4 mmol) and copper (I) iodide (83 mg, 0.4 mmol), and the mixture was refluxed for 12 h under nitrogen atmosphere. Excess triethylamine was evaporated under reduced pressure and residue was resuspended in water. Then the dark brown mixture was extracted several times with excess dichloromethane and the combined dichloromethane extracts were filtered under vacuum, washed with water and brine, dried over anhydrous sodium sulphate and concentrated in vacuo to yield a dark brown gummy liquid. 28 was purified from this crude mixture by column chromatography using hexane/ethyl acetate as eluent and was characterized by $^1$H NMR spectroscopy and mass spectrometry. Yield: 70%. $^1$H NMR (CDCl$_3$) δ (ppm): 10.53 (s, 1H), 7.57 (d, J=10 Hz, 1H), 6.88 (d, J=1.5 Hz, 1H), 6.77 (dd, J=8.2 Hz, 1H), 3.76 (s, 3H), 0.07 (s, 9H); ESI-MS (m/z) calculated for $C_{13}H_{16}O_3Si$ [M+H]$^+$: 249.09, found 249.2. Compound 28 (0.5 g, 2.0 mmol) was dissolved in 1:1 THF/MeOH (10 mL) and was treated with a 1 M aqueous solution of lithium hydroxide (20 mL). The mixture was stirred at room temperature for 2 h and the organic solvents were evaporated under reduced pressure followed by acidification with 1 M hydrochloric acid. The mixture was then extracted twice with excess diethyl ether and the combined organic extract was washed with water, dried over anhydrous sodium sulphate and concentrated in vacuo. Compound 29 was purified from the crude mixture by column chromatography using hexane/ethyl acetate as mobile phase and was characterized by ¹H NMR spectroscopy and mass spectrometry. Yield: 90%. ¹H NMR (CDCl₃) δ (ppm): 7.77 (d, J=8.2 Hz, 1H), 7.04 (d, J=1.2 Hz, 1H), 6.93 (dd, J=8.2 Hz, 1H), 3.16 (s, 1H); ESI-MS (m/z) calculated for C₉H₆O₃ [M+H]⁺: 163.04, found 163.2. N-iodosuccinimide (417 mg, 1.9 mmol) was added to a solution of 29 (100 mg, 0.6 mmol) in acetonitrile (ACN) (15 mL) and the mixture was heated at 80° C. in a sealed tube for 4 h. Excess acetonitrile was then evaporated under reduced pressure and the residue was resuspended in dichloromethane, washed with water, dried over anhydrous sodium sulphate and concentrated in vacuo to yield 30 as off-white solid. 30 was purified from the crude mixture by column chromatography using hexane/ethyl acetate as the eluent and was characterized by ¹H NMR spectroscopy and mass spectrometry. Yield: 78%. ¹H NMR (DMSO-d₆) δ (ppm): 8.07 (s, 1H), 4.87 (s, 1H); ESI-MS (m/z) calculated for C₉H₄I₂O₃ [M+H]⁺: 414.83, found 414.8.

Synthesis of 1-22.

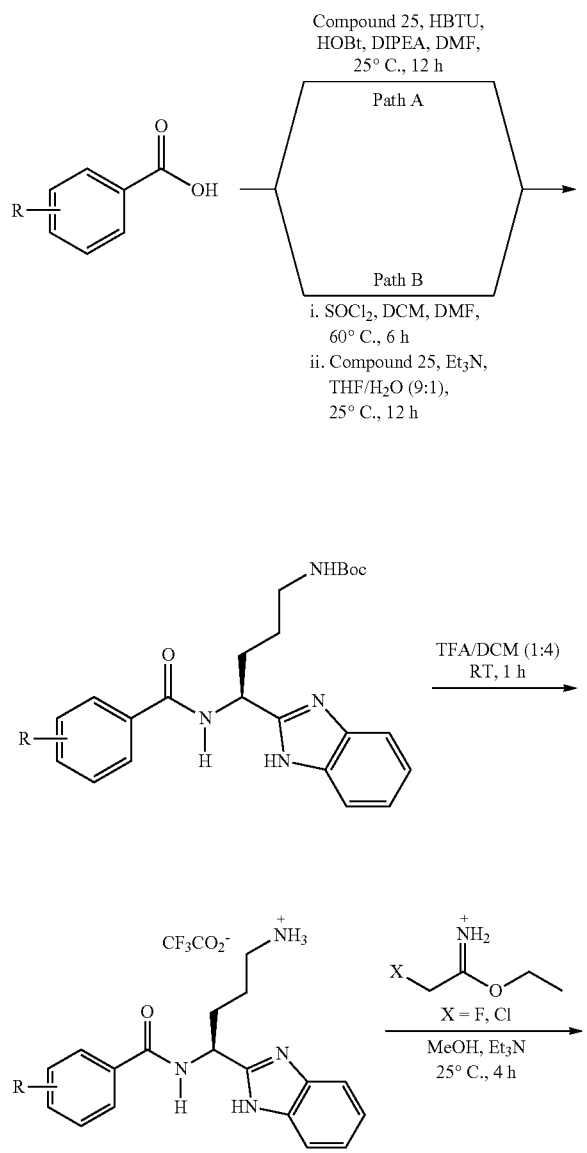

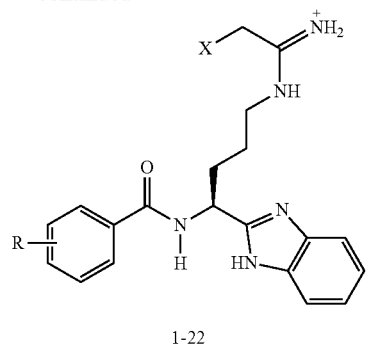

1-22

Compounds 1-22 were synthesized following three steps. In the first step, compound 25 was coupled with commercially available carboxylic acids or compound 27 (for compounds 3 and 4) or compound 30 (for compounds 21 and 22) by following either of the two pathways (Path A or Path B) to afford amides with Boc-protected ornithine side chain. In the second step, the Boc-protecting group was removed from the ornithine side chain to produce the free amine. The haloacetamidine warhead was then installed in the third step using an ethyl haloacetimidate hydrochloride. General procedures for these three steps are given below.

General Procedure for Path A.

DIPEA (3 eq), HBTU (2 eq) and HOBt (2 eq) were added sequentially to a solution of carboxylic acid (1 eq) and compound 25 (1 eq) in anhydrous DMF. The mixture was allowed to stir at room temperature for 12 h under a nitrogen atmosphere. Then the reaction mixture was poured into water to precipitate the desired amide, which was recovered by vacuum filtration, washed with water and dried in vacuo. The amide was used in the subsequent step without further purification.

General Procedure for Path B.

Thionyl chloride (3 eq) was added dropwise to a suspension of carboxylic acid (1 eq) in anhydrous dichloromethane with vigorous stirring. Then a catalytic amount of DMF (100 μL for 1 g of carboxylic acid) was added and the reaction mixture was refluxed for 6 h. The organic solvent and excess thionyl chloride were evaporated under reduced pressure to afford the acyl chloride. Triethylamine (5 eq) was added to a suspension of compound 25 (1 eq) and acyl chloride (2 eq) in THF, and the resulting precipitate was dissolved by dropwise addition of water. The mixture was allowed to stir at room temperature for 12 h. THF was evaporated under reduced pressure and the residue was extracted twice with dichloromethane. The combined organic extract was washed with water, dried over anhydrous sodium sulphate and concentrated in vacuo to afford the amide, which was used in the subsequent step without further purification.

General Procedure for Boc-Deprotection and Warhead Installation.

A Boc-protected compound was dissolved in 1:4 trifluoroacetic acid/dichloromethane (v/v) (10 mL for 1 g of Boc-protected compound) and the mixture was stirred at room temperature for 1 h. Excess trifluoroacetic acid/dichloromethane was evaporated under reduced pressure to afford the free amine as a gummy liquid. Triethylamine (4 eq) and ethyl haloacetimidate hydrochloride (2 eq) were added sequentially to a solution of free amine (1 eq) in anhydrous methanol. The mixture was allowed to stir at room temperature for 4 h. Methanol and excess triethylamine were evaporated under reduced pressure. Compounds 1-22 were then purified as trifluoroacetate salts by reverse phase HPLC using a pre-packed C18 column and a water/acetonitrile (supplemented with 0.05% TFA) gradient as the eluent.

Compounds 1-22 were thoroughly characterized by $^1$H and $^{13}$C NMR spectroscopy and mass spectrometry. These data are given in FIGS. S14-S57. The purity of compounds 1-22 was determined by $^1$H NMR spectroscopy and LC-MS analysis. All the tested compounds were ≥95% pure.

Compound 1. This compound was synthesized from commercially available 3,5-diiodosalicylic acid following Path B. Yield: 32% over three steps. $^1$H NMR (CD$_3$OD) δ (ppm): 8.18 (d, J=2 Hz, 1H), 8.13 (d, J=2 Hz, 1H), 7.62-7.64 (m, 2H), 7.41-7.43 (m, 2H), 5.55-5.58 (m, 1H), 5.21 (s, 1H), 5.12 (s, 1H), 3.37 (t, J=7.3 Hz, 2H), 2.25-2.32 (m, 1H), 2.16-2.24 (m, 1H), 1.80-1.88 (m, 1H), 1.71-1.79 (m, 1H); $^{13}$C NMR (CD$_3$OD) δ (ppm): 169.3, 163.1, 163.0, 161.2, 160.9, 160.1, 153.2, 151.0, 135.8, 133.0, 125.3, 115.7, 113.9, 86.9, 79.6, 78.3, 76.9, 41.4, 28.9, 23.7; ESI-MS (m/z) calculated for C$_{20}$H$_{20}$N$_5$O$_2$F$_1$I$_2$ [M+H]$^+$: 635.97, found 636.0.

Compound 2. This compound was synthesized from commercially available 3,5-diiodosalicylic acid following Path B. Yield: 26% over three steps. $^1$H NMR (CD$_3$OD) δ (ppm): 8.16 (d, J=2 Hz, 1H), 8.13 (d, J=2 Hz, 1H), 7.59-7.62 (m, 2H), 7.37-7.40 (m, 2H), 5.53-5.56 (m, 1H), 4.27 (s, 2H), 3.33-3.36 (m, 2H), 2.25-2.32 (m, 1H), 2.14-2.22 (m, 1H), 1.80-1.86 (m, 1H), 1.71-1.78 (m, 1H); $^{13}$C NMR (CD$_3$OD) δ (ppm): 169.4, 163.4, 161.6, 161.3, 160.1, 153.1, 151.0, 135.8, 132.7, 125.5, 115.6, 113.9, 86.9, 79.6, 53.4, 41.9, 38.7, 28.9, 23.6; ESI-MS (m/z) calculated for C$_{20}$H$_{20}$N$_5$O$_2$Cl$_1$I$_2$ [M+H]$^+$: 651.95, found 652.0.

Compound 3. This compound was synthesized from compound 27 following Path B. Yield: 35% over three steps. $^1$H NMR (CD$_3$OD) δ(ppm): 8.19 (d, J=2.2 Hz, 1H), 7.89 (d, J=2.2 Hz, 1H), 7.65-7.67 (m, 2H), 7.43-7.45 (m, 2H), 5.47 (t, J=6.8 Hz, 1H), 5.22 (s, 1H), 5.13 (s, 1H), 3.67 (s, 3H), 3.36-3.4 (m, 2H), 2.17-2.22 (m, 2H), 1.83-1.93 (m, 1H), 1.70-1.78 (m, 1H); $^{13}$C NMR (CD$_3$OD) δ(ppm): 165.7, 163.2, 163.0, 161.5, 161.3, 157.5, 153.2, 149.8, 138.7, 132.7, 130.4, 125.5, 113.9, 93.4, 87.8, 78.3, 76.9, 61.7, 41.3, 29.3, 23.7; ESI-MS (m/z) calculated for C$_{21}$H$_{22}$N$_5$O$_2$F$_1$I$_2$ [M+H]$^+$: 649.99, found 649.8.

Compound 4. This compound was synthesized from compound 27 following Path B. Yield: 29% over three steps. $^1$H NMR (CD$_3$OD) δ(ppm): 8.20 (d, J=2.2 Hz, 1H), 7.90 (d, J=2.2 Hz, 1H), 7.63-7.66 (m, 2H), 7.40-7.44 (m, 2H), 5.44-5.48 (m, 1H), 4.28 (s, 2H), 3.68 (s, 3H), 3.34-3.37 (m, 2H), 2.17-2.22 (m, 2H), 1.83-1.91 (m, 1H), 1.70-1.78 (m, 1H); $^{13}$C NMR (CD$_3$OD) δ(ppm): 165.7, 163.4, 161.5, 161.2, 157.5, 153.2, 149.8, 138.7, 133.0, 130.4, 125.3, 114.0, 93.4, 87.8, 61.7, 41.9, 38.7, 29.3, 23.6; ESI-MS (m/z) calculated for C$_{21}$H$_{22}$N$_5$O$_2$Cl$_1$I$_2$ [M+H]$^+$: 665.96, found 665.8.

Compound 5. This compound was synthesized from commercially available 3,5-diiodobenzoic acid following Path A. Yield: 37% over three steps. $^1$H NMR (CD$_3$OD) δ(ppm): 8.19-8.21 (m, 3H), 7.65-7.67 (m, 2H), 7.45-7.47 (m, 2H), 5.48-5.51 (m, 1H), 5.21 (s, 1H), 5.12 (s, 1H), 3.35-3.39 (m, 2H), 2.19-2.25 (m, 2H), 1.81-1.89 (m, 1H), 1.70-1.77 (m, 1H); $^{13}$C NMR (CD$_3$OD) δ(ppm): 165.8, 163.1, 163.0, 161.9, 161.6, 161.4, 161.1, 153.5, 148.4, 136.1, 135.8, 131.7, 125.9, 113.8, 94.0, 78.3, 76.9, 41.3, 29.1, 23.7; ESI-MS (m/z) calculated for C$_{20}$H$_{20}$N$_5$O$_1$F$_1$I$_2$ [M+H]$^+$: 619.98, found 620.0.

Compound 6. This compound was synthesized from commercially available 3,5-diiodobenzoic acid following Path A. Yield: 32% over three steps. $^1$H NMR (CD$_3$OD) δ(ppm): 8.19-8.21 (m, 3H), 7.65-7.67 (m, 2H), 7.45-7.47 (m, 2H), 5.48-5.51 (m, 1H), 4.28 (s, 2H), 3.33-3.36 (m, 2H), 2.17-2.27 (m, 2H), 1.82-1.88 (m, 1H), 1.70-1.77 (m, 1H); $^{13}$C NMR (CD$_3$OD) δ(ppm): 165.8, 163.4, 161.8, 161.6, 161.3, 161.0, 153.5, 148.4, 136.1, 135.8, 131.8, 125.9, 113.8, 94.1, 41.9, 38.7, 29.0, 23.6; ESI-MS (m/z) calculated for C$_{20}$H$_{20}$N$_5$O$_1$Cl$_1$I$_2$ [M+H]$^+$: 635.95, found 636.0.

Compound 7. This compound was synthesized from commercially available salicylic acid following Path A. Yield: 33% over three steps. $^1$H NMR (CD$_3$OD) δ(ppm): 7.81 (dd, J=7.9 Hz, 1H), 7.64-7.65 (m, 2H), 7.44-7.45 (m, 2H), 7.33-7.36 (m, 1H), 6.84-6.87 (m, 2H), 5.54-5.57 (m, 1H), 5.21 (s, 1H), 5.11 (s, 1H), 3.35-3.41 (m, 2H), 2.23-2.28 (m, 2H), 1.83-1.93 (m, 1H), 1.72-1.80 (m, 1H); $^{13}$C NMR (CD$_3$OD) δ(ppm): 169.4, 163.1, 163.0, 159.3, 153.9, 134.0, 130.5, 128.6, 127.6, 124.7, 119.1, 117.0, 115.5, 114.0, 78.3, 76.8, 41.4, 29.4, 23.7; ESI-MS (m/z) calculated for C$_{20}$H$_{22}$N$_5$O$_2$F$_1$ [M+H]$^+$: 384.18, found 384.4.

Compound 8. This compound was synthesized from commercially available salicylic acid following Path A. Yield: 29% over three steps. $^1$H NMR (CD$_3$OD) δ(ppm): 7.81 (dd, J=8 Hz, 1H), 7.62-7.64 (m, 2H), 7.42-7.43 (m, 2H), 7.32-7.36 (m, 1H), 6.83-6.87 (m, 2H), 5.53-5.56 (m, 1H), 4.27 (s, 2H), 3.34-3.38 (m, 2H), 2.23-2.29 (m, 2H), 1.82-1.90 (m, 1H), 1.72-1.80 (m, 1H); $^{13}$C NMR (CD$_3$OD) δ(ppm): 169.4, 163.4, 159.3, 153.9, 134.2, 134.0, 130.5, 128.5, 127.6, 124.5, 119.1, 117.0, 115.5, 114.0, 42.0, 38.7, 37.5, 29.5, 23.6; ESI-MS (m/z) calculated for C$_{20}$H$_{22}$N$_5$O$_2$Cl$_1$ [M+H]$^+$: 400.15, found 400.4.

Compound 9. This compound was synthesized from commercially available 3,5-diisopropylsalicylic acid following Path B. Yield: 35% over three steps. $^1$H NMR (CD$_3$OD) δ(ppm): 7.66-7.69 (m, 2H), 7.51 (d, J=2.1 Hz, 1H), 7.47-7.52 (m, 2H), 7.18 (d, J=2.1 Hz, 1H), 5.59-5.62 (m, 1H), 5.21 (s, 1H), 5.12 (s, 1H), 3.37-3.40 (m, 2H), 2.76-2.81 (m, 2H), 2.25-2.31 (m, 2H), 1.87-1.92 (m, 1H), 1.73-1.80 (m, 1H), 1.18-1.24 (m, 1H), 1.15 (d, J=7 Hz, 6H), 1.10-1.12 (m, 6H); $^{13}$C NMR (CD$_3$OD) δ(ppm): 172.0, 163.5, 163.1, 163.0, 161.6, 161.3, 161.1, 160.8, 157.1, 153.7, 138.8, 136.8, 131.5, 129.4, 126.0, 121.6, 112.3, 78.3, 76.8, 41.4, 33.7, 28.7, 26.5, 23.8, 23.2, 23.1, 21.4; ESI-MS (m/z) calculated for C$_{26}$H$_{34}$N$_5$O$_2$F$_1$ [M+H]$^+$: 468.28, found 468.4.

Compound 10. This compound was synthesized from commercially available 3,5-diisopropylsalicylic acid following Path B. Yield: 30% over three steps. $^1$H NMR (CD$_3$OD) δ(ppm): 7.65-7.67 (m, 2H), 7.50 (d, J=2.1 Hz, 1H), 7.45-7.47 (m, 2H), 7.19 (d, J=2.1 Hz, 1H), 5.60 (t, J=7.5 Hz, 1H), 4.27 (s, 2H), 3.34-3.38 (m, 2H), 2.75-2.81 (m, 1H), 2.26-2.31 (m, 2H), 1.84-1.93 (m, 1H), 1.73-1.80 (m, 1H), 1.19-1.23 (m, 1H), 1.15 (d, J=6.9 Hz, 6H), 1.10-1.12 (m, 6H); $^{13}$C NMR (CD$_3$OD) δ(ppm): 171.9, 163.4, 161.8, 161.5, 161.2, 160.9, 157.1, 153.7, 138.8, 136.8, 132.0, 129.3, 125.8, 121.6, 113.8, 112.4, 46.8, 41.9, 38.7, 33.7, 28.8, 26.5, 23.7, 23.2, 23.1, 21.4; ESI-MS (m/z) calculated for C$_{26}$H$_{34}$N$_5$O$_2$Cl$_1$ [M+H]$^+$: 484.25, found 484.4.

Compound 11. This compound was synthesized from commercially available 3,5-dibromosalicylic acid following Path B. Yield: 34% over three steps. $^1$H NMR (CD$_3$OD) δ(ppm): 8.04 (d, J=2.3 Hz, 2H), 7.79 (d, J=2.3 Hz, 1H), 7.64-7.66 (m, 2H), 7.43-7.45 (m, 2H), 5.56-5.59 (m, 1H), 5.21 (s, 1H), 5.12 (s, 1H), 3.37 (t, J=7.3 Hz, 2H), 2.19-2.30 (m, 2H), 1.82-1.89 (m, 1H), 1.73-1.79 (m, 1H); $^{13}$C NMR (CD$_3$OD) δ(ppm): 169.4, 163.1, 163.0, 162.0, 161.7, 161.4, 161.1, 157.1, 153.1, 139.4, 132.3, 129.3, 125.7, 116.3, 113.8, 112.3, 110.0, 78.3, 76.8, 41.3, 28.9, 23.7; ESI-MS (m/z) calculated for C$_{20}$H$_{20}$N$_5$O$_2$F$_1$Br$_2$ [M+H]$^+$: 540.00, found 541.8.

Compound 12. This compound was synthesized from commercially available 3,5-dibromosalicylic acid following Path B. Yield: 30% over three steps. $^1$H NMR (CD$_3$OD) δ(ppm): 8.04 (d, J=2.3 Hz, 2H), 7.80 (d, J=2.3 Hz, 1H), 7.64-7.66 (m, 2H), 7.43-7.45 (m, 2H), 5.56-5.59 (m, 1H), 4.27 (s, 2H), 3.33-3.36 (m, 2H), 2.18-2.32 (m, 2H), 1.82-1.89 (m, 1H), 1.72-1.79 (m, 1H); $^{13}$C NMR (CD$_3$OD) δ(ppm): 169.3, 163.4, 161.8, 161.6, 161.3, 161.0, 157.1, 153.1, 139.4, 132.5, 129.3, 125.6, 116.3, 113.9, 112.4, 110.0, 41.9, 38.7, 28.9, 23.6; ESI-MS (m/z) calculated for C$_{20}$H$_{20}$N$_5$O$_2$Cl$_1$Br$_2$ [M+H]$^+$: 555.97, found 557.8.

Compound 13. This compound was synthesized from commercially available 3,5-dichlorosalicylic acid following Path B. Yield: 36% over three steps. $^1$H NMR (CD$_3$OD) δ(ppm): 7.87 (d, J=2.5 Hz, 2H), 7.65-7.67 (m, 2H), 7.53 (d, J=2.5 Hz, 1H), 7.45-7.46 (m, 2H), 5.56-5.59 (m, 1H), 5.21 (s, 1H), 5.12 (s, 1H), 3.38 (t, J=7.2 Hz, 2H), 2.21-2.31 (m, 2H), 1.84-1.90 (m, 1H), 1.72-1.79 (m, 1H); $^{13}$C NMR (CD$_3$OD) δ(ppm): 169.2, 163.1, 163.0, 161.5, 161.2, 155.5, 153.1, 133.7, 132.1, 125.9, 125.8, 123.3, 123.2, 116.3, 113.8, 78.3, 76.8, 41.3, 28.9, 23.7; ESI-MS (m/z) calculated for C$_{20}$H$_{20}$N$_5$O$_2$F$_1$Cl$_2$ [M+H]$^+$: 452.11, found 452.0.

Compound 14. This compound was synthesized from commercially available 3,5-dichlorosalicylic acid following Path B. Yield: 31% over three steps. $^1$H NMR (CD$_3$OD) δ(ppm): 7.86 (d, J=2.5 Hz, 2H), 7.64-7.66 (m, 2H), 7.53 (d, J=2.5 Hz, 1H), 7.43-7.45 (m, 2H), 5.56-5.59 (m, 1H), 4.27 (s, 2H), 3.34-3.37 (m, 2H), 2.21-2.31 (m, 2H), 1.84-1.88 (m, 1H), 1.73-1.78 (m, 1H); $^{13}$C NMR (CD$_3$OD) δ(ppm): 169.2, 163.4, 161.9, 161.6, 161.3, 155.5, 153.1, 133.6, 132.4, 125.9, 125.6, 123.3, 123.2, 116.4, 113.9, 41.9, 38.7, 29.0, 23.6; ESI-MS (m/z) calculated for C$_{20}$H$_{20}$N$_5$O$_2$Cl$_3$ [M+H]$^+$: 468.08, found 468.0.

Compound 15. This compound was synthesized from commercially available 5-iodosalicylic acid following Path B. Yield: 32% over three steps. $^1$H NMR (CD$_3$OD) δ(ppm): 8.14 (d, J=2.2 Hz, 1H), 7.65-7.66 (m, 2H), 7.61 (dd, J=8.7 Hz, 1H), 7.45-7.47 (m, 2H), 6.70 (d, J=8.7 Hz, 1H), 5.54-5.57 (m, 1H), 5.21 (s, 1H), 5.12 (s, 1H), 3.35-3.40 (m, 2H), 2.20-2.29 (m, 2H), 1.82-1.89 (m, 1H), 1.71-1.79 (m, 1H); $^{13}$C NMR (CD$_3$OD) δ(ppm): 168.1, 163.1, 163.0, 161.5, 161.2, 159.0, 153.6, 142.6, 137.3, 132.1, 125.7, 119.4, 117.8, 113.8, 79.7, 78.3, 76.8, 46.5, 41.3, 29.0, 23.7; ESI-MS (m/z) calculated for C$_{20}$H$_{21}$N$_5$O$_2$F$_1$I$_1$ [M+H]$^+$: 510.08, found 510.2.

Compound 16. This compound was synthesized from commercially available 5-iodosalicylic acid following Path B. Yield: 26% over three steps. $^1$H NMR (CD$_3$OD) δ(ppm): 8.14 (d, J=2.2 Hz, 1H), 7.60-7.63 (m, 3H), 7.41-7.42 (m, 2H), 6.69 (d, J=8.7 Hz, 1H), 5.52-5.55 (m, 1H), 4.27 (s, 2H), 3.33-3.37 (m, 2H), 2.19-2.29 (m, 2H), 1.80-1.88 (m, 1H), 1.71-1.78 (m, 1H); $^{13}$C NMR (CD$_3$OD) δ(ppm): 168.0, 163.4, 161.2, 158.9, 153.6, 142.5, 137.3, 132.9, 125.3, 119.4, 117.9, 113.9, 79.7, 41.9, 38.7, 29.2, 23.6; ESI-MS (m/z) calculated for C$_{20}$H$_{21}$N$_5$O$_2$Cl$_1$[M+H]$^+$: 526.05, found 526.2.

Compound 17. This compound was synthesized from commercially available 3-iodosalicylic acid following Path A. Yield: 31% over three steps. $^1$H NMR (CD$_3$OD) δ(ppm): 7.82-7.87 (m, 2H), 7.62-7.66 (m, 2H), 7.42-7.45 (m, 2H), 6.64 (t, J=7.9 Hz, 1H), 5.57-5.60 (m, 1H), 5.21 (s, 1H), 5.12 (s, 1H), 3.36-3.39 (m, 2H), 2.19-2.32 (m, 2H), 1.82-1.89 (m, 1H), 1.72-1.79 (m, 1H); $^{13}$C NMR (CD$_3$OD) δ(ppm): 170.6, 163.1, 163.0, 161.9, 161.6, 161.3, 160.2, 153.4, 144.1, 132.6, 127.2, 125.5, 120.2, 113.9, 113.9, 85.3, 78.3, 76.8, 41.4, 28.9, 23.7; ESI-MS (m/z) calculated for C$_{20}$H$_{21}$N$_5$O$_2$F$_1$I$_1$ [M+H]$^+$: 510.08, found 510.0.

Compound 18. This compound was synthesized from commercially available 3-iodosalicylic acid following Path A. Yield: 25% over three steps. $^1$H NMR (CD$_3$OD) δ(ppm): 7.82-7.86 (m, 2H), 7.63-7.64 (m, 2H), 7.41-7.43 (m, 2H), 6.64 (t, J=7.9 Hz, 1H), 5.57-5.60 (m, 1H), 4.27 (s, 1H), 3.33-3.37 (m, 2H), 2.20-2.32 (m, 2H), 1.82-1.89 (m, 1H), 1.72-1.79 (m, 1H); $^{13}$C NMR (CD$_3$OD) δ(ppm): 170.6, 163.4, 160.2, 153.3, 144.1, 132.8, 127.2, 125.4, 120.2, 113.9, 113.9, 85.3, 41.9, 38.7, 28.9, 23.6; ESI-MS (m/z) calculated for C$_{20}$H$_{21}$N$_5$O$_2$Cl$_1$ [M+H]$^+$: 526.05, found 526.0.

Compound 19. This compound was synthesized from commercially available 4-Fluoro-2-hydroxy-3,5-diiodobenzoic acid following Path B. Yield: 34% over three steps. $^1$H NMR (CD$_3$OD) δ(ppm): 8.33 (d, J=6.9 Hz, 1H), 7.62-7.64 (m, 2H), 7.41-7.43 (m, 2H), 5.55-5.58 (m, 1H), 5.21 (s, 1H), 5.12 (s, 1H), 3.37 (t, J=7.3 Hz, 2H), 2.18-2.30 (m, 2H), 1.82-1.89 (m, 1H), 1.71-1.77 (m, 1H); $^{13}$C NMR (CD$_3$OD) δ(ppm): 169.0, 165.0, 163.3, 163.2, 163.1, 163.0, 153.2, 137.7, 137.7, 133.0, 125.0, 113.9, 112.3, 78.3, 76.8, 73.3, 73.0, 66.2, 66.0, 41.4, 29.0, 23.7, 21.7; ESI-MS (m/z) calculated for C$_{20}$H$_{19}$N$_5$O$_2$F$_2$I$_2$ [M+H]$^+$: 653.97, found 653.6.

Compound 20. This compound was synthesized from commercially available 4-Fluoro-2-hydroxy-3,5-diiodobenzoic acid following Path B. Yield: 28% over three steps. $^1$H NMR (CD$_3$OD) δ(ppm): 8.34 (d, J=6.9 Hz, 1H), 7.64-7.66 (m, 2H), 7.44-7.46 (m, 2H), 5.57-5.60 (m, 1H), 4.27 (s, 1H), 3.31-3.36 (m, 2H), 2.22-2.30 (m, 2H), 1.83-1.89 (m, 1H), 1.72-1.78 (m, 1H); $^{13}$C NMR (CD$_3$OD) δ(ppm): 169.1, 165.0, 163.4, 163.2, 163.2, 163.1, 153.1, 137.8, 137.7, 132.2, 125.7, 113.8, 112.3, 73.2, 73.0, 66.3, 66.0, 41.9, 38.7, 28.9, 23.6; ESI-MS (m/z) calculated for C$_{20}$H$_{19}$N$_5$O$_2$F$_1$Cl$_1$I$_2$ [M+H]$^+$: 669.94, found 669.6.

Compound 21. This compound was synthesized from compound 30 following Path A. Yield: 25% over three steps. $^1$H NMR (CD$_3$OD) δ(ppm): 8.35 (s, 1H), 7.59 (s, 2H), 7.34-7.36 (m, 2H), 5.54-5.56 (m, 1H), 5.21 (s, 1H), 5.12 (s, 1H), 4.32 (s, 1H), 3.37 (t, J=7.1 Hz, 2H), 2.27-2.29 (m, 1H), 2.15-2.19 (m, 1H), 1.70-1.83 (m, 1H); $^{13}$C NMR (CD$_3$OD) δ(ppm): 168.8, 163.1, 160.7, 139.3, 136.6, 124.6, 114.9, 114.1, 92.7, 88.3, 87.2, 84.8, 78.3, 76.9, 41.4, 29.1, 28.9, 23.7; ESI-MS (m/z) calculated for C$_{22}$H$_{20}$N$_5$O$_2$F$_1$I$_2$ [M+H]$^+$: 659.98, found 659.8.

Compound 22. This compound was synthesized from compound 30 following Path A. Yield: 20% over three steps. $^1$H NMR (CD$_3$OD) δ(ppm): 8.36 (s, 1H), 7.59-7.61 (m, 2H), 7.36-7.38 (m, 2H), 5.54-5.57 (m, 1H), 4.32 (s, 1H), 4.27 (s, 2H), 3.33-3.36 (m, 2H), 2.26-2.33 (m, 1H), 2.14-2.22 (m, 1H), 1.80-1.85 (m, 1H), 1.72-1.77 (m, 1H); $^{13}$C NMR (CD$_3$OD) δ(ppm): 168.8, 163.4, 160.7, 153.2, 139.3, 136.6, 133.9, 124.8, 114.8, 114.0, 92.7, 88.3, 87.2, 84.8, 42.0, 38.7, 29.1, 23.6; ESI-MS (m/z) calculated for C$_{22}$H$_{20}$N$_5$O$_2$Cl$_1$I$_2$ [M+H]$^+$: 675.95, found 675.8.

Inactivation kinetics. The rates of enzyme inactivation for compounds 1-22 were determined using previously described methods. (Knuckley, et al. *Chembiochem* 2010, 11, 161-165; Luo, et al. *Biochemistry* 2006, 45, 11727-11736.) Briefly, PAD (2 μM for PAD1, 2 and 4; 5 μM for PAD3) was added to a prewarmed (10 min at 37° C.) inactivation mixture (100 mM TRIS pH 7.4, 50 mM NaCl, 10 mM CaCl$_2$, and 2 mM DTT with a final volume of 50 μL) containing various concentrations of inhibitors. At various time points, 6 μL of this inactivation mixture was removed and was added to a prewarmed (10 min at 37° C.) reaction mixture (100 mM TRIS pH 7.4, 50 mM NaCl, 10 mM CaCl$_2$, 2 mM DTT, and 10 mM BAEE (for PAD1, 2 and 4)

or 10 mM BAA (for PAD3) with a final volume of 60 µL). After 15 min, reactions were quenched with liquid nitrogen and the production of citrulline was quantified using the COLDER assay. (Kearney, et al. *Biochemistry* 2005, 44, 10570-10582; Knipp, et al. *Anal. Biochem.* 2000, 286, 257-264.) The time-dependence of PAD inhibition was fit to the following equation 1, $$v = v_0 e^{-kt} \quad (1),$$

using Grafit, version 5.0.11, where v is velocity, $v_0$ is initial velocity, k (or $k_{obs}$ is the pseudo-first-order rate constant of inactivation, and t is time. Upon reaching saturation, the concentration dependence of $k_{obs}$ was fit to equation 2, $$k_{obs} = k_{inact}[I]/(K_I + [I]), \quad (2),$$

using Grafit, version 5.0.11, where $k_{inact}$ is the maximal rate of inactivation, $K_I$ is the concentration of inhibitor that affords half-maximal inactivation, and [I] is the concentration of inhibitor. When $k_{obs}$ with [I] varied linearly, $k_{inact}/K_I$ was determined from the slope of the line. All the experiments were performed at least in duplicate.

RFA labelling. RFA labelling of PAD1 in the presence of inhibitors followed a protocol similar to that established for PAD2. (Mondal, et al. *ACS Chem. Biol.* 2018, 13, 1057-1065.) Briefly, PAD1 (2 µM final) was added to prewarmed (10 min at 37° C.) reaction mixture (100 mM TRIS pH 7.4, 50 mM NaCl, 10 mM CaCl$_2$, and 2 mM DTT in a final volume of 30 µL) containing RFA (2 µM final) and DMSO or various concentrations of the inhibitor. After incubating at 37° C. for 2 h, the reaction mixture was quenched with 5×SDS-PAGE loading dye, incubated at 95° C. for 15 min and then loaded onto a 10% SDS-PAGE gel. In-gel fluorescence of the protein bands was recorded using a typhoon scanner (excitation/emission maxima of ~546/579, respectively) and was quantified using ImageJ software. IC$_{50}$ values of the inhibitors were obtained by plotting the relative decrease in the fluorescence intensity of protein bands against the concentration of inhibitor. All the experiments were performed at least in duplicate.

Preparation and Maintenance of HEK293TPAD1 Cells. The human PADI1 gene was amplified from the pET28-PAD1 vector by PCR using the following forward (encoding a 5' KpnI site along with a FLAG tag) and reverse (encoding a 3' XhoI site) primers.

Forward primer: 5'-CATGGTACCATGGACTACAAGGACGACGACGACAAGATGGCCCCAAAGAGAGTTGT-3'

Reverse primer: 5'-GTCTCGAGTCAGGGCACCATGTTCCACCATT-3'

The PCR product was purified using a PCR purification kit. The purified PCR product was digested with KpnI and XhoI, and the mixture was then run on a 1% agarose gel. The desired DNA band was cut from the gel and was extracted using a gel purification kit (Bio Basic Canada Inc.). The DNA was then ligated into pcDNA 3.1 Hygro (+), which had also been digested with KpnI and XhoI, using T4 DNA ligase. The ligation mixture was transformed into competent *E. Coli* XL1-Blue cells and penicillin-resistant single colonies were grown by culturing at 37° C. for 12 h. pcDNA3.1-PAD1 plasmid was then purified from the cultured cells using a plasmid purification kit (Bio Basic Canada Inc.). HEK293T cells (ATCC) were grown to 50-60% confluence in Dulbecco's Modified Eagle's Medium (DMEM) (supplemented with 10% heat-inactivated fetal bovine serum, 100 units/mL penicillin and 100 µg/mL streptomycin) under 5% CO$_2$ atmosphere and were transfected with 20 µg of the pcDNA3.1-PAD1 construct using Lipofectamine 2000 according to the manufacturer's protocol. Cells were further cultured for 48 h post-transfection and then selected with 0.2 mg/mL hygromycin B to establish stable transfection. Overexpression of PAD1 in HEK293TPAD1 cells was confirmed by Western blotting. HEK293TPAD1 cells were maintained in DMEM (supplemented with 10% heat-inactivated fetal bovine serum, 100 units/mL penicillin, 100 µg/mL streptomycin and 0.15 mg/mL hygromycin B) under 5% CO$_2$ atmosphere.

Histone 113 Citrullination in HEK293TPAD1 Cells. HEK293TPAD1 cells were seeded on 6-well plates at a density of ~1×10$^6$ cells/well and were allowed to grow in DMEM (supplemented with 10% heat-inactivated fetal bovine serum, 100 units/mL penicillin, 100 µg/mL streptomycin and 0.15 mg/mL hygromycin B) for 12 h. The monolayer of cells was washed gently with 2 mL 1×HBS (140 mM NaCl, 0.7 mM Na$_2$HPO$_4$.2H$_2$O, 20 mM HEPES pH 7.4) and each well was filled with 2 mL of 1×HBS (pH 7.4). Then the cells were treated with 1 mM CaCl$_2$, 5 µM ionomycin (calcium ionophore) and DMSO or various concentrations of inhibitor for 3 h. The final concentration of DMSO in each well was 1%. Cells in each well were then collected using a cell scraper, harvested by centrifugation at 3,000 rpm for 5 min and were resuspended in 1×HBS (100 µL). Triton X-100 (1% final) was added to each sample and the cells were lysed using a probe sonicator (pulse amplitude of 10 for 10 s, oscillating between 1 s on and 1 s off). Lysates were cleared by centrifugation at 21,000 g for 15 min and soluble proteins were quantified by DC-assay (Bio-Rad). 2 µg of total protein was loaded onto a 4-15% gradient SDS-PAGE gel and separated by electrophoresis followed by transferring to a PVDF membrane (Bio-Rad) at 80 V for 50 min. The membrane was blocked by treating with 5% BSA in phosphate buffered saline supplemented with 0.1% Tween-20 (PBST). The membrane was then treated with mouse monoclonal anti-histone H3 (1:1000) and rabbit polyclonal anti-histone H3Cit 2,8,17 (1:1000) antibodies in blocking solution for 12 h at 4° C. The membrane was washed with PBST (3 times, 10 min for each wash) and was incubated with anti-mouse as well as anti-rabbit IgG Licor conjugates (1:5000) in PBST and 5% BSA for 1 h at 25° C. Then the membrane was washed with PBST (3 times, 10 min for each wash) and imaged by Licor analysis. All the experiments were performed at least in duplicate.

Cytotoxicity Studies. HEK293TPAD1 cells were seeded (2×10$^4$ cells/well) on 96-well plate and were allowed to grow in DMEM (supplemented with 10% heat-inactivated fetal bovine serum, 100 units/mL penicillin, 100 µg/mL streptomycin and 0.15 mg/mL hygromycin B) for 24 h. Cells were then treated with DMSO or various concentrations of inhibitor at 37° C. for 24 h. Activated XTT reagent (ATCC) was added to each well and cells were further incubated at 37° C. for 5 h. Cell viability was measured by recording the absorbance at 475 nm and 660 nm. Equation 3, $$Y = \text{Bottom} + (\text{Top} - \text{Bottom})/[1 + 10^{((logEC50-X)*Hillslope)}] \quad (3),$$

was used to fit an eight-point dose-response curve to determine the EC$_{50}$ values for inhibition of cell-proliferation using GraphPad Prism 7.03. Top and Bottom are plateaus of the dose-response curve, X is the log of inhibitor-concentration, Hillslope is the slope factor or Hill slope. All the experiments were performed at least in triplicate.

In Vitro Fertilization. Female ICR mice (4-6 weeks) were injected intraperitoneally with 10 international units (IU) of pregnant mare serum gonadotropin (PMSG) and after 46 h, 10 IU of human chorionicgonadotropin (hCG). After 16 h, cumulus masses were released from oviducts into HEPES-buffered HTF culture medium (HTF) (InVitro Care, Frederick, MD). Cauda epididymal mouse spermatozoa were released and placed in drops of HTF culture medium (In-Vitro Care). Then the sperm suspensions were added to the cumulus mass drops with a final concentration of approximately $1-3 \times 10^5$/mL. Zygotes were collected and transferred to KSOM medium containing 100 μM PAD1 inhibitor or equal volume of DMSO as a control. Then 4-cell and blastocyst stage embryos were collected after 48 and 100 h of culture, respectively.

Immunofluorescent and Confocal Microscopy. Embryos were fixed in 4% paraformaldehyde in PBS (pH 7.4) for 30 min and then permeabilized in 0.5% Triton X-100 for 30 min at room temperature. After blocking in 1% BSA/PBS at room temperature for 1 h, samples were incubated with anti-H3Cit2/8/17 antibody (Catalogue no. ab77164, Abcam) (1:100) at 4° C. for 12 h. After five washes, samples were incubated with FITC-conjugated secondary antibody for 1 h at room temperature. Nuclei were counterstained with DAPI for 5 min. Embryos were mounted on glass slides in a drop of antifade medium (Vectashield, Burlingame, CA, USA) and were examined under confocal laser scanning microscope (LSM 700; Zeiss, Oberkochen, Germany). All the experiments were performed at least in triplicate.

Dose-dependent in vitro Labelling of Recombinant PADs with 21 and 22. A PAD (1.4 μM) was added to a prewarmed (10 min at 37° C.) reaction mixture (25 mM TRIS pH 7.4, 10 mM NaCl, and 5 mM $CaCl_2$) containing various concentrations of 21 or 22 (or equal volume of DMSO for control). The mixture was incubated at 37° C. for 15 min. Then TAMRA-$N_3$ (50 μM), TCEP (1 mM), TBTA (0.3 mM) and freshly prepared copper (II) sulphate (1 mM) were sequentially added to the reaction mixture and the tubes were gently tumbled at room temperature for 2 h. Then the reactions were quenched with 5×SDS-PAGE loading dye, heated at 95° C. for 15 min and loaded onto 4-15% gradient SDS-PAGE gel. Protein bands were visualized by recording in-gel fluorescence using a typhoon scanner (approximate excitation/emission maxima ~546/579, respectively). All the experiments were performed at least in duplicate.

Limit of Detection for in vitro Labelling of Recombinant PADs with 21 and 22. Various concentrations of PAD were added to prewarmed (10 min at 37° C.) reaction mixtures (25 mM TRIS pH 7.4, 10 mM NaCl, 5 mM $CaCl_2$) containing 10 μM of 21 or 22. The mixture was incubated at 37° C. for 15 min followed by sequential addition of TAMRA-$N_3$ (50 μM), TCEP (1 mM), TBTA (0.3 mM) and freshly prepared copper (II) sulphate (1 mM). The tubes were then gently tumbled at room temperature for 2 h. Reactions were quenched with 5×SDS-PAGE loading dye, heated at 95° C. for 15 min and loaded onto 4-15% gradient SDS-PAGE gel. Protein bands were visualized by recording in-gel fluorescence using a typhoon scanner (approximate excitation/emission maxima ~546/579, respectively). All the experiments were performed at least in duplicate.

Dose-dependent Labelling of PAD1 in HEK293TPAD1 cells with 21. HEK293TPAD1 cells were plated in 6-well plates at a density of ~$1 \times 10^6$ cells/well and were allowed to grow in DMEM (supplemented with 10% heat-inactivated fetal bovine serum, 100 units/mL penicillin, 100 μg/mL streptomycin and 0.15 mg/mL hygromycin B) for 12 h. Then the cells were washed gently with serum-free DMEM (supplemented with 100 units/mL penicillin and 100 μg/mL streptomycin) and each well was filled with 2 mL of serum-free DMEM. The cells were treated with 1 mM $CaCl_2$, 5 μM ionomycin (calcium ionophore) and DMSO or various concentrations of inhibitor for 3 h. Cells were collected using a cell scraper, harvested by centrifugation at 3,000 rpm for 5 min and were resuspended in 1×PBS (80 μL). Then the cells were lysed using a probe sonicator and lysates were cleared by centrifugation at 21000 g for 15 min. Soluble proteins in the lysate were quantified by DC-assay (Bio-Rad). Then the lysate (1 mg/mL, 50 μL total) was treated with TAMRA-$N_3$ (50 μM), TCEP (1.5 mM), TBTA (0.3 mM) and freshly prepared copper (II) sulphate (4 mM). The tubes were then gently tumbled at room temperature for 2 h. The precipitated proteins were collected by centrifugation at 21000 g for 10 min. The protein pellets were resuspended in 5×SDS-PAGE loading dye, heated at 95° C. for 15 min and separated by SDS-PAGE. Protein bands were visualized by recording in-gel fluorescence using a typhoon scanner (approximate excitation/emission maxima ~546/579, respectively). All the experiments were performed at least in duplicate.

Time-dependent Labelling of PAD1 in HEK293TPAD1 cells with 21. This study followed a procedure similar to that described for the dose-dependent labelling of PAD1 in HEK293TPAD1 cells with 21. The only difference is that the cells were treated with 1 mM $CaCl_2$, 5 μM ionomycin and 5 μM of 21 in serum-free DMEM for various times (0-6 h). At various time points, the labelling reaction was quenched by freezing the harvested cells in liquid nitrogen. Cells were lysed and lysates were clicked with TAMRA-$N_3$ in the presence of TCEP, TBTA and $CuSO_4$ according to the methods described above. Protein bands were separated by SDS-PAGE and were visualized by recording in-gel fluorescence. All the experiments were performed at least in duplicate.

Target Engagement Assay—Labelling of PAD1 in HEK293TPAD1 cells with 21 in the presence of 1. This study followed a similar procedure to that described for the dose-dependent labelling of PAD1 in HEK293TPAD1 cells with 21. Briefly, HEK293TPAD1 cells were treated with 1 mM $CaCl_2$, 5 μM ionomycin, 5 μM of 21, and increasing concentrations (0-50 μM) of 1 in serum-free DMEM for 3 h. Cells were scraped, harvested by centrifugation at 3,000 rpm for 5 min and resuspended in 1×PBS. Lysis was carried out by sonicating the cells with a probe sonicator and lysates were clicked with TAMRA-$N_3$ in the presence of TCEP, TBTA and $CuSO_4$ as described above. Protein bands were separated by SDS-PAGE and were visualized by recording in-gel fluorescence. Fluorescence intensities of the protein bands were quantified by ImageJ software and were plotted against the concentration of 1 to afford the $EC_{50}$ value. All the experiments were performed at least in duplicate.

Enrichment of Proteins Labelled by 21 in HEK293TPAD1 Cells on Streptavidin-agarose. HEK293TPAD1 cells were cultured in 175 $cm^2$ T-175 flasks in DMEM (supplemented with 10% heat-inactivated fetal bovine serum, 100 units/mL penicillin, 100 μg/mL streptomycin and 0.15 mg/mL hygromycin B). Upon reaching ~90% confluence, cells were treated with 1 mM $CaCl_2$, 5 μM ionomycin and 5 μM of 21 (or equal volume of DMSO for control) in serum-free DMEM for 3 h. Then the cells were scraped, harvested by centrifugation at 3,000 rpm for 5 min and resuspended in 1×PBS. Cell lysis was performed by probe sonication and soluble proteins in the lysates were quantified by DC Assay (Bio-Rad). Endogenous biotinylated proteins were precleared by incubating the lysates with streptavidin-agarose beads (25 μL for 1 mg of total protein in the lysate) at room temperature for 1 h with constant mixing on an end-over-end shaker. The mixture was centrifuged (1200 g, 3 minute) to separate the beads and the supernatant (pre-cleared lysate). Pre-cleared lysates (2 mg/mL, 500 µL final) were clicked with Biotin-N$_3$ (100 µM), TCEP (1.5 mM), TBTA (0.3 mM) and freshly prepared CuSO$_4$ (4 mM), and the tubes were gently tumbled at room temperature for 2 h. The precipitated proteins were collected by centrifugation at 5,000 rpm for 10 min. The protein pellets were washed with ice-cold methanol, dried at room temperature for 5 min and resuspended in 1.2% SDS in PBS. SDS-solubilized proteins were then diluted with PBS to a final SDS concentration of 0.2% and were incubated with streptavidin-agarose beads (170 µL for 2 mg of total protein) at 4° C. for 16 h on an end-over-end shaker. The solutions were then incubated at room temperature for 3 h. The streptavidin beads were collected by centrifugation at 1200 g for 3 min and were washed with 2 M urea (2×5 mL), 0.2% SDS in PBS (2×5 mL), PBS (3×5 mL) and water (3×5 mL). The beads were pelleted by centrifugation at 1200 g for 3 min between washes. The washed beads were resuspended in 6 M urea (500 µL) and were treated with dithiothreitol (10 mM) at 65° C. for 20 min. Iodoacetamide (20 mM final) was then added to the mixture and the beads were further incubated at 37° C. for 30 min. The beads were collected by centrifugation at 1200 g for 3 min and were treated with a premixed solution of 2 M urea in PBS (200 µL), 100 mM CaCl$_2$ (2 µL) and trypsin (4 µL of 20 mg reconstituted in 40 µL of trypsin buffer) at 37° C. for 12 h. The digested peptides were separated from the beads by centrifugation and the beads were washed twice with water (50 µL). The digest was then desalted using a Pierce C18 spin column (catalogue no 89870) according to the manufacturer' protocol and resuspended in 100 µL 100 mM triethylammonium bicarbonate pH 8.5. 4 µL of 20% D$^{13}$CDO (heavy formaldehyde) and 2.5 µL of 37% HCHO (light formaldehyde) were added to the 21-treated and control samples, respectively. 20 µL of 0.6 M sodium cyanoborohydride was then added to both the 21-treated and control samples, and the samples were incubated at room temperature for 2 h. The samples were cooled on ice and the reaction quenched with 4 µL of 20% ammonium hydroxide. 8 µL of formic acid was then added to the samples. Heavy (21-treated) and light (control) samples were mixed together and were stored at −20° C. for proteomic analysis. All the experiments were performed at least in duplicate.

Proteomic Analysis and Data Processing. Mass Spectrometry was performed using a Thermo Fisher LTQ Orbitrap Discovery mass spectrometer in conjunction with an Agilent 1200 series HPLC. Labeled peptide samples were pressure-loaded onto a 250 µm fused silica desalting column packed with 4 cm of Aqua C18 reverse phase resin (Phenomenex). Peptides were eluted onto a biphasic 100 µm fused silica column with a 5 µm tip packed with 4 cm Partisphere strong cation exchange resin (SCX, Whatman) followed by 10 cm of C18 resin. The peptides were separated from the SCX onto the C18 resin using 5 distinct salt pulses (95% high-purity water, 5% Optima-grade acetonitrile, 0.1% formic acid and 500 mM ammonium acetate) as outlined in Weerapana et. al. (Weerapana, et al. *Nat. Protoc.* 2007, 2, 1414-1425.) C18 elution took place using a gradient from 5% Buffer A (95% water, 5% acetonitrile, 0.1% formic acid), to 100% Buffer B (20% water, 80% acetonitrile, 0.1% formic acid). The flow rate through the column was 0.25 mL/min, with a spray voltage of 2.75 kV. With dynamic exclusion enabled, each full MS scan (400-1800 MW) was followed by 8, data-dependent scans of the $n^{th}$ most intense ion.

The tandem MS data was analyzed by the SEQUEST algorithm using a static Cys modification (+57 Da), and a static modification on Lys and the N-termini of either +28 Da (light) or +34 Da (heavy). (Eng, et al. *J. Am. Soc. Mass Spectrom.* 1994, 5, 976-989.) Data was searched against a human reverse-concatenated non-redundant FASTA database applying Uniprot identifiers. MS2 spectra were assembled using DTASelect 2.0, with the -trypstat option applied. Quantification of Heavy/Light ratios were calculated using the Cimage quantification package. (Tabb, et al. *J. Proteome Res.* 2002, 1, 21-26; Weerapana, et al. *Nature* 2010, 468, 790-795.) Ratios across peptides were averaged to generate relative protein abundance ratios.

TABLE 1

$k_{inact}/K_I$ values and selectivity of compounds 1-22 for inhibition of PAD1-4.

| | $k_{inact}/K_I$ (M$^{-1}$min$^{-1}$) [Fold PAD selectivity] | | | |
|---|---|---|---|---|
| Compound | PAD1 | PAD2 | PAD3 | PAD4 |
| 1 | 10400 ± 2380* [74] | 140 ± 20† [1] | 200 ± 40† [1] | 270 ± 40† [2] |
| 2 | 58860 ± 3640* [19] | 8110 ± 1020* [3] | 3050 ± 1150* [1] | 11060 ± 2880* [4] |
| 3 | 5870 ± 790* [8] | 1650 ± 70† [2] | 2160 ± 80† [3] | 750 ± 70† [1] |
| 4 | 66020 ± 2870* [15] | 9730 ± 2210* [2] | 4400 ± 140‡ [1] | 24110 ± 90* [5] |
| 5 | 7280 ± 960* [9] | 770 ± 80† [1] | 2470 ± 260† [3] | 1070 ± 180* [1] |
| 6 | 59480 ± 14000* [18] | 3230 ± 790† [1] | 3300 ± 70† [1] | 35190 ± 4970* [11] |
| 7 | 120 ± 20† [1] | 120 ± 20† [1] | 1620 ± 360* [14] | 2530 ± 200* [21] |
| 8 | 600 ± 70† [1] | 2800 ± 210† [5] | 10590 ± 3980† [18] | 41040 ± 630* [68] |
| 9 | 190 ± 20† [1] | 400 ± 30† [2] | 580 ± 120† [3] | 240 ± 20† [1] |
| 10 | 5080 ± 210* [1] | 4190 ± 900* [1] | 10060 ± 1850* [2] | 9690 ± 480* [2] |
| 11 | 3280 ± 210 [25] | 130 ± 10† [1] | 420 ± 30† [3] | 250 ± 20† [2] |

TABLE 1-continued $k_{inact}/K_I$ values and selectivity of compounds 1-22 for inhibition of PAD1-4.

| Compound | PAD1 | PAD2 | PAD3 | PAD4 |
|---|---|---|---|---|
| 12 | 40740 ± 2960* [3] | 14210 ± 110* [1] | 21560 ± 2430* [2] | 18810 ± 970* [1] |
| 13 | 1290 ± 90* [10] | 130 ± 20† [1] | 550 ± 40† [4] | 290 ± 10† [2] |
| 14 | 5300 ± 210‡ [2] | 3400 ± 70‡ [1] | 5500 ± 300‡ [2] | 2600 ± 70‡ [1] |
| 15 | 1500 ± 30* [13] | 120 ± 30† [1] | 500 ± 50† [4] | 640 ± 90† [5] |
| 16 | 3900 ± 100‡ [2] | 1700 ± 70‡ [1] | 5000 ± 280‡ [3] | 3600 ± 70‡ [2] |
| 17 | 300 ± 30† [3] | 110 ± 10† [1] | 240 ± 30† [2] | 180 ± 20† [2] |
| 18 | 4100 ± 300‡ [4] | 2210 ± 270† [2] | 1170 ± 40† [1] | 3160 ± 550† [3] |
| 19 | 13250 ± 2870* [44] | 300 ± 60† [1] | 700 ± 70† [2] | 300 ± 30† [1] |
| 20 | 94360 ± 14870* [4] | 34290 ± 1970* [1] | 70000 ± 15000* [3] | 24310 ± 1060* [1] |
| 21 | 4480 ± 200* [34] | 130 ± 30† [1] | 310 ± 80† [2] | 220 ± 30† [2] |
| 22 | 72160 ± 10970* [9] | 31230 ± 1440* [4] | 8200 ± 30* [1] | 25000 ± 1370* [3] |

*$k_{inact}$ and $K_I$ were determined from a nonlinear fit of the $k_{obs}$ versus [I] data.
‡$k_{inact}/K_I$ was determined from a linear fit of the $k_{obs}$ versus [I] data.
†A single $k_{obs}$ was determined

TABLE 2

$k_{inact}$ and $K_I$ values of inhibition of PAD1-4 by compounds 1-22.

| Compounds | PAD1 $k_{inact}$ (min$^{-1}$) | PAD1 $K_I$ (µM) | PAD2 $k_{inact}$ (min$^{-1}$) | PAD2 $K_I$ (µM) | PAD3 $k_{inact}$ (min$^{-1}$) | PAD3 $K_I$ (µM) | PAD4 $k_{inact}$ (min$^{-1}$) | PAD4 $K_I$ (µM) |
|---|---|---|---|---|---|---|---|---|
| 1 | 0.13 ± 0.007 | 12.5 ± 2.9 | NA† | NA† | NA† | NA† | NA† | NA† |
| 2 | 0.93 ± 0.02 | 15.8 ± 3.3 | 0.76 ± 0.07 | 93.7 ± 17.8 | 0.77 ± 0.009 | 252.7 ± 5.3 | 0.68 ± 0.01 | 61.5 ± 11.0 |
| 3 | 0.26 ± 0.01 | 44.3 ± 8.5 | NA† | NA† | NA† | NA† | NA† | NA† |
| 4 | 2.04 ± 0.01 | 30.9 ± 1.6 | 2.02 ± 0.38 | 207.6 ± 61.6 | NA‡ | NA‡ | 3.05 ± 0.01 | 126.5 ± 1.06 |
| 5 | 0.22 ± 0.01 | 30.2 ± 7.6 | NA† | NA† | NA† | NA† | NA† | NA† |
| 6 | 0.91 ± 0.03 | 15.3 ± 4.0 | NA† | NA† | NA‡ | NA‡ | 2.27 ± 0.002 | 64.5 ± 9.4 |
| 7 | NA† | NA† | NA† | NA† | 0.12 ± 0.01 | 73.9 ± 10.3 | 0.25 ± 0.004 | 98.4 ± 7.7 |
| 8 | NA‡ | NA‡ | NA‡ | NA‡ | NA† | NA† | 1.03 ± 0.04 | 25.1 ± 1.3 |
| 9 | NA† | NA† | NA† | NA† | NA† | NA† | NA† | NA† |
| 10 | 0.78 ± 0.007 | 153.6 ± 4.9 | 0.55 ± 0.04 | 131.2 ± 38.9 | 0.96 ± 0.03 | 95.4 ± 14.3 | 1.58 ± 0.08 | 163.1 ± 16.7 |
| 11 | 0.18 ± 0.005 | 54.8 ± 5.5 | NA† | NA† | NA† | NA† | NA† | NA† |
| 12 | 1.32 ± 0.2 | 32.4 ± 7.0 | 1.30 ± 0.08 | 91.5 ± 6.7 | 2.32 ± 0.15 | 107.6 ± 19.6 | 1.46 ± 0.28 | 77.6 ± 18.8 |
| 13 | 0.16 ± 0.02 | 124.5 ± 7.4 | NA† | NA† | NA† | NA† | NA† | NA† |
| 14 | NA‡ | NA‡ | NA‡ | NA‡ | NA‡ | NA‡ | NA‡ | NA‡ |
| 15 | 0.07 ± 0.006 | 46.7 ± 3.8 | NA† | NA† | NA† | NA† | NA† | NA† |
| 16 | NA‡ | NA‡ | NA‡ | NA‡ | NA‡ | NA‡ | NA‡ | NA‡ |
| 17 | NA† | NA† | NA† | NA† | NA† | NA† | NA† | NA† |
| 18 | NA‡ | NA‡ | NA† | NA† | NA† | NA† | NA† | NA† |
| 19 | 0.4 ± 0.07 | 30.2 ± 12.7 | NA† | NA† | NA† | NA† | NA† | NA† |

TABLE 2-continued $k_{inact}$ and $K_I$ values of inhibition of PAD1-4 by compounds 1-22.

| Com-pounds | PAD1 | | PAD2 | | PAD3 | | PAD4 | |
|---|---|---|---|---|---|---|---|---|
| | $k_{inact}$ (min$^{-1}$) | $K_I$ (µM) | $k_{inact}$ (min$^{-1}$) | $K_I$ (µM) | $k_{inact}$ (min$^{-1}$) | $K_I$ (µM) | $k_{inact}$ (min$^{-1}$) | $K_I$ (µM) |
| 20 | 1.84 ± 0.18 | 19.5 ± 4.2 | 0.60 ± 0.01 | 17.5 ± 1.4 | 1.19 ± 0.06 | 17.0 ± 4.0 | 0.44 ± 0.008 | 18.1 ± 0.2 |
| 21 | 0.31 ± 0.005 | 69.2 ± 4.6 | NA† | NA† | NA† | NA† | NA† | NA† |
| 23 | 2.54 ± 0.05 | 35.2 ± 4.7 | 0.79 ± 0.01 | 25.3 ± 1.6 | 0.8 ± 0.03 | 97.6 ± 3.9 | 0.77 ± 0.01 | 30.8 ± 1.1 |

NA: Not applicable.
†A single $k_{obs}$ was determined to calculate $k_{inact}/K_I$.
‡$k_{inact}/K_I$ was determined from a linear fit of the $k_{obs}$ versus [I] data.

Applicant's disclosure is described herein in preferred embodiments with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of Applicant's disclosure may be combined in any suitable manner in one or more embodiments. In the description herein, numerous specific details are recited to provide a thorough understanding of embodiments of the invention. One skilled in the relevant art will recognize, however, that Applicant's composition and/or method may be practiced without one or more of the specific details, or with other methods, components, materials, and so forth. In other instances, well-known structures, materials, or operations are not shown or described in detail to avoid obscuring aspects of the disclosure.

In this specification and the appended claims, the singular forms "a," "an," and "the" include plural reference, unless the context clearly dictates otherwise.

Unless defined otherwise, all technical and scientific terms used herein have the same meaning as commonly understood by one of ordinary skill in the art. Although any methods and materials similar or equivalent to those described herein can also be used in the practice or testing of the present disclosure, the preferred methods and materials are now described. Methods recited herein may be carried out in any order that is logically possible, in addition to a particular order disclosed.

INCORPORATION BY REFERENCE

References and citations to other documents, such as patents, patent applications, patent publications, journals, books, papers, web contents, have been made in this disclosure. All such documents are hereby incorporated herein by reference in their entirety for all purposes. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

EQUIVALENTS

The representative examples are intended to help illustrate the invention, and are not intended to, nor should they be construed to, limit the scope of the invention. Indeed, various modifications of the invention and many further embodiments thereof, in addition to those shown and described herein, will become apparent to those skilled in the art from the full contents of this document, including the examples and the references to the scientific and patent literature included herein. The examples contain important additional information, exemplification and guidance that can be adapted to the practice of this invention in its various embodiments and equivalents thereof.

What is claimed is:
1. A compound having the structural formula (I),

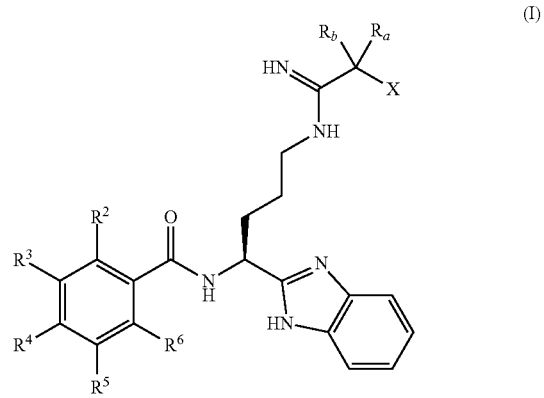

wherein
each of $R_a$ and $R_b$ is H or D;
X is a halogen atom;
$R^2$ is selected from the group consisting of: H, OH or OCH$_3$;
$R^4$ is selected from the group consisting of: H, halogen, ethynyl (HC≡C—)
each of $R^3$ and $R^5$ is I;
$R^6$ is H or R; and
each R is independently a $C_{1-6}$ alkyl,
or a pharmaceutically acceptable salt thereof.

2. The compound of claim 1, wherein each of $R_a$ and $R_b$ is H.

3. The compound of claim 1, wherein X is F.

4. The compound of claim 1, wherein X is Cl.

5. The compound of claim 1, wherein $R^2$ is OH.

6. The compound of claim 5, wherein $R^4$ is H.

7. The compound of claim 6, wherein $R^6$ is H.

8. The compound of claim 1, wherein $R^4$ is a halogen atom.

9. The compound of claim 1, in the form of a salt.

10. A pharmaceutical composition comprising a compound of claim 1.

11. A unit dosage form comprising a pharmaceutical composition according to claim 10.

12. A method for inhibiting or inactivating protein arginine deiminase 1 (PAD1), comprising administering to a subject in need thereof a pharmaceutical composition of claim 10.

* * * * *